US007951873B2

(12) United States Patent
Best et al.

(10) Patent No.: US 7,951,873 B2
(45) Date of Patent: May 31, 2011

(54) LINEAR LOW DENSITY POLYMER BLENDS AND ARTICLES MADE THEREFROM

(75) Inventors: Steven Arthur Best, Delaware, OH (US); Paul Masten German, Friendswood, TX (US); Jerry Michael Johnson, League City, TX (US); Alan M. Malakoff, Houston, TX (US); Stefan Bertil Ohlsson, Wespelaar (SE)

(73) Assignee: ExxonMobil Chemical Patents Inc., Houston, TX (US)

( * ) Notice: Subject to any disclaimer, the term of this patent is extended or adjusted under 35 U.S.C. 154(b) by 765 days.

(21) Appl. No.: 11/788,004

(22) Filed: Apr. 18, 2007

(65) Prior Publication Data

US 2007/0260016 A1 Nov. 8, 2007

Related U.S. Application Data

(60) Provisional application No. 60/798,382, filed on May 5, 2006.

(51) Int. Cl.
*C08F 8/00* (2006.01)
*C08F 10/00* (2006.01)
*C08F 110/00* (2006.01)
*C08F 210/00* (2006.01)
*C08L 9/00* (2006.01)
*C08L 23/00* (2006.01)
*C08L 45/00* (2006.01)
*B29D 22/00* (2006.01)
*B29D 23/00* (2006.01)
*B32B 27/00* (2006.01)

(52) U.S. Cl. ........ 525/191; 525/211; 525/232; 525/240; 526/337; 526/348; 526/348.1; 428/35.7; 428/500; 428/515

(58) Field of Classification Search .......... 525/191, 525/211, 232, 240; 526/337, 348, 348.1; 428/35.7, 500, 515

See application file for complete search history.

(56) References Cited

U.S. PATENT DOCUMENTS

| | | | |
|---|---|---|---|
| 3,995,007 A | 11/1976 | Nakamura et al. |
| 4,103,473 A | 8/1978 | Bast et al. |
| 4,243,619 A | 1/1981 | Fraser et al. |
| 4,506,494 A | 3/1985 | Shimoyama et al. |
| 4,532,752 A | 8/1985 | Taylor |
| 4,532,753 A | 8/1985 | Kovacs |
| 4,540,753 A | 9/1985 | Cozewith et al. |
| 4,543,399 A | 9/1985 | Jenkins, III et al. |
| 4,571,926 A | 2/1986 | Scully |
| 4,588,790 A | 5/1986 | Jenkins, III et al. |
| 4,589,247 A | 5/1986 | Tsuruta et al. |
| 4,808,561 A | 2/1989 | Welborn, Jr. |
| 4,892,851 A | 1/1990 | Ewen et al. |
| 5,008,204 A | 4/1991 | Stehling |
| 5,017,714 A | 5/1991 | Welborn, Jr. |
| 5,026,798 A | 6/1991 | Canich |
| 5,055,438 A | 10/1991 | Canich |
| 5,057,475 A | 10/1991 | Canich et al. |
| 5,064,802 A | 11/1991 | Stevens et al. |
| 5,124,418 A | 6/1992 | Welborn, Jr. |
| 5,153,157 A | 10/1992 | Hlatsky et al. |
| 5,206,075 A | 4/1993 | Hodgson, Jr. |
| 5,241,025 A | 8/1993 | Hlatky et al. |
| 5,261,536 A | 11/1993 | Wilson |
| 5,264,405 A | 11/1993 | Canich |
| 5,324,800 A | 6/1994 | Welborn, Jr. |
| 5,334,677 A | 8/1994 | Razavi et al. |
| 5,350,723 A | 9/1994 | Neithamer et al. |
| 5,352,749 A | 10/1994 | DeChellis et al. |
| 5,405,922 A | 4/1995 | DeChellis et al. |
| 5,416,228 A | 5/1995 | Ewen et al. |
| 5,436,304 A | 7/1995 | Griffin et al. |
| 5,449,651 A | 9/1995 | Reddy et al. |
| 5,462,999 A | 10/1995 | Griffin et al. |
| 5,569,693 A | 10/1996 | Doshi et al. |
| 5,580,939 A | 12/1996 | Ewen et al. |
| 5,595,705 A | 1/1997 | Walton et al. |
| 5,614,315 A | 3/1997 | Kondo et al. |
| 5,633,394 A | 5/1997 | Welborn, Jr. et al. |
| 5,674,945 A | 10/1997 | Takahashi et al. |
| 5,749,202 A | 5/1998 | Eichbauer |
| 5,752,362 A | 5/1998 | Eichbauer |
| 5,763,543 A | 6/1998 | Muhle et al. |
| 5,814,399 A | 9/1998 | Eichbauer |
| 5,858,491 A | 1/1999 | Geussens et al. |
| 5,897,768 A | 4/1999 | McVicker et al. |
| 5,902,684 A | 5/1999 | Bullard et al. |
| 5,907,942 A | 6/1999 | Eichbauer |
| 5,907,943 A | 6/1999 | Eichbauer |
| 5,922,441 A | 7/1999 | Eichbauer |

(Continued)

FOREIGN PATENT DOCUMENTS

CA 2164919 6/1996

(Continued)

OTHER PUBLICATIONS

Sun, T. et al. "*Effect of Short Chain Branching on the Coil Dimensions of Polyolefins in Dilute Solution*," Macromolecules, vol. 34, pp. 6812-6820, ACS, (2001).

Wild, et al. "Determination of Branching Distributions in Polyethylene and Ethylene Copolymers", Poly. Sci. Poly. Phys. Ed., vol. 20, p. 441 (1982).

Ver Strate G. et al.; "Near Monodisperse Ethylene-Propylene Copolymers by Direct Ziegler-Natta Polymerization. Preparation, Characterization, Properties," Macromolecules, 1988, vol. 21, pp. 3360-3371.

Ouano, A.; "Chapter 6. Gel Permeation Chromatography" *Polymer Molecular Weights Part II*, Marcel Dekker, Inc., NY, 1975, pp. 287-368.

(Continued)

*Primary Examiner* — Nathan M Nutter

(57) ABSTRACT

This invention relates to blends of linear low density polyethylene copolymers with other linear low density polyethylenes or very low density, low density, medium density, high density, and differentiated polyethylenes. The invention also includes articles produced from the linear low density polyethylene and polyethylene blends described.

12 Claims, 3 Drawing Sheets

U.S. PATENT DOCUMENTS

| | | | |
|---|---|---|---|
| 6,083,611 | A | 7/2000 | Eichbauer et al. |
| 6,093,480 | A | 7/2000 | Eichbauer |
| 6,132,827 | A | 10/2000 | Miro |
| 6,218,484 | B1 | 4/2001 | Brown et al. |
| 6,255,426 | B1 | 7/2001 | Lue et al. |
| 6,265,055 | B1 | 7/2001 | Simpson et al. |
| 6,358,457 | B1 | 3/2002 | Wong et al. |
| 6,359,072 | B1 | 3/2002 | Whaley |
| 6,376,410 | B1 | 4/2002 | Burkhardt et al. |
| 6,380,122 | B1 | 4/2002 | Kuchta et al. |
| 6,384,158 | B1 | 5/2002 | Bamberger et al. |
| 6,423,420 | B1 | 7/2002 | Brant et al. |
| 6,476,171 | B1 | 11/2002 | Lue et al. |
| 6,482,532 | B1 | 11/2002 | Yap et al. |
| H2073 | H | 7/2003 | Culotta |
| RE38,429 | E | 2/2004 | Eichbauer |
| RE38,658 | E | 11/2004 | Eichbauer |
| 7,235,607 | B2 * | 6/2007 | Ohlsson .................. 525/191 |
| 7,601,409 | B2 * | 10/2009 | Ohlsson .................. 428/35.7 |
| 2003/0215659 | A1 | 11/2003 | Farley et al. |
| 2004/0048019 | A1 | 3/2004 | Ohlsson |
| 2004/0053022 | A1 | 3/2004 | Ohlsson |
| 2006/0188678 | A1 | 8/2006 | Ohlsson et al. |
| 2007/0065650 | A1 | 3/2007 | Cook et al. |
| 2007/0082191 | A1 | 4/2007 | Liang et al. |
| 2009/0192270 | A1 * | 7/2009 | Malakoff et al. ............ 525/240 |

FOREIGN PATENT DOCUMENTS

| | | |
|---|---|---|
| CA | 2178459 | 12/1996 |
| EP | 0 277 004 | 8/1988 |
| EP | 0 426 638 | 5/1991 |
| EP | 0 427 697 | 5/1991 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 600 425 | 6/1994 |
| EP | 0 612 768 | 8/1994 |
| EP | 0 707 957 | 4/1996 |
| EP | 0 982 362 | 3/2000 |
| JP | 10-119211 | 5/1998 |
| WO | 91/09882 | 7/1991 |
| WO | 93/03093 | 2/1993 |
| WO | 93/09148 | 5/1993 |
| WO | 93/14132 | 7/1993 |
| WO | 94/03506 | 2/1994 |
| WO | WO 94/06857 | 3/1994 |
| WO | 94/09060 | 4/1994 |
| WO | 96/02244 | 2/1996 |
| WO | 96/08520 | 3/1996 |
| WO | WO96/11960 | 4/1996 |
| WO | WO96/11961 | 4/1996 |
| WO | 97/22470 | 6/1997 |
| WO | 99/16799 | 4/1999 |
| WO | 01/94113 | 12/2001 |
| WO | WO 01/98372 | 12/2001 |
| WO | WO01/98409 | 12/2001 |
| WO | 02/48258 | 6/2002 |
| WO | WO2004/022634 | 3/2004 |
| WO | WO2004/022646 | 3/2004 |
| WO | WO 2005/065945 | 7/2005 |

OTHER PUBLICATIONS

Rodriguez, F.; *Principles of Polymer Systems 3rd ed.*, Hemisphere Pub Corp., NY, 1989, pp. 155-160.

Ewen, J..; "Syndiospecific Propylene Polymerizations with Group 4 Metallocenes," J. Am. Chem. Soc. 1988, vol. 110, pp. 6255-6256.

Abraham D. et al., "Studies on LDPE/LLDPE Blends", Die Angewandle Makromolekulare Chemie, 1992, vol. 200, pp. 15-25 (Nr. 3468).

* cited by examiner

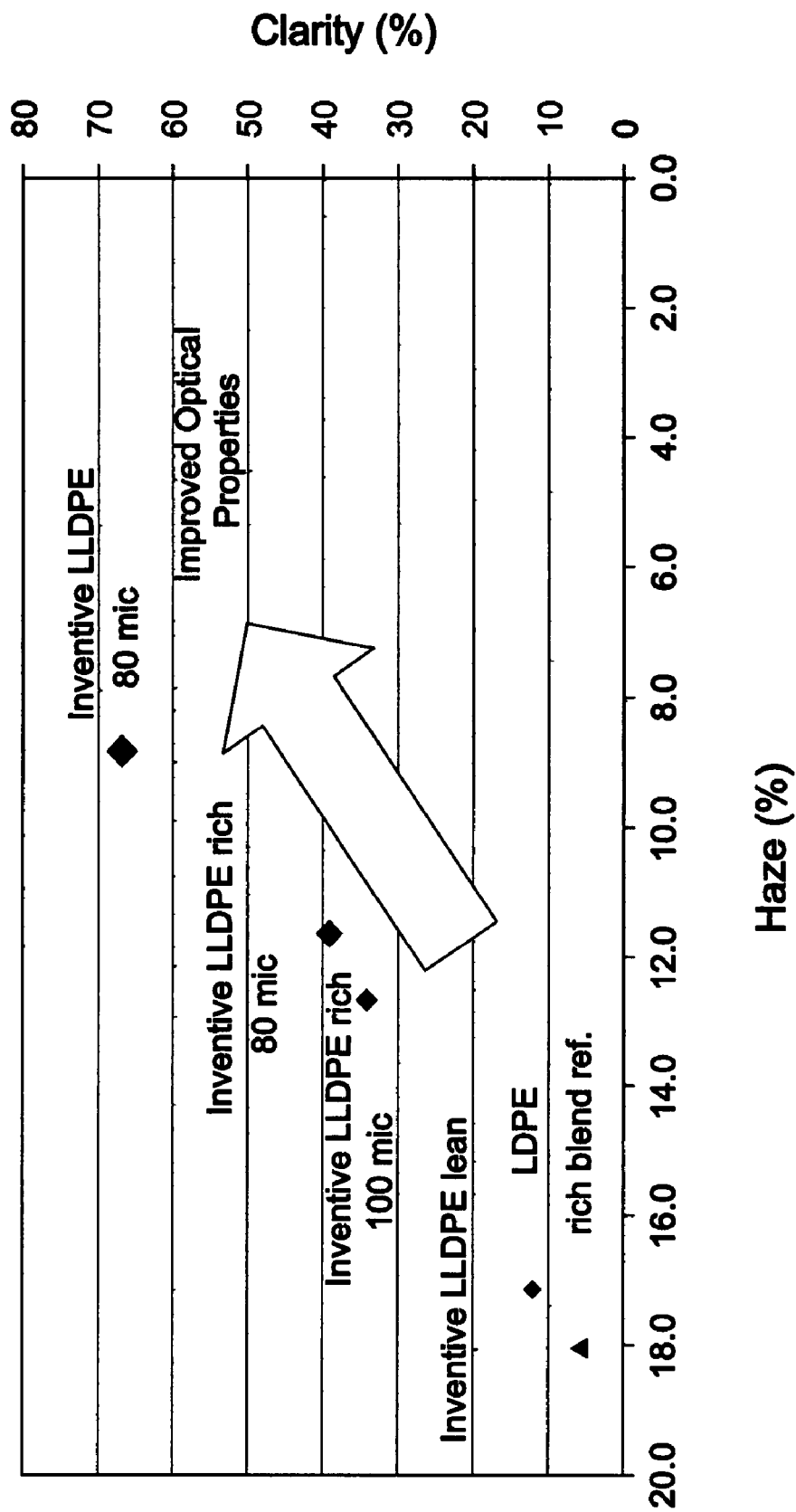

LINEAR LOW DENSITY POLYMER BLENDS AND ARTICLES MADE THEREFROM

CROSS REFERENCE TO RELATED APPLICATIONS

This application claims priority benefit to U.S. Provisional Application No. 60/798,382 filed on May 5, 2006, which is herein incorporated by reference in its entirety.

FIELD OF THE INVENTION

The present invention relates to metallocene-catalyzed linear low density polyethylene copolymers, copolymer blends, and articles made therefrom. More particularly, the invention relates to blends of linear low density polyethylene copolymers with other linear low density polyethylenes, very low density polyethylenes, low density polyethylenes, medium density polyethylenes, high density differentiated polyethylenes, and articles made therefrom.

BACKGROUND OF THE INVENTION

Linear low density polyethylenes, and blends and articles made therefrom, are generally known in the art. Such polymers and polymer blends have typically been made from a linear low density polyethylene produced using a Ziegler-Natta catalyst in a gas phase process.

U.S. Pat. No. 6,255,426 describes polymers of ethylene and at least one α-olefin having at least five carbon atoms obtained by a continuous gas phase polymerization process using supported catalyst of an activated molecularly discreet catalyst such as a metallocene. The polymerization process is performed in the substantial absence of an aluminum alkyl-based scavenger, and results in a linear low density polyethylene having a combination of good shear thinning behavior and impact strength.

WO 2004/022646 A1 describes heat shrinkable monolayer and multilayer films having good optical and mechanical properties. The films are formed of a blend of a polyethylene copolymer and a second polymer, such as a low density polyethylene. In particular, monolayer and multilayer shrink films are described that include in at least one layer a metallocene-catalyzed polyethylene resin. Also described are articles wrapped with such films.

WO 2004/022634 A1 describes stretch films having at least one layer formed of or including a polyethylene copolymer having a draw ratio of at least 250%, a tensile stress at the natural draw ratio of at least 22 MPa, and a tensile stress at second yield of at least 12 MPa.

While many prior art documents describe processes and polymers using the same monomers as those described herein and similar processes to those described herein, none describe polymer blends and articles made from those polymer blends that combine good shear thinning, and therefore relatively favorable extrusion and other melt processing properties, with high stiffness and high impact strength.

SUMMARY OF THE INVENTION

Provided are polymer blend compositions composed of a blend of a first linear low density polyethylene (LLDPE) copolymer and a second polyethylene polymer or copolymer. The first LLDPE is a copolymer of ethylene and at least one α-olefin having from 3 to about 20 carbon atoms which has a composition distribution breadth index (CDBI) of at least 70%, a melt index (MI), measured at 190° C. and 2.16 kg, of from about 0.1 to about 15 g/10 min, a density of from about 0.910 to about 0.945 g/cm$^3$, and a molecular weight distribution (MWD) of from about 2.5 to about 5.5. The second polyethylene polymer or copolymer blended with the first LLDPE may be a very low density polyethylene (VLDPE), another linear or non-linear low density polyethylene (LDPE), a medium density polyethylene (MDPE), a high density polyethylene (HDPE), a differentiated polyethylene (DPE), or combinations of the foregoing.

Also provided are articles made from both the first LLDPE copolymer alone and also from the polyethylene blends described herein. Articles made from LLDPE compositions or LLDPE blends may be used in a variety of end-use applications. Exemplary end uses are monolayer or multilayer films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (TV) bags, and combinations thereof.

BRIEF DESCRIPTION OF THE DRAWINGS

FIG. 3 is an X-Y graph of haze versus clarity that illustrates the optic properties of exemplary polymer compositions.

DETAILED DESCRIPTION OF ILLUSTRATIVE EMBODIMENTS

Definitions

Figure 1:
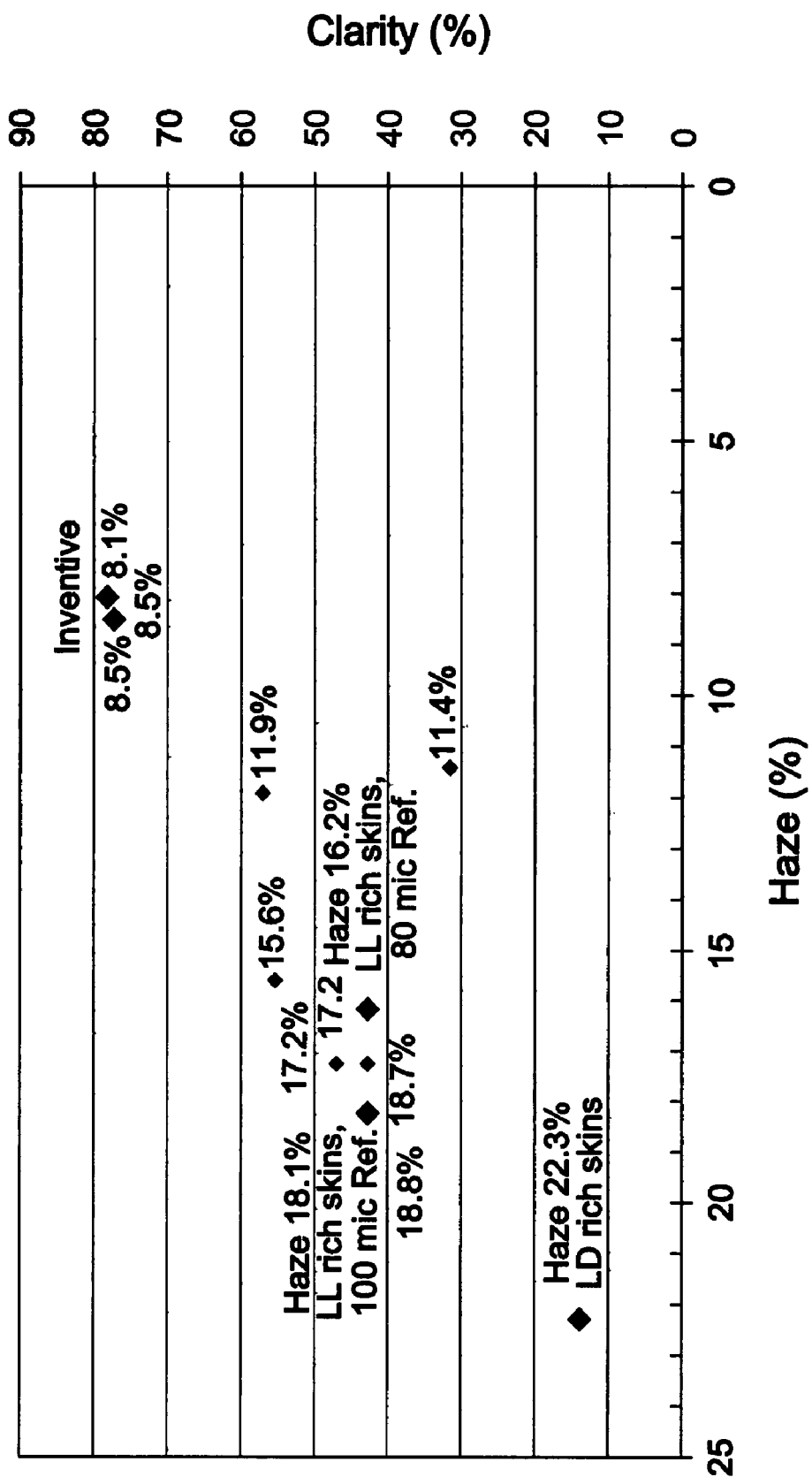
FIG. 1 is an X-Y graph of haze versus clarity that illustrates the optic properties of exemplary polymer compositions and conventional compositions.

For the purposes of this disclosure, the following definitions will apply:

Molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

The number average molecular weight is given by $$M_n = \frac{\sum_i n_i M_i}{\sum_i n_i}$$

The z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001).

Composition distribution breadth index ("CDBI") is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, Vol. 20, pg. 441 (1982) and U.S. Pat. No. 5,008,204, which are incorporated herein by reference in full.

LLDPE Polymers

The polymer blends and end-use applications of the present invention include a linear low density polyethylene (LLDPE) polymer. As used herein, the terms "linear low density polyethylene" and "LLDPE" refer to a polyethylene homopolymer or, preferably, copolymer having minimal long chain branching and a density of from about 0.910 g/cm³ to about 0.945 g/cm³. Polymers having more than two types of monomers, such as terpolymers, are also included within the term "copolymer" as used herein. In preferred embodiments, the LLDPE is a copolymer of ethylene and at least one other α-olefin. The comonomers that are useful in general for making LLDPE copolymers include α-olefins, such as $C_3$-$C_{20}$ α-olefins, preferably $C_3$-$C_{10}$ α-olefins, and more preferably $C_3$-$C_8$ α-olefins. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Specifically, but without limitation, the combinations of ethylene with a comonomer may include: ethylene propylene, ethylene butene, ethylene 1-pentene; ethylene 4-methyl-1-pentene; ethylene 1-hexene; ethylene 1-octene; ethylene decene; ethylene dodecene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene 1-octene 1-pentene; ethylene 1-octene 4-methyl-1-pentene; ethylene 1-octene 1-hexene; ethylene 1-octene decene; ethylene 1-octene dodecene; combinations thereof and like permutations.

LLDPE polymers may be obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like). Representative LLDPEs produced using these catalysts generally each have a melt index of from 0.1 to 15 g/10 min, a CDBI of at least 70%, a density of from 0.910 to 0.945 g/ml, a haze value of less than 20%, a melt index ratio (MIR), $I_{21.6}/I_{2.16}$, of from 35 to 80, an averaged 1% secant modulus (M) of from 10,000 to 60,000 psi (pounds per square inch) (68.948 to 413.686 MPa), and a relation between M and the dart drop impact strength in g/mil (DIS) complying with formula (A):

$$DIS \geq 0.8 * [100 + e^{(11.71 - 0.000268M + 2.183 \times 10^{-9} M^2)}], \quad (A)$$

where "e" represents 2.7183, the base Napierian logarithm, M is the averaged modulus in psi, and DIS is the 26 inch dart impact strength.

While many prior art documents describe processes and polymers using the same monomers and similar processes, none describe polymers combining [A] good shear thinning and therefore relatively favorable extrusion and other melt processing properties with [B] a high stiffness and [C] high impact strength. Up to now these features have been difficult to combine in LLDPE (linear low density polyethylene) materials produced in a continuous gas phase process. The compositions and articles described herein provide a surprising combination of properties which can be prepared reproducibly.

In comparison to LDPE (low density polyethylene) made in a high pressure process and having a comparable density and MI, the LLDPEs of the invention have a favorable DIS-Modulus balance, e.g., a dart impact strength (DIS) in g/mil that is consistent with that predicted by formula (A) above.

In comparison with LLDPE made by a gas phase process using conventional Ziegler-Natta supported catalysts, the polyethylenes of the invention have improved shear thinning. These conventionally produced LLDPEs will have a relatively low CDBI and a poor DIS-Modulus balance, e.g., a dart impact strength in g/mil that is less than that predicted by formula (A). Further, inventive LLDPEs made using the catalysts and processes described herein exhibit superior puncture force when compared to conventionally produced LLDPEs.

In comparison to the EXCEED™ materials (made by ExxonMobil Chemical Company) produced in gas phase processes using metallocene-based supported catalysts, the LLDPEs of the invention have a better shear thinning behavior and comparable other properties. The MIR for such EXCEED materials will typically be from about 15 to about 20, most commonly from 16 to 18.

Preferably, LLDPE polymers may have either one or a combination of the following features: a density from about 0.915 to about 0.927 g/cm³, an MI from about 0.3 to about 10 g/10 min, and a CDBI of at least 75%. The DIS is preferably from about 120 to about 1000 g/mil, even more preferably, from about 150 to about 800 g/mil, and the $M_w/M_n$ by GPC is preferably from about 2.5 to about 5.5.

In some embodiments, LLDPE polymers are copolymers having a composition distribution breadth index of at least 70%, a melt index $I_{2.16}$ of from about 0.3 to about 2.0 g/10 min, a melt index ratio, $I_{21.6}/I_{2.16}$, of from about 25 to about 50, a molecular weight distribution by GPC of from about 2.5 to about 5.5, and a density of from about 0.915 to about 0.940. These LLDPE polymers may be combined with at least one additional polymer that is a high density polyethylene, a linear low density polyethylene, a low density polyethylene, a medium density polyethylene, a differentiated polyethylene, or combinations thereof. These LLDPE polymers may also be combined with at least one additional polymer that is a very low density polyethylene, an ethylene- or propylene-based polymer, a polymer derived from one or more dienes, and/or combinations thereof.

In another embodiment, LLDPE polymers are copolymers having a melt index, $I_{2.16}$ of from about 0.3 to about 1.5 g/10 min, or from about 0.5 to about 1.0 g/10 min.

In another embodiment, LLDPE polymers are copolymers having a density of from about 0.918 to about 0.930. More preferably, the copolymer has a density of from about 0.921 to about 0.928, or from about 0.918 to about 0.925. Still more preferably, the copolymer has a density of from about 0.926 to about 0.928, or from about 0.918 to about 0.922. In another embodiment the copolymer has a density of about 0.927 or about 0.920.

In another embodiment, LLDPE polymers are copolymers having a melt index ratio, $I_{21.6}/I_{2.16}$, of from about 30 to about 55. More preferably, the melt index ratio is from about 30 to about 50, or from about 35 to about 45. In some embodiments, the copolymers have a melt index ratio of from about 38 to about 42, or from about 32 to about 38.

In some embodiments, exemplary LLDPE polymers exhibit a melt index ratio according to the following formula:

$$\ln(MIR) = -18.20 - 0.2634 \ln(MI, I_{2.16}) + 23.58 \times [\text{density, g/cm}^3]$$

In a preferred embodiment the copolymer has a density of from about 0.926 to about 0.928 and a melt index ratio of from about 38 to about 42. In another preferred embodiment the copolymer has a density of from about 0.918 to about 0.922, and a melt index ratio of from about 32 to about 40.

In another preferred embodiment the copolymer has a density of from about 0.918 to about 0.922, a melt index of from about 0.3 to about 0.7 or from about 0.8 to about 1.2, and a melt index ratio of from about 30 to about 34, or from about 36 to about 40.

In another preferred embodiment the copolymer has a density of from about 0.926 to about 0.928, a melt index of from about 0.3 to about 0.7 or from about 0.8 to about 1.2, and a melt index ratio of from about 36 to about 40, or from about 40 to about 44.

In still other preferred embodiments, LLDPE polymers exhibit the following properties:

|                  | Melt Index Ratio    |                    |
|------------------|---------------------|--------------------|
| Density (gm/cc)  | Melt Index = 0.5    | Melt Index = 1.0   |
| 0.915            | ~35.1               | ~29.3              |
| 0.920            | ~38.5               | ~32.9              |
| 0.925            | ~44.5               | ~37.0              |
| 0.930            | ~50.0               | ~41.7              |
| 0.935            | ~56.3               | ~46.9              |
| 0.940            | ~63.3               | ~52.8              |

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal (M). A metallocene catalyst is considered a single site catalyst.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

The prior art is replete with examples of metallocene catalysts/systems for producing polyethylene. Useful metallocene compounds include bridged and unbridged biscyclopentadienyl zirconium compounds (particular where the Cp rings are indenyl or fluorenyl groups). Non-limiting examples of metallocene catalysts and catalyst systems useful in practicing the present invention include those described in, inter alia, WO 96/11961 and WO 96/11960, and in U.S. Pat. Nos. 4,808,561; 5,017,714; 5,055,438; 5,064,802; 5,124,418; 5,153,157, and 5,324,800. More recent examples include the catalysts and systems described in U.S. Pat. Nos. 6,380,122 and 6,376,410; WO 01/98409, and in the references cited therein, all of which are fully incorporated herein by reference.

As to the process conditions, the overall conditions described in U.S. Pat. No. 5,763,543, incorporated herein by reference, can be adopted. It is believed that a combination of particular process conditions is beneficial in making the LLDPEs described herein. In particular, it is advantageous to use a catalyst system in which the metallocene has a pair of bridged cyclopentadienyl groups, preferably with the bridge consisting of a single carbon, germanium or silicon atom so as to provide an open site on the catalytically active cation. The activator may be methyl alumoxane as described in U.S. Pat. Nos. 5,324,800; 5,580,939; and 5,633,394, incorporated herein by reference, or a noncoordinated anion as described in U.S. patent application Ser. No. 08/133,480, incorporated herein by reference. Additionally, there should be substantially no scavengers which may interfere with the reaction between the vinyl end unsaturation of polymers formed and the open active site on the cation. By the statement "substantially no scavengers" and "substantially devoid or free of Lewis acid scavengers", it is meant that there should be less than 100 ppm by weight of such scavengers present in the feed gas, or preferably, no intentionally added scavenger, such as, for example, an aluminum alkyl scavenger, other than that which may be present on the support.

The preferred conditions for the production of the LLDPEs of the invention also include steady state polymerization conditions which are not likely to be provided by batch reactions in which the amount of catalyst poisons can vary and where the concentration of the comonomer may vary in the production of the batch.

The overall continuous gas phase processes for the polymerization of the LLDPE compositions herein may therefore comprise: (1) continuously circulating a feed gas stream containing monomer and inerts to thereby fluidize and agitate a bed of polymer particles, (2) adding metallocene catalyst to the bed, and (3) removing polymer particles, in which:

a) the catalyst comprises at least one bridged bis cyclopentadienyl transition metal and an alumoxane activator on a common or separate porous support;

b) the feed gas is substantially devoid of a Lewis acidic scavenger and wherein any Lewis acidic scavenger is preferably present in an amount less than 100 ppm by weight of the feed gas;

c) the temperature in the bed is no more than 20° C. less than the polymer melting temperature as determined by DSC, at a ethylene partial pressure in excess of 60 pounds per square inch absolute (414 kPaa); and d) the removed polymer particles have an ash content of transition metal of less than 500 ppm by weight, an MI less than 10, an MIR at least 35, and substantially no detectable chain end unsaturation as determined by HNMR.

By the statement that the polymer has substantially no detectable end chain unsaturation, it is meant that the polymer has vinyl unsaturation of less than 0.1 vinyl groups per 1000 carbon atoms in the polymer, preferably less than 0.05 vinyl groups per 1000 carbon atoms, and more preferably 0.01 vinyl groups per 1000 carbon atoms or less.

The processes described above aim to provide LLDPEs via the use of a single catalyst, and the processes do not depend on the interaction of bridged and unbridged species. Preferably, the catalyst is substantially devoid of a metallocene having a pair of π-bonded ligands (e.g., cyclopentadienyl compounds) which are not connected through a covalent bridge. In other words, no such metallocene is intentionally added to the catalyst or, preferably, no such metallocene can be identified in such catalyst. Additionally, the processes use substantially a single metallocene species comprising a pair of π-bonded ligands, at least one of which has a structure with at least two cyclic fused rings (e.g., indenyl rings). Best results may be obtained by using a substantially single metallocene species comprising a monoatom silicon bridge connecting two polynuclear π-bonded ligands to the transition metal atom.

The catalyst is preferably supported on silica with the catalyst homogeneously distributed in the silica pores. Preferably, fairly small amounts of methyl alumoxane should be used, such as amounts giving an Al to transition metal ratio of from 400 to 30, and especially of from 200 to 50.

In order to obtain a desired melt index ratio, both the molar ratio of ethylene and comonomer and the concentration of the comonomer may be varied. Control of the temperature can help control the MI. Overall monomer partial pressures may be used which correspond to conventional practice for gas phase polymerization of LLDPE.

Persons having skill in the art will recognize that the above-described processes may be tailored to achieve desired LLDPE resins. For example, comonomer to ethylene concentration or flow rate ratios are commonly used to control resin density. Similarly, hydrogen to ethylene concentrations or flow rate ratios are commonly used to control resin molecular weight. In both cases, higher levels of a modifier results in lower values of the respective resin parameter. Gas concentrations may be measured by, for example, an on-line gas chromatograph or similar apparatus to ensure relatively constant composition of recycle gas streams. One skilled in the art will be able to optimize these modifier ratios and the given reactor conditions to achieve a targeted resin melt index, density, and/or other resin properties. This approach was used herein to produce the range of inventive LLDPE resins employed in the subsequent data and examples.

Additionally, the use of a process continuity aid, while not required, may be desirable in any of the foregoing processes. Such continuity aids are well known to persons of skill in the art and include, for example, metal stearates.

Polymer Blends

For the purposes of this disclosure, the following definitions will be generally applicable:

Low density polyethylene (LDPE) may be prepared in high pressure polymerization using free radical initiators, and typically has a density in the range of 0.915-0.935 g/cm$^3$. LDPE is also known as "branched" or "heterogeneously branched" polyethylene because of the relatively large number of long chain branches extending from the main polymer backbone. LDPE has been commercially manufactured since the 1930s and is well known in the art.

Polyethylene in an overlapping density range, i.e., 0.890 to 0.930 g/cm$^3$, typically from 0.915 to 0.930 g/cm$^3$, which is linear and does not contain long chain branching is also known. This "linear low density polyethylene" (LLDPE) can be produced with conventional Ziegler-Natta catalysts, vanadium catalysts, or with metallocene catalysts in gas phase reactors and/or with metallocene catalysts in slurry reactors and/or with any of the disclosed catalysts in solution reactors. The LLDPE reaction systems are relatively low pressure reactor systems. LLDPE has also been commercially manufactured for a long time (since the 1950s for solution reactors, and since the 1980s for gas phase reactors) and is also well known in the art. LLDPE known in the art and not encompassed by the description of the inventive LLDPEs above will hereinafter be referred to as "traditional LLDPE".

Very low density polyethylene (VLDPE) is a subset of LLDPE. VLDPEs can be produced by a number of different processes yielding polymers with different properties, but are generally described as polyethylenes having a density typically from 0.890 or 0.900 g/cm$^3$ to less than 0.915 g/cm$^3$. VLDPE is also well known in the art.

Relatively higher density linear polyethylene, typically in the range of 0.930 to 0.945 g/cm$^3$, while often considered to be within the scope of low density polyethylene, is also sometimes referred to as "medium density polyethylene" (MDPE). MDPE can be made in any of the above processes with each of the disclosed catalyst systems and, additionally, chrome catalyst systems. MDPEs have also been commercially manufactured for quite some time.

Polyethylene having a still greater density is referred to as "high density polyethylene" (HDPE), i.e., polyethylene having a density greater than 0.945 g/cm$^3$. HDPE is typically prepared with either Ziegler-Natta or chromium-based catalysts in slurry reactors, gas phase reactors, or solution reactors. HDPE has been manufactured commercially for a long time (since the 1950s in slurry systems) and is well known in the art. "Medium-high molecular weight HDPE" is hereinafter defined as HDPE having a Melt Index (MI) ranging from about 0.1 g/10 min to about 1.0 g/10 min.

A further class of polyethylene polymers is "differentiated polyethylene" (DPE). Differentiated polyethylenes are defined herein as those polyethylene polymers that comprise polar comonomers or termonomers. Typical DPEs are well known in the art and include, but are not limited to, ethylene polymers comprising ethylene n-butyl acrylate, ethylene methyl acrylate acid terpolymers, ethylene acrylic acid, ethyl methyl acrylate, zinc or sodium neutralized ethylene acid copolymers, ethylene vinyl acetate, and combinations of the foregoing.

Nothing with regard to these definitions is intended to be contrary to the generic definitions of these resins that are well known in the art. It should be noted, however, that LLDPE may refer to a blend of more than one LLDPE grade/type. Similarly, HDPE may refer to a blend of more than one HDPE grade/type, LDPE may refer to a blend of more than one LDPE grade/type, etc. Generally preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the EXACT™, EXCEED™, ESCORENE™, EXXCO™, ESCOR™, ENABLE™, NTX™, PAXON™, and OPTEMA™ tradenames.

If any of the resins described herein is produced using a single-site catalyst, it may be (but is not necessarily) identified by the use of an initial lower case "m". For example, single-site catalyzed linear low density polyethylene manufactured in a gas phase reactor may be abbreviated "mLLDPE". As used herein, the term "single-site catalyzed polymer" refers to any polymer, copolymer, or terpolymer, and, in particular, any polyolefin polymerized using a single-site catalyst and is used interchangeably with the term "metallocene catalyzed polymer," wherein both "metallocene catalyzed polymer" and "single-site catalyzed polymer" are meant to include non-metallocene catalyzed single-site catalyzed polymers. As used herein, the term "Ziegler-Natta catalyzed polymer" refers to any polymer, copolymer, or terpolymer, and, in particular, any polyolefin polymerized using a Ziegler-Natta catalyst.

The LLDPE, HDPE, MDPE, LDPE, and DPE contemplated in certain embodiments include ethylene homopolymers and/or ethylene α-olefin copolymers. By "copolymers" is meant combinations of ethylene and one or more α-olefins. In general, the α-olefin comonomers can be selected from those having 3 to 20 carbon atoms, such as $C_3$-$C_{20}$ α-olefins or $C_3$-$C_{12}$ α-olefins. Suitable α-olefin comonomers can be linear or branched or may include two unsaturated carbon-carbon bonds (dienes). Two or more comonomers may be used, if desired. Examples of suitable comonomers include linear $C_3$-$C_{12}$ α-olefins and α-olefins having one or more $C_1$-$C_3$ alkyl branches or an aryl group. Particularly preferred comonomers are 1-butene, 1-hexene, and 1-octene. Specific comonomer examples include propylene; 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Specifically, the combinations of ethylene with a comonomer may include: ethylene 1-butene; ethylene 1-pentene; ethylene 4-methyl-1-pentene; ethylene 1-hexene; ethylene 1-octene; ethylene decene; ethylene dodecene; ethylene 1-butene 1-hexene; ethylene 1-butene 1-pentene; ethylene 1-butene 4-methyl-1-pentene; ethylene 1-butene 1-octene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene propylene 1-octene; ethylene 1-octene 1-butene; ethylene 1-octene 1-pentene; ethylene 1-octene 4-methyl-1-pentene; ethylene 1-octene 1-hexene; ethylene 1-octene decene; ethylene 1-octene dodecene; combinations thereof and like permutations. It should be appreciated that the foregoing list of comonomers and comonomer combinations are merely exemplary and are not intended to be limiting.

If a comonomer is used, the monomer is generally polymerized in a proportion of from 50.0 to 99.9 wt % of monomer, preferably, from 70 to 99 wt % of monomer, and more preferably, from 80 to 98 wt % of monomer, with from 0.1 to 50 wt % of comonomer, preferably, from 1 to 30 wt % of comonomer, and more preferably, from 2 to 20 wt % of comonomer. For linear polyethylenes, the actual amount of comonomers, comonomer distribution along the polymer backbone, and comonomer branch length will generally define the density range.

LLDPE-HDPE Blends

In some embodiments, compositions described herein include a blend of an LLDPE polymer and an HDPE polymer. The blend can include any of the inventive LLDPE polymers described herein, preferably, a metallocene-catalyzed LLDPE polymer, and, more preferably, a gas-phase produced metallocene-catalyzed LLDPE polymer. The blends can include any of the HDPE polymers described herein, preferably, a metallocene-catalyzed HDPE polymer, including those produced in gas phase, slurry, and/or solution processes.

The blends include at least 0.1 wt % and up to 99.9 wt % of the LLDPE polymer, and at least 0.1 wt % and up to 99.9 wt % of the HDPE polymer, with these wt % based on the total weight of the LLDPE and HDPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the HDPE polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm$^3$, and a molecular weight distribution of from about 2.5 to about 5.5. The blend further comprises an HDPE having a density greater than about 0.945 g/cm$^3$.

In any of these embodiments, the LLDPE polymer, the HDPE polymer, or both can be blends of such polymers. For example, the LLDPE polymer component of the blend can itself be a blend of two or more LLDPE polymers having the characteristics described herein, and alternatively or additionally, the HDPE polymer component of the blend can itself be a blend of two or more HDPE polymers having the characteristics described herein.

LLDPE-MDPE Blends

In some embodiments, compositions described herein include a polymer blend composed of an LLDPE polymer and an MDPE polymer. The blend can include any of the inventive LLDPE polymers described herein, preferably a metallocene-catalyzed LLDPE polymer, and more preferably a gas-phase produced metallocene catalyzed LLDPE polymer. The blends may further include any of the MDPE polymers described herein, preferably a metallocene-catalyzed MDPE polymer, including those produced in gas phase, slurry, and/or solution processes.

The blends include at least 0.1 weight percent and up to 99.9 weight percent of the LLDPE polymer, and at least 0.1 weight percent and up to 99.9 weight percent of the MDPE polymer, with these weight percents based on the total weight of the LLDPE and MDPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the MDPE polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm$^3$, and a molecular weight distribution of from about 2.5 to about 5.5. The blend further comprises an MDPE having a density from about 0.930 g/cm³ to about 0.945 g/cm³.

In any of these embodiments, the LLDPE polymer, the MDPE polymer, or both, can be blends of such polymers. For example, the LLDPE polymer component of the blend can itself be a blend of two or more LLDPE polymers having the characteristics described herein, and alternatively or additionally, the MDPE polymer component of the blend can itself be a blend of two or more MDPE polymers having the characteristics described herein.

LLDPE-LDPE Blends

In some embodiments, the compositions described herein include a polymer blend composed of an LLDPE polymer and an LDPE polymer. The blend can include any of the inventive LLDPE polymers described herein, preferably a metallocene-catalyzed LLDPE polymer, and more preferably a gas-phase produced metallocene-catalyzed LLDPE polymer. The blends can include any of the LDPE polymers described herein, including those produced in high pressure processes.

The blends include at least 0.1 weight percent and up to 99.9 wt % of the LLDPE polymer, and at least 0.1 wt % and up to 99.9 wt % of the LDPE polymer, with these wt % based on the total weight of the LLDPE and LDPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the LDPE polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm³, and a molecular weight distribution of from about 2.5 to about 5.5. The blend further comprises an LDPE having a density between about 0.915 g/cm³ to about 0.935 g/cm³.

In any of these embodiments, the LLDPE polymer, the LDPE polymer, or both, can be blends of such polymers. For example, the LLDPE polymer component of the blend can itself be a blend of two or more LLDPE polymers having the characteristics described herein, and alternatively or additionally, the LDPE polymer component of the blend can itself be a blend of two or more LDPE polymers having the characteristics described herein.

LLDPE-LLDPE Blends

In some embodiments, compositions include a polymer blend composed of a first LLDPE polymer and a second LLDPE polymer. The first LLDPE of the blend can include any of the inventive LLDPE polymers described herein, preferably a metallocene-catalyzed LLDPE polymer, and more preferably, a gas-phase produced metallocene-catalyzed LLDPE polymer. The second LLDPE of the blend can include any of the traditional LLDPE polymers described herein, preferably, a metallocene-catalyzed LLDPE polymer, including those produced in low pressure, gas phase, and/or slurry processes.

The blends include at least 0.1 wt % and up to 99.9 wt % of the first LLDPE polymer, and at least 0.1 wt % and up to 99.9 wt % of the second LLDPE polymer, with these weight percents based on the total weight of the first and second LLDPE polymers of the blend. Alternative lower limits of the first LLDPE polymer can be 5%, 10%, 20%, 30% or 40% by weight. Alternative upper limits of the first LLDPE polymer can be 95%., 90%, 80%, 70%, or 60% by weight. Ranges from any lower limit to any upper limit are within the scope of the invention. Preferred blends include from 5-85%, alternatively from 10-50% or from 10-30% by weight of the first LLDPE polymer. The balance of the weight percentage is the weight of the second LLDPE polymer component.

In one preferred embodiment, the polymer blend includes a metallocene-catalyzed first LLDPE copolymer comprising units derived from ethylene and one or more $C_3$ to $C_{20}$ α-olefin comonomers. The first LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm³, and a molecular weight distribution of from about 2.5 to about 5.5. The blend further comprises a second LLDPE having a density from about 0.910 to about 0.940 g/cm³.

In any of these embodiments, the first LLDPE polymer, the second LLDPE polymer, or both, can be blends of such polymers. For example, the first LLDPE polymer component of the blend can itself be a blend of two or more inventive LLDPE polymers having the characteristics described herein, and alternatively or additionally, the second polymer component of the blend can itself be a blend of two or more traditional LLDPE polymers having the characteristics described herein.

LLDPE-VLDPE Blends

In some embodiments, compositions described herein include a polymer blend composed of an LLDPE polymer and a VLDPE polymer. The blend can include any of the inventive LLDPE polymers described herein, preferably a metallocene-catalyzed LLDPE polymer, and more preferably a gas-phase produced metallocene-catalyzed LLDPE polymer. The blends can include any of the VLDPE polymers described herein, preferably a metallocene-catalyzed VLDPE polymer, including those produced in gas phase, slurry, and/or solution processes.

The blends include at least 0.1 wt % and up to 99.9 wt % of the LLDPE polymer, and at least 0.1 wt % and up to 99.9 wt % of the VLDPE polymer, with these weight percents based on the total weight of the LLDPE and VLDPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the VLDPE polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm³, and a molecular weight distribution of from about 2.5 to about 5.5. The blend further comprises a VLDPE having a density less than about 0.915 g/cm³.

In any of these embodiments, the LLDPE polymer, the VLDPE polymer, or both, can be blends of such polymers.

For example, the LLDPE polymer component of the blend can itself be a blend of two or more LLDPE polymers having the characteristics described herein, and alternatively or additionally, the VLDPE polymer component of the blend can itself be a blend of two or more VLDPE polymers having the characteristics described herein.

LLDPE-DPE Blends

In some embodiments, compositions described herein include a polymer blend composed of an LLDPE polymer and a DPE polymer. The blend can include any of the inventive LLDPE polymers described herein, preferably a metallocene-catalyzed LLDPE polymer, and more preferably a gas-phase produced metallocene-catalyzed LLDPE polymer. Exemplary DPEs suitable for use in the blends of the present invention include, but are not limited to, ethylene n-butyl acrylate, ethylene methyl acrylate acid terpolymers, ethylene acrylic acid, ethyl methyl acrylate, zinc or sodium neutralized ethylene acid copolymers, ethylene vinyl acetate, and combinations of the foregoing.

The blends include at least 0.1 wt % and up to 99.9 wt % of the LLDPE polymer, and at least 0.1 wt % and up to 99.9 wt % of the DPE polymer, with these weight percents based on the total weight of the LLDPE and DPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the DPE polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm$^3$, and a molecular weight distribution of from about 2.5 to about 5.5. The blend further comprises a DPE.

In any of these embodiments, the LLDPE polymer, the DPE polymer, or both, can be blends of such polymers. For example, the LLDPE polymer component of the blend can itself be a blend of two or more LLDPE polymers having the characteristics described herein, and alternatively or additionally, the DPE polymer component of the blend can itself be a blend of two or more DPE polymers having the characteristics described herein.

Other LLDPE Blends

In further embodiments, compositions described herein include a polymer blend composed of an LLDPE polymer and a second polymer. Use of the term "polymer" is meant to include copolymers and terpolymers. The blend can include any of the inventive LLDPE polymers described herein, preferably a metallocene-catalyzed LLDPE polymer, and more preferably a gas-phase produced metallocene catalyzed LLDPE polymer. Other polymers that may be blended with the LLDPE include, but are not limited to, other ethylene-based polymers, propylene-based polymers, propylene ethylene copolymers, polymers derived from dienes, and combinations of the foregoing. For example, the inventive LLDPEs described herein may be blended with a polymer or polymers derived from conjugated and non-conjugated dienes, such as, for example, (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene, tetracyclo-(δ-11,12)-5,8-dodecene, and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2,2,1)-hepta-2,5-diene; alkenyl, alkylidene, cycloalkenyl and cycloalkylidene norbornenes, such as 5-methylene-2-norbornene (MNB), 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexane, vinyl cyclooctene, 4-vinyl cyclohexene, allyl cyclodecene, and vinyl cyclododecene. Persons of ordinary skill in the art will recognize that a wide variety of polymers, including copolymers, terpolymers, and polymer blends may be blended with the inventive LLDPEs described herein to meet the stated goals of the invention. Such additional blend components, though not particularly described herein, are within the scope and intended spirit of the invention.

The blends include at least 0.1 weight percent and up to 99.9 weight percent of the LLDPE polymer, and at least 0.1 weight percent and up to 99.9 weight percent of a second polymer, with these weight percents based on the total weight of the LLDPE and second polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the second polymer component.

In one preferred embodiment, the polymer blend includes a metallocene-catalyzed LLDPE copolymer comprising units derived from ethylene and one or more $C_3$ to $C_{20}$ α-olefin comonomers. The LLDPE has a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm$^3$, and a molecular weight distribution of from about 2.5 to about 5.5. The blend further comprises a second polymer.

In any of these embodiments, the LLDPE polymer, the second polymer, or both, can be blends of such polymers. For example, the LLDPE polymer component of the blend can itself be a blend of two or more LLDPE polymers having the characteristics described herein, and alternatively or additionally, the second polymer component of the blend can itself be a blend having the characteristics described herein.

Preparation of Blends

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba- Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc and the like.

End-Use Applications

Any of the foregoing LLDPE compositions or LLDPE blends may be used in a variety of end-use applications. End use applications include any article containing LLDPE compositions or LLDPE blends. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof, each of which is described in more detail in the following paragraphs. End uses also include products made from films, e.g., bags, packaging, and personal care films, pouches, medical products, such as for example, medical films and intravenous (IV) bags.

Films

Films include monolayer or multilayer films prepared with, or incorporating, LLDPE compositions or LLDPE blends. Films includes those film structures and film applications known to those skilled in the art.

Specific end use films include, for example, cast films, stretch films, stretch/cast films, stretch cling films, stretch handwrap films, machine stretch wrap, shrink films, shrink wrap films, green house films, laminates, and laminate films. Exemplary films are prepared by any conventional technique known to those skilled in the art, such as for example, techniques utilized to prepare blown, extruded, and/or cast stretch and/or shrink films (including shrink-on-shrink applications).

In one embodiment, monolayer films are prepared from LLDPE polymers or blends thereof. These films may be formed by any number of well known extrusion or coextrusion techniques discussed below. Films may be unoriented, uniaxially oriented or biaxially oriented. Physical properties of the film may vary depending on the film forming techniques used.

In another embodiment, multilayer films are prepared from LLDPE polymers or blends thereof. Multiple-layer films may be formed by methods well known in the art. The total thickness of multilayer films may vary based upon the application desired. A total film thickness of about 5-100 µm, more typically about 10-50 µm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five or seven layers.

When used in multilayer films, the LLDPE polymer blends may be used in any layer of the film, or in more than one layer of the film, as desired. When more than one layer of the film is formed of an LLDPE polymer blend, each such layer can be individually formulated; i.e., the layers formed of the LLDPE polymer blend can be the same or different chemical composition, density, melt index, thickness, etc., depending upon the desired properties of the film.

To facilitate discussion of different film structures, the following notation is used herein. Each layer of a film is denoted "A" or "B", where "A" indicates a conventional film layer as defined below, and "B" indicates a film layer formed of any of the LLDPE polymers or blends described herein. Where a film includes more than one A layer or more than one B layer, one or more prime symbols (', '', ''', etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of an LLDPE polymer blend disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20. Exemplary conventional films are described, for example, in U.S. Pat. Nos. 6,423,420, 6,255,426, 6,265,055, 6,093,480, 6,083,611, 5,922,441, 5,907,943, 5,907,942, 5,902,684, 5,814,399, 5,752,362, 5,749,202, RE 38,658, RE 38,429, WO 2005/065945, each of which is incorporated by reference in its entirety.

For the various films described herein, the "A" layer can be formed of any material known in the art for use in multilayer films or in film-coated products. Thus, for example, the A layer can be formed of a polyethylene homopolymer or copolymer, and the polyethylene can be, for example, a VLDPE, an LDPE, an LLDPE, an MDPE, an HDPE, or a DPE, as well as other polyethylenes known in the art. The polyethylene can be produced by any suitable process, including metallocene-catalyzed processes and Ziegler-Natta catalyzed processes. Further, the A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

The "B" layer is formed of an LLDPE polymer or blend, and can be any of such blends described herein. In one embodiment, the B layer is formed of a blend of (a) from 0.1 to 99.9 wt % of a first polymer selected from the group consisting of very low density polyethylene, medium density polyethylene, differentiated polyethylene, and combinations thereof, and (b) from 99.9 to 0.1 wt % of a second polymer comprising a copolymer derived from ethylene and one or more $C_5$ to $C_{12}$ α-olefin comonomers. The copolymer of (b) is characterized by a comonomer content of from about 2 to about 20 wt %, a composition distribution breadth index of at least 70%, a melt index $I_{2.16}$ of from about 0.1 to about 15 g/10 min, a density of from about 0.910 to about 0.945 g/cm³, and a molecular weight distribution of from about 2.5 to about 5.5. In preferred embodiments, the polymer of (a) is different from the polymer of (b).

The thickness of each layer of the film, and of the overall film, is not particularly limited, but is determined according to the desired properties of the film. Typical film layers have a thickness of from about 1 to about 1000 μm, more typically from about 5 to about 100 μm, and typical films have an overall thickness of from about 10 to about 100 μm.

In one embodiment, the present invention provides a single-layer (monolayer) film formed of any of the LLDPE polymers or blends described herein; i.e., a film having a single layer which is a B layer as described above.

In other embodiments, and using the nomenclature described above, the present invention provides multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'''; (d) five-layer films, such as A/A'/A"/A'''/B, A/A'/A"/B/A''', A/A'/A"/B/B', A/A'/B/A"/B', A/A'/B/B'/A", A/A'/B/B'/B", A/B/A'/B'/A", A/B/A'/A"/B, B/A/A'/A"/B', A/A'/B/B'/B", A/B/A'/B'/B", A/B/A'/B'/B"', A/B/B'/B"/A', B/A/A'/B'/B", A/B/B'/B"/B''', B/A/B'/B"/A', A/B/B'/B"/B''', B/A/B'/B"/B''', B/B'/A/B", B/A/B'/B"/B''', and B/B'/B"/B'''/B""; and similar structures for films having six, seven, eight, nine, twenty-four, forty-eight, sixty-four, one hundred, or any other number of layers. It should be appreciated that films having still more layers can be formed using the LLDPE polymers or blends of the invention, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films of the LLDPE polymer blends of the present invention can also be used as coatings; e.g., films formed of the inventive polymers or polymer blends, or multilayer films including one or more layers formed of the inventive polymers or polymer blends, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in or modifiers applied to each layer.

In one aspect, films containing the polymers and polymer blend compositions, monolayer or multilayer, may be formed by using casting techniques, such as a chill roll casting process. For example, a composition can be extruded in a molten state through a flat die and then cooled to form a film. As a specific example, cast films can be prepared using a cast film line machine as follows. Pellets of the polymer are melted at a temperature typically ranging from about 275° C. to about 325° C. for cast LLDPE resins (depending upon the particular resin used), with the specific melt temperature being chosen to match the melt viscosity of the particular resin layers. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box, edge pinners, air knife, or a combination of the foregoing can be used to pin the melt exiting the die opening to a primary chill roll maintained at about 80° F. (32° C.). The resulting polymer film is collected on a winder. The film thickness can be monitored by a gauge monitor, and the film can be edge trimmed by a trimmer. A typical cast line rate is from about 250 to about 2000 feet (76.2 to about 609.6 m) per minute. One skilled in the art will appreciate that higher rates may be used for similar processes such as extrusion coating. One or more optional treaters can be used to surface treat the film, if desired. Such chill roll casting processes and apparatus are well known in the art, and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

In another aspect, films containing the polymers and polymer blend compositions, monolayer or multilayer, may be formed using blown techniques, i.e., to form a blown film. For example, the composition can be extruded in a molten state through an annular die and then blown and cooled to form a tubular, blown film, which can then be axially slit and unfolded to form a flat film. As a specific example, blown films can be prepared as follows. The polymer blend composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 175° C. to about 225° C. Blown film rates are generally from about 5 to about 30 lbs per hour per inch (4.35 to about 26.11 kilograms per hour per centimeter) of die circumference. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

Stretch Films

LLDPE compositions or LLDPE blends are utilized to prepare stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

It is desirable to maximize the degree to which a stretch film is stretched, as expressed by the percent of elongation of the stretched film relative to the unstretched film, and termed the "stretch ratio." At relatively larger stretch ratios, stretch films impart greater holding force. Further, films which can be used at larger stretch ratios with adequate holding force and film strength offer economic advantages, since less film is required for packaging or bundling.

As stretch film is stretched, a small decrease in the film thickness due to small fluctuations in thickness uniformity can result in a large fluctuation in elongation, giving rise to bands of weaker and more elongated film transverse to the direction of stretching, a defect known as "tiger striping". Thus, it is desirable to have a yield plateau slope large enough to avoid tiger striping over typical thickness variations of, for example, ±5%. For robust operation over a wide range of elongation, and using a wide variety of stretching apparatus, it is desirable to have a broad yield plateau region. In addition, since the extent of elongation correlates inversely with the amount of film that must be used to bundle an article, it is desirable for the film to be stretchable to a large elongation. While in principle the elongation at break is the maximum possible elongation, in practice, the natural draw ratio is a better measure of maximum elongation. Thus, it is desirable to have a large natural draw ratio. Other desirable properties, not illustrated in a stress-elongation curve, include high cling force and good puncture resistance.

The above-described polyethylene resins are particularly suitable for stretch film applications. It has been surprisingly found that films of the invention exhibit improved properties, such as applicability over a wide range of stretch ratios without suffering from local deformation leading to break, hole formation, tiger striping, or other defects. Films prepared with LLDPE compositions or LLDPE blends also show higher holding force than conventional films of the same film thickness.

Stretch films can be provided so that an end user stretches the film upon application to provide a holding force, or can be provided in a pre-stretched condition. Such pre-stretched films, also included within the term "stretch film", are stretched and rolled after extrusion and cooling, and are provided to the end user in a pre-stretched condition, so that the film upon application provides a holding force by applying tension without the need for the end user to further stretch the film.

Additives can be provided in the various film layers, as is well-known in the art. For stretch film applications, an additive such as a tackifier can be used in one or more layers to provide a cling force. Suitable tackifiers and other additives are well-known. Suitable tackifiers include any known tackifier effective in providing cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate and sorbitan monooleate. The tackifier, if used, can be used in any concentration which will impact the desired cling force, typically from 0.1 to 20% by weight and more typically from 0.25 to 6.0% by weight. Tackifiers can be used in monolayer films or in multiple layer films. In multiple layer films, a tackifier can be added to both outer layers to provide a stretch film having two-sided cling, or in only one outer layer, to provide a stretch film having one-sided cling.

Some resins and blends described herein may also be suited for use in stretch handwrap films. Stretch film handwrap requires a combination of excellent film toughness, especially puncture, MD tear performance, dart drop performance, and a very stiff, i.e., difficult to stretch, film. Film 'stiffness' minimizes the stretch required to provide adequate load holding force to a wrapped load and to prevent further stretching of the film. The film toughness is required because handwrap loads (being wrapped) are typically more irregular and frequently contain greater puncture requirements than typical machine stretch loads. In some embodiments, stretch handwrap films exhibit a Highlight ultimate stretch force greater than or equal to about 75 pounds (333.617 N), preferably greater than or equal to 85, 100, or 125 pounds (378.099 N, 444.822 N, or 556.028 N). Further, in some embodiments, the stretch handwrap films exhibit a puncture peak force greater than or equal to about 9 pounds (40.034 N), preferably greater than or equal to about 10 or 11 pounds (44.822 or 48.930 N). In some embodiments, the films are downgauged stretch handwrap films.

In some embodiments stretch film handwrap is typically used at lower stretch levels than machine stretch films. Film stretch capability is indicated by MD Tensile Natural Draw Ratio or by Highlight Ultimate Stretch which are preferably less than 250%, more preferably less than 200% and still more preferably less than 100% stretch for handwrap films. The 'stiffness' of handwrap films is indicated by MD Tensile values at low stretch such as 50% or 100% stretch. Tough films are preferred because handwrap loads are typically more irregular and frequently contain greater puncture requirements than typical machine stretch loads.

In some embodiments, stretch cling films are formed from the LLDPE polymers and polymer blends described herein. These stretch cling films may be monolayer or multilayer, with one or more layer comprising the LLDPE polymers or blends described herein. In some embodiments, the films are co-extruded and comprise a layer comprising the LLDPE polymers or blends described herein, along with one or more layers of traditional Ziegler-Natta or metallocene catalyzed LLDPE, which may optionally include a comonomer such as, for example, hexene or octene. Stretch cling films typically have a Highlight ultimate stretch greater than or equal to about 250% or 300%. Preferably, the films have a Highlight ultimate stretch greater than or equal to about 375% or 450%. Similarly, stretch cling films may have a Highlight stretch force greater than or equal to about 90 pounds (400.340 N), or preferably greater than or equal to about 100 or 110 pounds (444.822 or 489.304 N).

In some embodiments, stretch films have at least one layer formed of or including a polyethylene copolymer, the film having a natural draw ratio of at least 250%, a tensile stress at the natural draw ratio of at least 22 MPa, and a tensile stress at second yield of at least 12 MPa, where tensile stress is the machine direction stress as determined by ASTM D882. In one aspect of this embodiment, the polyethylene copolymer can have a CDBI of at least 70%, a melt index $I_{2.16}$ of from 0.1 to 15 g/10 min., a density of from 0.910 to 0.940 g/cm³, a melt index ratio $I_{21.6}/I_{2.16}$ of from 30 to 80, and an Mw/Mn ratio of from 2.5 to 5.5. In another aspect of this embodiment, a monolayer film formed of the polyethylene copolymer has a dart impact strength D, a modulus M, where M is the arithmetic mean of the machine direction and transverse direction 1% secant moduli, and a relation between D in g/μm and M in MPa such that:

$$D \geq 0.0315[100 + e^{(11.71 - 0.03887M + 4.592 \times 10^{-5}M^2)}].$$

Exemplary films are provided in copending U.S. patent application Ser. No. 10/646,239, which is herein incorporated by reference in its entirety.

In another embodiment, the invention provides a multilayer stretch film including a first surface layer, a second surface layer, and a core layer disposed between the first and second surface layers, wherein the core layer is formed of or includes a polyethylene copolymer, the film having a natural draw ratio of at least 250%, a tensile stress at the natural draw ratio of at least 22 MPa, and a tensile stress at second yield of at least 12 MPa, where tensile stress is the machine direction stress as determined by ASTM D882.

Shrink Films

LLDPE compositions or LLDPE blends are utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in International Patent Publication WO 2004/022646, which is herein incorporated by reference in its entirety.

Industrial shrink films are commonly used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40. The main structural component of such industrial shrink films is 20 typically high pressure, low density polyethylene (LDPE), often blended with up to about 30 weight percent of linear low density polyethylene (LLDPE) to reduce problems of hole formation during shrinkage. Typical LDPEs used have a melt index of about 0.2 to 0.5, and LLDPEs used have a melt index of about 0.5 to 1.

Retail films are commonly used for packaging and/or bundling articles for consumer use, such as, for example, in supermarket goods. Such films are typically formed in a single bubble blown extrusion process to a thickness of about 35 to 80, μm, with a typical MD:TD shrink ratio of about 80:20. Typical films are formed of LDPE/LLDPE blends, with the LDPE component having a 30 melt index of about 0.5 to 1.

One use for films made from the polymers and/or blends described herein is in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

In one embodiment, shrink films include a polymer blend including a polyethylene copolymer having a CDBI of at least 70%, a melt index $I_{2.16}$ of from 25 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The polymer blend is particularly suitable for use as a film resin for heat-shrinkable films.

In another embodiment, shrink films include a heat-shrinkable monolayer film formed of or including a blend of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The heat-shrinkable monolayer film may have a clarity value of at least 10% and a puncture resistance damaging energy value of at least 40 mJ/pm.

In another embodiment, the invention provides a heat-shrinkable multilayer film. The multilayer film has at least one layer formed of or including a blend of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5; and a low density polyethylene (LDPE). The multilayer heat-shrinkable film has a clarity value of at least 20% and a puncture resistance damaging energy value of at least 100 mJ/lm.

In another embodiment, the invention provides a heat-shrinkable film having at least one layer of a polyethylene copolymer having a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5. In this embodiment, the polyethylene copolymer is not blended with another polymer, except that minor amounts of conventional additives such as antioxidants, UV-stabilizers and processing aids can be used, some of which may be polymeric. In this embodiment, the film has a clarity value of at least 10% and a puncture resistance damaging energy value of at least 100 mJ/lm.

In some embodiments, shrink films include an additional polymer component, such as, for example, a high density polyethylene (HDPE).

Greenhouse Films

LLDPE compositions or LLDPE blends are utilized to prepare greenhouse films. Greenhouse films described herein include those greenhouse film structures known to those skilled in the art. Greenhouse films are generally heat retention films that, depending on climate requirements, retain different amounts of heat. Less demanding heat retention films are used in warmer regions or for spring time applications. More demanding heat retention films are used in the winter months and in colder regions.

Further end-use product applications may also include surface protection applications, with or without stretching, such as in the temporary protection of surfaces during manufacturing, transportation, etc. There are many potential applications of articles and films produced from the polymer blend compositions described herein.

The LLDPE resins and blends prepared as described herein are also suited for the manufacture of blown film in a high-stalk extrusion process. In this process, a polyethylene melt is fed through a gap (typically 30-50 μm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 0.5 to 2 mils and by a development of biaxial orientation in the film. The expanded tube is rapidly cooled (which induces crystallization of the polymer), collapsed between a pair of nip rolls and wound onto a film roll.

Two factors are useful to determine the suitability of a particular polyethylene resin or blend for high stalk extrusion: the maximum attainable rate of film manufacture and mechanical properties of the formed film. Adequate processing stability is desired at throughput rates of up to 15 lb/hr/ inch (1306 kilograms per hour per centimeter) die and high linespeeds (>200 ft/min (609.6 m)) for thin gauge manufacture on modern extrusion equipment. The resins and blends produced as described herein have molecular characteristics which allow them to be processed successfully at these high speeds. Mechanical strength of the film is different in two film directions, along the film roll (machine direction, MD) and in the perpendicular direction (transverse direction, TD). Typically, the TD strength in such films is significantly higher than their MD strength. The films manufactured from the resins prepared in the processes and the catalysts described herein have a favorable balance of the MD and TD strengths.

Films comprising the polymers and blends described herein show improved performance and mechanical properties when compared to films previously known in the art. For example, films containing the LLDPE polymers and blends described herein have improved shrink properties, better clarity, good seal strength and hot tack performance, increased toughness, and lower coefficient of friction. In addition, such films may also exhibit higher ultimate stretch and typically have better processability when compared with other LLDPE resins and blends.

Bags

Bags are prepared with, or incorporate, LLDPE compositions or LLDPE blends. Bags include those bag structures and bag applications known to those skilled in the art. Exemplary bags include shipping sacks, trash bags and liners, industrial liners, produce bags, and heavy duty bags.

In some embodiments, LLDPE compositions or LLDPE blends are utilized to prepare heavy duty bags. Heavy duty bags are prepared by techniques known to those skilled in the art, such as for example, vertical form fill and seal equipment. Exemplary conventional heavy duty bags and the apparatus utilized to prepare them are disclosed in U.S. Patent Application Publication 2006/0188678 and U.S. Pat. Nos. 4,571,926, 4,532,753, 4,532,752, 4,589,247, 4,506,494, and 4,103,473, each of which is herein incorporated by reference in its entirety.

Packaging

Packaging is prepared with, or incorporates, LLDPE compositions or LLDPE blends. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers and various like goods normally containerized and/or palletized for shipping, storage, and/or display.

Blow Molded Articles

The resins and blends described herein are also suitable for use in blow molding processes. Such processes are well known in the art, and involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

In some embodiments, the presently described resins and blends may be used to form injection molded articles. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Extrusion coating is a plastic fabrication process in which molten polymer is extruded and applied onto a non-plastic support, such as paper or aluminium in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls.

Extrusion coating materials are typically used in food and non-food packaging, pharmaceutical packaging, and manufacturing of goods for the construction (insulation elements) and photographic industries (paper).

Foamed Articles

In some embodiments, the resins and blends described herein may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, electric, and manufacturing.

Wire and Cable Applications

Also provided are electrical devices including one or more layers formed of or containing any of the LLDPE polymers or polymer blend compositions described herein. Such devices include, for example, power cables, telecommunications cables or data transmission cables, and combined power/telecommunications cables. As used herein, the terms "telecommunications cable" and "data cable" are used interchangeably. When the electrical device is a power cable, it can be a low voltage cable, i.e., a device adapted to transport electricity at a voltage potential of less than or equal to 1 kV or alternatively, less than or equal to 6 kV; a medium voltage cable, i.e., a device adapted to transport electricity at a voltage potential of from a lower limit of greater than 1 kV or greater than 6 kV to an upper limit of less than or equal to 35 kV or less than or equal to 66 kV; or a high voltage cable; i.e., a device adapted to transport electricity at a voltage potential of greater than 35 kV or greater than 66 kV. It should be appreciated that the designations "low voltage", "medium voltage" and "high voltage", as commonly used in the art, sometimes overlap; for example, a 4 kV cable is sometimes termed "low voltage" and sometimes termed "medium voltage." The range of suitable voltages, and in particular the upper voltage limit, can be used alternatively to characterize a power cable without resort to low/medium/high designations.

In any of the embodiments herein, the wire and/or cable coating compositions can be essentially the neat LLDPE resin or LLDPE blend, or can further include conventional additives, such as anti-oxidants, fillers, processing co-adjuvants, lubricants, pigments, and/or water-free retardant additives. Further, polymer blends are also contemplated, such as blends of the polymers and blends described herein that further comprise polyolefin homopolymers or copolymers, olefin-ester copolymers, polyesters, polyethers, polyether-polyester copolymers and mixtures thereof. Specific examples of polymers that can be included in such polymer mixtures include other polyethylenes, polypropylenes, propylene-ethylene thermoplastic copolymers, ethylene-propylene rubbers, ethylene-propylene-diene rubbers, natural rubbers, butyl rubbers, ethylene-vinyl acetate (EVA) copolymers, ethylene-methyl acrylate (EMA) copolymers, ethylene-ethyl acrylate (EEA) copolymers, ethylene-butyl acrylate (EBA) copolymers, and ethylene-α-olefin copolymers.

Suitable fillers include inorganic oxides, or inorganic oxides in hydrate or hydroxide form. Examples include oxides or hydroxides of aluminum, bismuth, cobalt, iron, magnesium, titanium and zinc, and the corresponding hydrate forms. Hydroxides are generally used in the form of coated particles, wherein the coating is typically a saturated or unsaturated $C_8$ to $C_{24}$ fatty acid or a salt thereof, such as, for example, oleic acid, palmitic acid, stearic acid, isostearic acid, lauric acid, magnesium stearate, magnesium oleate, zinc stearate, or zinc oleate. Other suitable fillers include glass particles, glass fibers, calcined kaolin and talc.

Typical antioxidants include, for example, polymerized trimethyldihydroquinoline, 4,4'-thiobis(3-methyl-6-tert-butyl)phenol; pentaerythryl-tetra[3-(3,5-ditert-butyl-4-hydroxyphenyl)propionate], and 2,2'-thiodiethylene-bis[3-(3,5-di-tertbutyl-4-hydroxyphenyl)propionate].

Typical processing co-adjuvants include, for example, calcium stearate, zinc stearate, stearic acid, and paraffin wax.

Electrical devices described herein can be formed by methods well known in the art, such as by one or more extrusion coating steps in a reactor/extruder equipped with a cable die, and subsequent moisture cure. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

In other embodiments, also provided are:

A. A polymer composition comprising from about 0.1 to about 99.9 wt % of a polymer comprising a copolymer derived from ethylene and one or more $C_3$ to $C_{20}$ α-olefin comonomers, said copolymer having;
    i. a composition distribution breadth index of at least 70%,
    ii. a melt index $I_{2.16}$ of from about 0.3 to about 2.0 g/10 min,
    iii. melt index ratio, $I_{21.6}/I_{2.16}$, of from about 25 to about 50,
    iv. a molecular weight distribution of from about 2.5 to about 5.5, and
    v. a density of from about 0.915 to about 0.940.

B. The polymer composition of embodiment A, further comprising at least one additional polymer.

C. The polymer composition of embodiment B, wherein the at least one additional polymer is selected from the group consisting of high density polyethylene, linear low density polyethylene, low density polyethylene, medium density polyethylene, differentiated polyethylene, and combinations thereof.

D. The polymer composition of embodiment B, wherein the at least one additional polymer is selected from the group consisting of very low density polyethylene, an ethylene- or propylene-based polymer, a polymer derived from one or more dienes, and/or combinations thereof.

E. An article of manufacture composed of the polymer composition of any of embodiments A-B, wherein said article of manufacture is formed by a process selected from the group consisting of injection molding, blow molding, extrusion coating, foaming, casting, and combinations thereof.

F. The article of embodiment E, wherein the copolymer has a melt index, $I_{2.16}$ of from about 0.5 to about 1.0 g/10 min.

G. The article of embodiment E or F, wherein the copolymer has a melt index ratio, $I_{21.6}/I_{2.16}$, of from about 30 to about 45.

H. The article of any of embodiments E-G, wherein the copolymer has a density of from about 0.918 to about 0.930.

I. The article of embodiment E or F, wherein the copolymer has a
    i. melt index ratio, $I_{21.6}/I_{2.16}$, of from about 35 to about 45, and
    ii. a density of from about 0.926 to about 0.928.

J. The article of embodiment E or F, wherein the copolymer has a
    i. melt index ratio, $I_{21.6}/I_{2.16}$, of from about 38 to about 42, and
    ii. a density of about 0.927.

K. The article of embodiment E or F, wherein the copolymer has:
    i. melt index ratio, $I_{21.6}/I_{2.16}$, of from about 30 to about 40, and
    ii. a density of from about 0.918 to about 0.922.

L. The article of embodiment E or F, wherein the copolymer has:
    i. melt index ratio, $I_{21.6}/I_{2.16}$, of from about 32 to about 38, and
    ii. a density of about 0.920.

M. The article of any of embodiment E-L, wherein the article is a heavy duty bag, shrink film, or green house film.

N. The article of embodiment M, wherein and the copolymer has a melt index, $I_{2.16}$ of about 0.5 g/10 min.

O. The article of any of embodiment E-L, wherein the article is a cast film, stretch film, a laminate, or a greenhouse film.

P. The article of embodiment O, wherein and the copolymer has a melt index, $I_{2.16}$ of about 0.5 g/10 min.

Q. The article of embodiment O, wherein and the copolymer has a melt index, $I_{2.16}$ of about 1.0 g/10 min.

R. The article of any of embodiment B-D, wherein said first polymer is different from said second polymer.

S. The article of any of embodiment E-R, wherein said article is an extruded monolayer film.

T. The article of any of embodiment E-R, wherein said article is an extruded multilayer film.

U. The article of embodiment S or T, wherein the Highlight ultimate stretch of the film is greater than or equal to about 300%, or greater than or equal to about 375%, or greater than or equal to about 450%.

V. The article of embodiment S or T, wherein the Highlight ultimate stretch force of the film is greater than or equal to about 90 lb per mil.

W. The article of embodiment S or T, wherein said article is a stretch handwrap film having a puncture peak force of greater than or equal to about 9 lb per mil.

X. The article of embodiment S or T, wherein the Highlight ultimate stretch force of the film is greater than or equal to about 85 lb per mil, or greater than or equal to about 90 lb (400.340 N) per mil, or greater than or equal to about 100 lb (444.822 N) per mil, or greater than or equal to about 110 lb (489.304 N) per mil.

Y. The article of embodiment S or T, wherein the film is a downgauged stretch handwrap film.

Z. The article of embodiment S or T, wherein the copolymer has a MD tensile natural draw ratio less then 250%.

AA. The article of any of embodiments E-Z, wherein the copolymer has a highlight ultimate stretch force greater then 70.

BB. The article of any of embodiments E-AA, wherein the copolymer has a MD Tensile at 50% greater then 2000 psi and MD tear greater then 300 g/mil.

CC. The article of any of embodiments E-BB, wherein the article is a greenhouse film having a haze of less than 25%, or less than 20%, or less than 15%.

DD. The article of any of embodiments E-CC, wherein the puncture peak force of the film is greater than or equal to about 9 lb (40.034 N) per mil, or greater than or equal to about 10 lb (44.482 N) per mil, or greater than or equal to about 11 lb (48.930 N) per mil.

EE. The article of any of embodiments E-DD, wherein the copolymer has a MD Tensile at 50% greater then 2000 psi (13.790 MPa), or greater than 2200 psi (15.168 MPa), or greater then 2500 psi (17.237 MPa), or greater then 3000 psi (20.684 MPa), or greater then 3500 psi (24.132 MPa) and MD tear greater then 150 g/mil, or greater then 200 g/mil, or greater then 250 g/mil, or greater then 300 g/mil, or greater then 350 g/mil, or greater then 400 g/mil.

FF. The article of any of embodiments E-EE, wherein the copolymer has a melt index ratio according to the following formula:

$$\ln(MIR) = -18.20 - 0.2634 \ln(MI, I_{2.16}) + 23.58 \times [\text{density, g/cm}^3]$$

GG. The polymer composition of any of embodiments A-D, wherein the copolymer has a melt index ratio according to the following formula:

$$\ln(MIR) = -18.20 - 0.2634 \ln(MI, I_{2.16}) + 23.58 \times [\text{density, g/cm}^3]$$

EXAMPLES

Test Methods

The properties cited below were determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a Measuretech Series 200 instrument. The instrument measures film thickness using a capacitance gauge. For each film sample, ten film thickness datapoints were measured per inch of film as the film was passed through the gauge in a transverse direction. From these measurements, an average gauge measurement was determined and reported.

Elmendorf Tear, reported in grams (g) or grams per mil (g/mil), was measured as specified by ASTM D-1922.

Tensile Strength at Yield, reported in pounds per square inch ($lb/in^2$ or psi), was measured as specified by ASTM D-882.

Tensile Strength at Break, reported in pounds per square inch ($lb/in^2$ or psi), was measured as specified by ASTM D-882.

Tensile Strength at 50%, 100%, and/or 200% Elongation, reported in pounds per square inch ($lb/in^2$ or psi), was measured as specified by ASTM D-882.

Ultimate Tensile Strength, reported in pounds per square inch ($lb/in^2$ or psi), was measured as specified by ASTM D-882.

Tensile Peak Load, reported in pounds (lb), was measured as specified by ASTM D-882.

Tensile Energy, reported in inch-pounds (in-lb), was measured as specified by ASTM D-882.

Elongation at Yield, reported as a percentage (%), was measured as specified by ASTM D-882.

Elongation at Break, reported as a percentage (%), was measured as specified by ASTM D-882.

1% Secant Modulus (M), reported in pounds per square inch ($lb/in^2$ or psi), was measured as specified by ASTM D-882.

Haze, reported as a percentage (%), was measured as specified by ASTM D-1003.

Gloss, a dimensionless number, was measured as specified by ASTM D-2457 at 450.

Total Energy, reported in foot-pounds (ft-lb), was measured as specified by ASTM D-4272.

Melt Index, $I_{2.16}$, reported in grams per 10 minutes (g/10 min), refers to the melt flow rate measured according to ASTM D-1238, condition E.

High Load Melt Index, $I_{21.6}$, reported in grams per 10 minutes (g/10 min), refers to the melt flow rate measured according to ASTM D-1238, condition F.

Melt Index Ratio, a dimensionless number, is the ratio of the high load melt index to the melt index, or $I_{21.6}/I_{2.16}$.

100% Modulus, reported millipascals (mPa), was measured as specified by ASTM D-412.

300% Modulus, reported in millipascals (mPa), was measured as specified by ASTM D-412.

Density, reported in grams per cubic centimeter (g/cm$^3$), was determined using chips cut from plaques compression molded in accordance with ASTM D-1928 Procedure C, aged in accordance with ASTM D-618 Procedure A, and measured as specified by ASTM D-1505.

Dart $F_{50}$, or Dart Drop Impact or Dart Drop Impact Strength (DIS), reported in grams (g) and/or grams per mil (g/mil), was measured as specified by ASTM D-1709, method A, unless otherwise specified.

A probe puncture energy test was completed using an Instron Universal tester that records a continuous reading of the force (stress) and penetration (strain) curve. A 6 inch by 6 inch (15 cm by 15 cm) film specimen was securely mounted to a compression load cell to expose a test area 4 inches in diameter (10 cm). Two HDPE slip sheets each 2 inches by 2 inches (5 cm by 5 cm) and each approximately 0.25 mils (6.35 µm) thick were loosely placed on the test surface. A ¾ inch (1.875 cm) diameter elongated matte finished stainless steel probe, traveling at a constant speed of 10 inch/minute (35 cm/min) was lowered into the film, and a stress/strain curve was recorded and plotted. The "puncture force" was the maximum force (pounds) encounter or pounds per mil (lb/mil) encountered. The machine was used to integrate the area under the stress/strain curve, which is indicative of the energy consumed during the penetration to rupture testing of the film, and is reported as "puncture energy" (inch pounds) and/or inch-pounds per mil (in-lb/mil). The probe penetration distance was not recorded in these tests, unless specifically states to the contrary.

Shrink, reported as a percentage, was measured by cutting circular specimens from a film using a 100 mm die. The samples were marked in their respective directions, dusted with talc, and placed on a pre-heated, talc covered tile. The samples were then heated using a heat gun (model HG-501A) for approximately 10 to 45 seconds, or until the dimensional change ceased. An average of three specimens is reported. A negative shrinkage number indicates expansion of a dimension after heating when compared to its pre-heating dimension.

Highlight Ultimate Stretch, reported as a percentage, and Highlight Ultimate Stretch Force, reported in pounds (lb), were measured by a Highlight Stretch tester using a method consistent with Highlight recommended machine settings and normal industry practices. Results are reported as an average of three tests unless otherwise noted.

Highlight Puncture Force, reported in pounds (lb), was measured by a Highlight Stretch tester using a method consistent with Highlight recommended machine settings. Results are reported as an average of two tests unless otherwise noted.

Coefficient of Friction, reported without units, was measured as specified by ASTM D-1894. Persons having ordinary skill in the art will recognize that, with respect to films, coefficient of friction may be measured in a number of configurations. Accordingly, such measurements will be designated as inside surface-to-inside surface (I/I), outside surface-to-inside surface (O/I), and outside surface-to-outside surface (O/O).

Where any of the above properties are reported in pounds per square inch, grams per mil, or in any other dimensions that are reported per unit area or per unit thickness, the ASTM methods cited for each property have been followed except that the film gauge was measured based on ASTM D-374, method C.

Resins Used in the Examples

Inventive LLDPE resins were prepared using the metallocene catalysts and gas phase processes described above. In particular, preparation of the inventive LLDPEs used in the following examples was substantially as described in the examples set forth in U.S. Pat. No. 6,476,171, which is incorporated by reference herein in its entirety. Process conditions were manipulated as needed to achieve resins having the resulting density and melt index measurements identified below.

Examples 1-13

Inventive LLDPE resins and controls as identified in Table 1 were processed into blown films on a blown film line having a 3½ inch (8.89 cm) extruder with barrier screw, 10 inch (25.4 cm) diameter die, 40 mil die gap, and dual lip air ring with chilled air at around 50° F. For the examples reported below, the film line was operated at nominal 314 lbs (142.428 kg) per hour with 34 inch (86.36 cm) frost line height and 2.5 blow up ratio (BUR) producing nominal 1.00 mil films from the pure resins and selected blends.

TABLE 1

| Resin | MI | Density | $I_{21.6}/I_{2.16}$ | Resin Type | Comonomer |
|---|---|---|---|---|---|
| A | 1.0 | 0.927 | 40 | Inventive LLDPE | Hexene |
| B | 0.94 | 0.919 | 38.1 | Inventive LLDPE | Hexene |
| C | 0.43 | 0.919 | 54.2 | Inventive LLDPE | Hexene |
| D | 0.28 | 0.918 | 70 | Inventive LLDPE | Hexene |
| E | 0.59 | 0.927 | 49.6 | Inventive LLDPE | Hexene |
| F | 1.00 | 0.918 | 27 | Traditional LLDPE produced using a Ziegler-Natta catalyst | Hexene |
| G | 1.00 | 0.918 | 40 | Traditional LDPE produced Using a free radical process | N/A |
| H | 1.00 | 0.918 | 17 | Traditional LLDPE produced Using a metallocene catalyst | Hexene |

The above properties for Resins A and F through H are reported as nominal values, while the properties for Resins B through E are measured values. Properties of the resulting films are presented in Table 2, below.

TABLE 2

| | Example Number | | | | | | |
|---|---|---|---|---|---|---|---|
| | 1 | 2 | 3 | 4 | 5 | 6 | 7 |
| Film Composition | 100% A | 100% B | 100% C | 100% C | 100% D | 100% E | 100% F |
| Average Gauge (mil) | 1.031 | 1.030 | 1.054 | 1.026 | 1.046 | 1.032 | 1.041 |
| Dart $F_{50}$ (g) | 134 | 445 | 492 | 498 | 498 | 154 | 161 |
| Dart F50 per mil | 130 | 432 | 469 | 483 | 474 | 149 | 155 |
| Elmendorf Tear, MD (g) | 76 | 174 | 97 | 99 | 78 | 95 | 363 |
| Elmendorf Tear per mil, MD | 77 | 175 | 99 | 99 | 78 | 96 | 374 |

TABLE 2-continued

| | | | | | | | |
|---|---|---|---|---|---|---|---|
| Elmendorf Tear, TD (g) | 597 | 491 | 397 | 400 | 361 | 549 | 528 |
| Elmendorf Tear per mil, TD | 595 | 492 | 404 | 401 | 368 | 549 | 542 |
| Elmendorf Tear, TD/MD ratio | 7.9 | 2.8 | 4.1 | 4.0 | 4.6 | 5.8 | 1.5 |
| Tensile @ Yield, MD psi (MPa) | 1776 (12.245) | 1366 (9.418) | 1348 (9.294) | 1346 (9.280) | 1334 (9.198) | 1754 (12.093) | 1350 (9.308) |
| Tensile @ Yield, TD (psi) (MPa) | 2015 (13.893) | 1379 (9.508) | 1400 (9.653) | 1421 (9.797) | 1448 (9.984) | 1925 (13.272) | 1456 (10.039) |
| Elongation @ Yield, MD (%) | 5.3 | 6.1 | 6.0 | 6.0 | 6.1 | 5.4 | 5.8 |
| Elongation @ Yield, TD (%) | 6.1 | 5.5 | 5.4 | 5.6 | 6.1 | 5.3 | 5.8 |
| Ultimate Tensile, MD (psi) (MPa) | 7191 (49.580) | 8560 (59.019) | 8806 (60.715) | 8867 (61.136) | 9232 (63.652) | 8100 (55.848) | 7142 (49.242) |
| Ultimate Tensile, TD (psi) (MPa) | 6297 (43.416) | 7848 (54.110) | 8662 (59.722) | 8373 (57.730) | 8234 (56.771) | 7140 (49.229) | 5385 (37.128) |
| Elongation @ Break, MD (%) | 605 | 551 | 518 | 521 | 507 | 567 | 644 |
| Elongation @ Break, TD (%) | 705 | 688 | 678 | 664 | 655 | 725 | 702 |
| Tensile Peak Load, MD (lb) | 7.02 | 8.34 | 8.61 | 8.84 | 8.97 | 7.65 | 7.15 |
| Tensile Peak Load, TD (lb) | 6.02 | 7.55 | 8.39 | 8.00 | 7.88 | 6.93 | 5.48 |
| Tensile Energy, MD (in-lb) | 40.9 | 40.2 | 40.7 | 41.5 | 41.3 | 41.5 | 36.80 |
| Tensile Energy, TD (in-lb) | 38.8 | 39.4 | 42.3 | 40.0 | 38.6 | 43.5 | 33.40 |
| 1% Secant Modulus, MD (psi) (MPa) | 44642 (307.796) | 28645 (197.500) | 28404 (195.839) | 27761 (191.405) | 27915 (192.467) | 41973 (289.394) | 28744 (198.183) |
| 1% Secant Modulus, TD (psi) (MPa) | 49730 (342.876) | 31482 (217.061) | 31137 (214.682) | 31439 (216.764) | 32448 (223.721) | 45772 (315.587) | 32691 (225.397) |
| Haze (%) | 12.4 | 9.3 | 9.9 | 9.5 | 11.0 | 12.2 | 11.9 |
| Gloss, MD | 49 | 55 | 52 | 53 | 48 | 49 | 50 |
| Gloss, TD | 50 | 57 | 54 | 55 | 49 | 50 | — |
| Peak Puncture Force (lb) | 9.47 | 10.12 | 10.63 | 10.46 | 10.64 | 10.24 | 8.87 |
| Peak Puncture Force per mil | 9.19 | 9.82 | 10.13 | 10.16 | 10.13 | 9.94 | 8.53 |
| Puncture Energy (in-lb) | 21.20 | 27.64 | 29.28 | 29.24 | 29.79 | 25.61 | 25.78 |
| Puncture Energy per mil | 20.59 | 26.83 | 27.89 | 28.39 | 28.38 | 24.87 | 24.78 |
| Shrink, MD (%) | 73 | 76 | 77 | 76 | 77 | 76 | — |
| Shrink, TD (%) | 12 | 12 | 18 | 17 | 17 | 13 | — |

| | Example Number | | | | | |
|---|---|---|---|---|---|---|
| | 8 | 9 | 10 | 11 | 12 | 13 |
| Film Composition | 100% G | 100% H | 20% G 80% B | 20% G 80% D | 20% F 80% G | 20% G 80% H |
| Average Gauge (mil) | 1.075 | 1.034 | 1.054 | 1.038 | 1.027 | 1.038 |
| Dart $F_{50}$ (g) | 76 | 652 | 234 | 297 | 69 | 181 |
| Dart F50 per mil | 70 | 633 | 223 | 286 | 67 | 174 |
| Elmendorf Tear, MD (g) | 183 | 266 | 103 | 54 | 105 | 74 |
| Elmendorf Tear per mil, MD | 180 | 270 | 103 | 54 | 109 | 74 |
| Elmendorf Tear, TD (g) | 52 | 348 | 576 | 516 | 61 | 810 |
| Elmendorf Tear per mil, TD | 51 | 348 | 578 | 528 | 62 | 817 |
| Elmendorf Tear, TD/MD ratio | 0.3 | 1.3 | 5.6 | 9.6 | 0.6 | 10.9 |
| Tensile @ Yield, MD psi (MPa) | 1589 (10.956) | 1342 (9.253) | 1406 (9.694) | 1504 (10.370) | 1769 (12.197) | 1510 (10.411) |
| Tensile @ Yield, TD (psi) (MPa) | 1437 (9.908) | 1365 (9.411) | 1537 (10.597) | 1589 (10.956) | 1631 (11.245) | 1613 (11.121) |
| Elongation @ Yield, MD (%) | 6.6 | 6.3 | 5.9 | 6.0 | 6.5 | 6.2 |
| Elongation @ Yield, TD (%) | 4.9 | 5.7 | 5.0 | 5.0 | 4.8 | 5.1 |
| Ultimate Tensile, MD (psi) (MPa) | 4296 (29.620) | 10039 (69.216) | 5894 (40.638) | 6880 (47.436) | 5100 (35.163) | 5472 (37.728) |
| Ultimate Tensile, TD (psi) (MPa) | 2844 (19.609) | 9713 (66.969) | 5877 (40.520) | 6335 (43.678) | 3521 (24.276) | 7117 (49.070) |
| Elongation @ Break, MD (%) | 85 | 601 | 476 | 432 | 78 | 473 |
| Elongation @ Break, TD (%) | 522 | 669 | 650 | 621 | 630 | 651 |

TABLE 2-continued

| | | | | | | |
|---|---|---|---|---|---|---|
| Tensile Peak Load, MD (lb) | 4.48 | 9.40 | 5.82 | 6.51 | 5.12 | 5.34 |
| Tensile Peak Load, TD (lb) | 3.05 | 9.29 | 5.89 | 6.05 | 3.44 | 6.84 |
| Tensile Energy, MD (in-lb) | 5.50 | 38.50 | 33.00 | 33.70 | 5.80 | 32.30 |
| Tensile Energy, TD (in-lb) | 18.90 | 43.40 | 33.00 | 31.40 | 23.70 | 35.20 |
| 1% Secant Modulus, MD (psi) (MPa) | 27952 (192.722) | 26360 (181.746) | 30154 (207.905) | 32135 (221.563) | 34672 (239.055) | 31882 (219.819) |
| 1% Secant Modulus, TD (psi) (MPa) | 37354 (257.547) | 28215 (194.536) | 37401 (257.871) | 41006 (282.726) | 44882 (309.451) | 40658 (280.327) |
| Haze (%) | 13.0 | 25.1 | 9.5 | 12.1 | 10.7 | 3.1 |
| Gloss, MD | 47 | 28 | 53 | 45 | 54.3 | 81.9 |
| Gloss, TD | — | — | — | — | — | — |
| Peak Puncture Force (lb) | 6.21 | 10.92 | 9.21 | 9.32 | 7.00 | 10.42 |
| Peak Puncture Force per mil | 5.75 | 10.60 | 8.77 | 8.96 | 6.80 | 10.02 |
| Puncture Energy (in-lb) | 3.35 | 36.87 | 17.86 | 15.99 | 4.14 | 21.02 |
| Puncture Energy per mil | 3.10 | 35.80 | 17.01 | 15.38 | 4.02 | 20.21 |
| Shrink, MD (%) | 86 | 34 | 80 | 81 | 86 | 79 |
| Shrink, TD (%) | 16 | 7 | 12 | 20 | 8 | 13 |

Table 2 shows blown film data for standard blown films covering a range of MI/density combinations as listed in Table 1. This data shows the excellent toughness/stiffness balance of the inventive LLDPE resins and blends comprising the inventive resins in contrast with known comparative resins and blends. One approach for comparing films data is to compare films of equivalent stiffness as indicated by the 1% secant modulus, as films are frequently used in applications that require stiffness for adequate film performance. Example 2, therefore, comprising an inventive LLDPE and having an average modulus of approximately 30,000 psi (206.843 MPa), has excellent performance compared with similar modulus control samples such as Example 7, a commercial Ziegler-based hexene LLDPE with average modulus of around 30,200 psi (208.222 MPa). As illustrated in Table 2, Example 2 has better dart drop, ultimate tensile strength, puncture strength, and optical properties than comparative Example 7.

Further, selected inventive resins and controls were blended with 20% commercially available LDPE, as is commonly done commercially. A comparison of the blended inventive Examples 10 and 11 with the metallocene-based comparative Example 13 shows that the inventive films provide superior MD ultimate tensile strength and dart impact strength. These inventive film property advantages in LDPE blends are important as LDPE is blended into many commercial films to modify a variety of properties such as sealing.

Examples 14-15

Examples 14 and 15 illustrate monolayer high stalk blown films produced using inventive polymer compositions as described herein. The monolayer films were produced on an Alpine film line using a 50 mm grooved feed extruder with a 120 mm die and 1.4 mm die gap. The films were produced at a rate of 200 lb/hr (90 kg/hr), a blow up ratio (BUR) of 2.5:1, and a 38-inch frost height. Films had a nominal thickness ranging from about 0.5 mil (12.7 µm) up to about 3 mil (75 µm).

Properties of the monolayer films produced are shown in Table 3.

TABLE 3

| | Example Number | |
|---|---|---|
| | 14 | 15 |
| Composition | 100% Inventive LLDPE | 100% Inventive LLDPE |
| Density (g/cm3) | 0.918 | 0.918 |
| Melt Index ($I_{2.16}$) (g/10 min) | 0.4 | 0.4 |
| Average Gauge (mil) | 1.384 | 3.017 |
| Dart $F_{50}$ (g) (Method A) | 756 | >1197 |
| Dart $F_{50}$ (Method A) per mil | 546 | — |
| Dart $F_{50}$ (g) (Method B) | 349 | 759 |
| Dart $F_{50}$ (Method B) per mil | 252 | 252 |
| Elmendorf Tear, MD (g) | 185 | 697 |
| Elmendorf Tear per mil, MD | 127 | 231 |
| Elmendorf Tear, TD (g) | 369 | 944 |
| Elmendorf Tear per mil, TD | 263 | 313 |
| Elmendorf Tear, TD/MD Ratio | 1.89 | 1.35 |
| Tensile @ Yield, MD psi (MPa) | 1367 (9.425) | 1358 (9.363) |
| Tensile @ Yield, TD psi (MPa) | 1327 (9.149) | 1386 (9.556) |
| Elongation @ Yield, MD (%) | 5.9 | 5.7 |
| Elongation @ Yield, TD (%) | 5.6 | 5.9 |
| Ultimate Tensile, MD (psi) (MPa) | 9256 (63.818) | 7873 (54.282) |
| Ultimate Tensile, TD psi (MPa) | 10133 (59.865) | 7918 (54.593) |
| Break Elongation, MD (%) | 567 | 657 |
| Break Elongation, TD (%) | 600 | 655 |
| Tensile Peak Load, MD (lb) | 11.78 | 22.92 |
| Tensile Peak Load, TD (lb) | 12.73 | 22.62 |
| Tensile Energy, MD (in-lb) | 58.40 | 128.60 |
| Tensile Energy, TD (in-lb) | 59.90 | 122.60 |
| 1% Secant Modulus, MD psi (MPa) | 27329 (188.427) | 29478 (203.244) |
| 1% Secant Modulus, TD psi (MPa) | 27401 (188.923) | 29801 (205.471) |
| Shrinkage, MD (%) | 72 | 63 |
| Shrinkage, TD (%) | 48 | 46 |
| Coefficient of Friction, I/I - static | 0.785 | 0.805 |
| Coefficient of Friction, I/I - kinetic | 0.651 | 0.660 |
| Coefficient of Friction, I/O - static | 0.759 | 0.727 |
| Coefficient of Friction, I/O - kinetic | 0.639 | 0.624 |
| Haze (%) | 17.0 | 13.3 |
| Gloss, MD | 35 | 47 |
| Gloss, TD | 36 | 47 |

Examples 16-19

Examples 16-19 illustrate coextruded high stalk blown films produced using inventive polymer compositions as described herein. The films were produced using an Alpine film line with two 50 mm extruders and a 35 mm extruder for ABA constructions. The die for these experiments had a diameter of 160 mm, with a 1.4 mm die gap. The films were produced with a blow up ratio of 2.5:1 and a frost line height of 38 inches (96.52 cm). The films had a nominal thickness ranging from about 0.5 mil (12.7 μm) up to about 3 mil (75 μm). The coextruded films were prepared with a commercially available high molecular weight HDPE resin to show influence on physical properties. The films were ABA type films with the HDPE in either the 'A' or 'B' layer, as designated in Table 4.

Properties of these films are shown in Table 4.

Example 20-34

Example 20 through 34 illustrate monolayer high stalk blown films produced using inventive polymer blends described herein. The monolayer films were produced on an Alpine film line using a 50 mm grooved feed extruder with a 120 mm die and 1.4 mm die gap. The films were produced at a rate of 200 lb/hr (90 kg/hr), a blow up ratio (BUR) of 2.5:1, and a 38 inch (96.52 cm) frost height. Films had a nominal thickness ranging from about 0.5 μm) up to about 3 mil (75 μm).

Compositions of the films are given in Table 5, and properties of these films are shown in Tables 6 and 7.

TABLE 4

| | Example Number | | | |
|---|---|---|---|---|
| | 16 | 17 | 18 | 19 |
| Composition of A Layers | 100% Inventive LLDPE Density = 0.927 Melt index = 0.7 | 100% Inventive LLDPE Density = 0.918 Melt index = 0.6 | 100% HDPE Density = 0.952 Melt index = 0.06 | 85% Traditional LLDPE Density = 0.918 Melt index = 1.0 15% HDPE Density = 0.965 Melt index = 2.5 |
| Composition of B Layer | 100% HDPE Density = 0.952 Melt index = 0.06 | 100% HDPE Density = 0.952 Melt index = 0.06 | 100% Inventive LLDPE Density = 0.918 Melt index = 0.4 | 100% HDPE Density = 0.952 Melt index = 0.06 |
| Average Gauge (mil) | 1.53 | 1.66 | 1.561 | 1.419 |
| Dart $F_{50}$ (g) | 111 | 188 | 245 | 92 |
| Dart $F_{50}$ per mil | 72 | 113 | 157 | 65 |
| Elmendorf Tear, MD (g) | 34 | 58 | 87 | 42 |
| Elmendorf Tear per mil, MD | 24 | 39 | 58 | 30 |
| Elmendorf Tear, TD (g) | 574 | 510 | 585 | 570 |
| Elmendorf Tear per mil, TD | 404 | 345 | 385 | 413 |
| Elmendorf Tear, TD/MD Ratio | 16.83 | 8.85 | 6.64 | 13.77 |
| Tensile @ Yield, MD psi (MPa) | 3237 (22.318) | 2899 (19.988) | 2597 (17.906) | 3086 (21.277) |
| Tensile @ Yield, TD psi (MPa) | 3615 (24.925) | 3522 (24.283) | 3073 (21.188) | 3430 (23.649) |
| Elongation @ Yield, MD (%) | 5.5 | 4.8 | 5.1 | 4.8 |
| Elongation @ Yield, TD (%) | 5.1 | 5.2 | 4.9 | 4.9 |
| Ultimate Tensile, MD psi (MPa) | 7805 (53.814) | 7805 (53.814) | 7596 (52.373) | 8020 (55.296) |
| Ultimate Tensile, TD psi (MPa) | 7486 (51.614) | 8003 (55.179) | 7012 (48.346) | 7532 (51.931) |
| Break Elongation, MD (%) | 444 | 489 | 562 | 413 |
| Break Elongation, TD (%) | 757 | 717 | 673 | 741 |
| Tensile Peak Load, MD (lb) | 10.87 | 12.22 | 11.53 | 10.25 |
| Tensile Peak Load, TD (lb) | 10.78 | 12.57 | 11.74 | 9.95 |
| Tensile Energy, MD (in-lb) | 57.20 | 67.00 | 68.60 | 50.20 |
| Tensile Energy, TD (in-lb) | 78.90 | 81.30 | 75.20 | 67.00 |
| 1% Secant Modulus, MD psi (MPa) | 96654 (666.406) | 85433 (589.040) | 72997 (503.297) | 89285 (615.599) |
| 1% Secant Modulus, TD psi (MPa) | 123319 (850.255) | 113015 (779.211) | 85706 (590.922) | 120703 (832.218) |
| Haze (%) | 13.9 | 12.0 | 84.9 | 7.3 |
| Gloss, MD | 48 | 55 | 4 | 69 |
| Gloss, TD | 50 | 57 | 5 | 68 |
| Peak Puncture Force (lb) | 14.27 | 17.40 | 16.46 | 15.38 |
| Peak Puncture Force per mil | 9.31 | 10.49 | 10.54 | 10.84 |
| Puncture Energy (in-lb) | 20.89 | 35.31 | 33.56 | 28.51 |
| Puncture Energy per mil | 13.63 | 21.29 | 21.50 | 20.09 |

Notable improvements demonstrated by the monolayer and coextruded films of Examples 14 through 19 versus films produced with a low frost line or in a 'pocket' configuration include improved film balance, including significantly better tear and impact properties. Further evidence of improved balance is seen in the shrink property characteristics of the films, where nearly equal performance is seen in both MD and TD directions. Film clarity is maintained with haze and gloss values in a similar range as films produced using 'pocket' extrusion processes.

TABLE 5

| Example # | Composition | Density | Melt Index |
|---|---|---|---|
| 20 | 10% Inventive LLDPE | 0.918 | 0.6 |
| | 90% HDPE | 0.952 | 0.06 |
| 21 | 10% Inventive LLDPE | 0.918 | 0.6 |
| | 90% HDPE | 0.952 | 0.06 |
| 22 | 10% Inventive LLDPE | 0.918 | 0.6 |
| | 90% HDPE | 0.952 | 0.06 |
| 23 | 10% Inventive LLDPE | 0.918 | 0.6 |
| | 90% HDPE | 0.952 | 0.06 |

TABLE 5-continued

| Example # | Composition | Density | Melt Index |
|---|---|---|---|
| 24 | 20% Inventive LLDPE | 0.918 | 0.6 |
|    | 80% HDPE | 0.952 | 0.06 |
| 25 | 20% Inventive LLDPE | 0.918 | 0.6 |
|    | 80% HDPE | 0.952 | 0.06 |
| 26 | 50% Inventive LLDPE | 0.918 | 0.6 |
|    | 50% HDPE | 0.952 | 0.06 |
| 27 | 50% Inventive LLDPE | 0.918 | 0.6 |
|    | 50% HDPE | 0.952 | 0.06 |
| 28 | 10% Traditional LLDPE | 0.918 | 1.0 |
|    | 90% HDPE | 0.952 | 0.06 |
| 29 | 10% Traditional LLDPE | 0.918 | 1.0 |
|    | 90% HDPE | 0.952 | 0.06 |
| 30 | 20% Traditional LLDPE | 0.918 | 1.0 |
|    | 80% HDPE | 0.952 | 0.06 |
| 31 | 20% Traditional LLDPE | 0.918 | 1.0 |
|    | 80% HDPE | 0.952 | 0.06 |
| 32 | 50% Traditional LLDPE | 0.918 | 1.0 |
|    | 50% HDPE | 0.952 | 0.06 |
| 33 | 50% Traditional LLDPE | 0.918 | 1.0 |
|    | 50% HDPE | 0.952 | 0.06 |
| 34 | 100% HDPE | 0.952 | 0.06 |

TABLE 6

| | Example # | | | | | | | |
|---|---|---|---|---|---|---|---|---|
| | 20 | 21 | 22 | 23 | 24 | 25 | 26 | 27 |
| Avg. Gauge (mil) | 0.509 | 0.582 | 0.745 | 0.831 | 0.596 | 0.824 | 0.582 | 0.853 |
| Dart $F_{50}$ (g) | 321 | 303 | 445 | 284 | 245 | 249 | 277 | 215 |
| Dart $F_{50}$ per mil | 631 | 521 | 597 | 342 | 411 | 302 | 476 | 252 |
| Elmendorf Tear, MD (g) | — | 12 | — | 23 | 14 | 27 | 16 | 37 |
| Elmendorf Tear, MD per mil | — | 21 | — | 28 | 23 | 34 | 27 | 49 |
| Elmendorf Tear, TD (g) | — | 26 | — | 53 | 63 | 90 | 32 | 166 |
| Elmendorf Tear, TD per mil | — | 47 | — | 67 | 102 | 114 | 59 | 220 |
| Elmendorf Tear, TD/MD ratio | — | 2.2 | — | 2.3 | 4.5 | 3.3 | 2.0 | 4.5 |
| Tensile @ Yield, MD psi (MPa) | 4950 (34.129) | 4568 (31.495) | 3918 (27.014) | 3955 (27.269) | 3901 (26.896) | 3543 (24.428) | 3529 (24.332) | 2570 (17.720) |
| Tensile @ Yield, TD psi (MPa) | 4514 (31.123) | 4392 (30.282) | 4140 (28.544) | 4295 (29.613) | 3998 (27.565) | 3774 (26.021) | 4095 (28.234) | 2707 (18.664) |
| Elongation @ Yield, MD (%) | 5.2 | 4.7 | 4.7 | 4.7 | 5.0 | 5.2 | 5.2 | 5.1 |
| Elongation @ Yield, TD (%) | 5.3 | 6.2 | 5.8 | 5.0 | 4.9 | 4.7 | 5.1 | 4.9 |
| Ultimate Tensile, MD psi (MPa) | 13119 (90.452) | 11850 (81.703) | 11182 (77.097) | 10188 (70.243) | 11294 (77.869) | 9218 (63.556) | 9665 (66.638) | 7919 (54.600) |
| Ultimate Tensile, TD psi (MPa) | 11266 (77.676) | 10640 (73.360) | 10097 (69.616) | 10085 (59.534) | 9355 (64.500) | 9836 (67.817) | 10299 (71.009) | 8834 (60.908) |
| Break Elongation, MD (%) | 312 | 367 | 454 | 454 | 355 | 442 | 384 | 430 |
| Break Elongation, TD (%) | 401 | 361 | 382 | 448 | 424 | 379 | 414 | 430 |
| Tensile Peak Load, MD (lb) | 6.76 | 6.74 | 8.19 | 7.83 | 7.08 | 7.31 | 5.05 | 6.13 |
| Tensile Peak Load, TD (lb) | 5.44 | 6.02 | 7.32 | 7.84 | 5.72 | 6.90 | 5.54 | 5.82 |
| Tensile Energy, MD (in-lb) | 27.60 | 31.60 | 45.10 | 43.20 | 32.00 | 38.80 | 23.30 | 30.20 |
| Tensile Energy, TD (in-lb) | 22.20 | 23.50 | 28.80 | 36.10 | 24.90 | 27.30 | 22.80 | 23.90 |
| 1% Secant Modulus, MD psi (MPa) | 131520 (906.799) | 144662 (997.410) | 120782 (832.763) | 117605 (810.858) | 103529 (713.808) | 100866 (695.447) | 102051 (703.617) | 66649 (459.529) |
| 1% Secant Modulus, TD psi (MPa) | 159291 (1098.273) | 164212 (1132.202) | 132941 (916.596) | 144222 (994.376) | 129576 (893.395) | 118842 (819.387) | 111021 (765.463) | 73596 (507.427) |
| Haze (%) | — | 76.0 | — | 81.8 | 69.2 | 75.3 | 75.6 | 51.3 |
| Peak Puncture Force (lb) | 8.51 | 9.65 | 10.97 | 9.61 | 8.37 | 9.03 | 5.52 | 9.14 |
| Peak Puncture Force per mil | 16.73 | 16.58 | 14.72 | 11.56 | 14.04 | 10.96 | 9.49 | 10.71 |
| Puncture Energy (in-lb) | 12.08 | 14.01 | 17.00 | 14.30 | 12.07 | 13.81 | 6.46 | 15.99 |
| Puncture Energy per mil | 23.73 | 24.08 | 22.81 | 17.20 | 20.25 | 16.76 | 11.09 | 18.75 |

TABLE 7

| | Example # | | | | | | |
|---|---|---|---|---|---|---|---|
| | 28 | 29 | 30 | 31 | 32 | 33 | 34 |
| Avg. Gauge (mil) | 0.618 | 0.845 | 0.575 | 0.853 | 0.556 | 0.817 | 0.523 |
| Dart $F_{50}$ (g) | 228 | 279 | 348 | 228 | 183 | 207 | 306 |
| Dart $F_{50}$ per mil | 369 | 330 | 605 | 267 | 329 | 253 | 585 |
| Elmendorf Tear, MD (g) | 20 | 23 | 13 | 36 | 38 | 68 | 6 |
| Elmendorf Tear, MD per mil | 34 | 28 | 23 | 45 | 71 | 87 | 12 |
| Elmendorf Tear, TD (g) | 118 | 86 | 28 | 85 | 206 | 351 | 29 |
| Elmendorf Tear, TD per mil | 197 | 102 | 51 | 113 | 378 | 433 | 57 |
| Elmendorf Tear, TD/MD ratio | 5.9 | 3.7 | 2.2 | 2.4 | 5.4 | 5.2 | 4.8 |
| Tensile @ Yield, MD psi (MPa) | 2820 (19.443) | 3977 (27.420) | 4979 (34.329) | 3737 (25.766) | 2720 (18.754) | 2653 (18.292) | 5512 (38.004) |
| Tensile @ Yield, TD psi (MPa) | 2921 (20.140) | 4366 (30.103) | 4453 (30.702) | 3857 (26.593) | 2869 (19.781) | 2796 (19.278) | 4674 (32.226) |
| Elongation @ Yield, MD (%) | 5.2 | 5.1 | 5.2 | 5.6 | 5.3 | 5.4 | 5.0 |
| Elongation @ Yield, TD (%) | 4.5 | 4.8 | 5.4 | 5.0 | 4.6 | 4.9 | 5.5 |
| Ultimate Tensile, MD psi | 9489 | 9579 | 13041 | 9681 | 9345 | 8711 | 13285 |

TABLE 7-continued

| | Example # | | | | | | |
|---|---|---|---|---|---|---|---|
| | 28 | 29 | 30 | 31 | 32 | 33 | 34 |
| (MPa) | (65.424) | (66.045) | (89.915) | (66.748) | (64.432) | (60.060) | (91.597) |
| Ultimate Tensile, TD psi | 9186 | 10110 | 10332 | 9432 | 8745 | 9015 | 11306 |
| (MPa) | (63.335) | (69.706) | (71.237) | (65.031) | (60.295) | (62.156) | (77.952) |
| Break Elongation, MD (%) | 354 | 429 | 356 | 433 | 420 | 488 | 322 |
| Break Elongation, TD (%) | 451 | 421 | 389 | 434 | 530 | 522 | 396 |
| Tensile Peak Load, MD (lb) | 6.38 | 6.73 | 6.94 | 7.26 | 5.03 | 6.67 | 6.76 |
| Tensile Peak Load, TD (lb) | 5.03 | 7.42 | 5.85 | 6.78 | 4.71 | 6.50 | 5.70 |
| Tensile Energy, MD (in-lb) | 27.50 | 34.70 | 30.90 | 36.90 | 23.20 | 34.20 | 29.30 |
| Tensile Energy, TD (in-lb) | 20.70 | 32.60 | 24.40 | 29.10 | 21.00 | 38.90 | 23.90 |
| 1% Secant Modulus, MD psi | 66191 | 108442 | 118129 | 93875 | 65231 | 66554 | 158377 |
| (MPa) | (456.371) | (747.681) | (814.471) | (647.246) | (449.752) | (458.874) | (1091.971) |
| 1% Secant Modulus, TD psi | 79370 | 122526 | 137988 | 107473 | 82051 | 81818 | 166371 |
| (MPa) | (547.24) | (844.787) | (951.394) | (741.000) | (565.722) | (564.115) | (1147.088) |
| Haze (%) | 47.4 | 83.8 | 74.2 | 79.3 | 51.0 | 55.8 | 64.7 |
| Peak Puncture Force (lb) | 7.39 | 9.86 | 8.76 | 9.98 | 6.55 | 7.91 | 10.01 |
| Peak Puncture Force per mil | 11.95 | 11.67 | 15.24 | 11.70 | 11.77 | 9.68 | 19.14 |
| Puncture Energy (in-lb) | 12.58 | 14.73 | 11.34 | 15.44 | 12.93 | 15.45 | 13.10 |
| Puncture Energy per mil | 20.36 | 17.43 | 19.73 | 18.10 | 23.26 | 18.91 | 25.05 |

Table 6 contains data with respect to inventive films, and Table 7 contains data with respect to prior art films.

Examples 35-37

Examples 35 through 37 illustrate blow molded bottles formed from the polymers described herein. The bottles tested in Examples 35 and 37 were formed from inventive LLDPE resins. The bottles tested in Example 36 were formed from a comparative traditional LLDPE produced using a metallocene catalyst in a slurry loop process. The bottles were formed and topload tested in accordance with the procedures set forth in ASTM D-2659. Results of topload testing of the bottles are shown in Table 8.

TABLE 8

| | Example 35 100% Inventive LLDPE Density = 0.927 g/cm3 Melt Index = 0.7 g/10 min | | Example 36 100% Traditional LLDPE Density = 0.934 g/cm3 Melt Index = 1.0 g/10 min | | Example 37 100% Inventive LLDPE Density = 0.918 g/cm3 Melt Index = 1.0 g/10 min | |
|---|---|---|---|---|---|---|
| Run | Weight (g) | Top Load (lb) | Weight (g) | Top Load (lb) | Weight (g) | Top Load (lb) |
| 1 | 38.2 | 18.150 | 38.5 | 26.670 | 38.2 | 10.648 |
| 2 | 38.5 | 19.154 | 38.4 | 26.123 | 38.3 | 18.843 |
| 3 | 38.3 | 19.176 | 38.3 | 25.771 | 38.4 | 11.008 |
| 4 | 38.3 | 19.349 | 38.2 | 25.756 | 38.1 | 10.086 |
| 5 | 38.5 | 19.043 | 38.5 | 26.790 | 38.2 | 11.008 |
| 6 | 38.4 | 19.296 | 38.2 | 26.063 | 38.5 | 11.323 |
| 7 | 38.5 | 19.791 | 38.1 | 26.453 | 38.5 | 11.780 |
| 8 | 38.2 | 18.464 | 38.5 | 26.070 | 38.5 | 10.768 |
| 9 | 38.5 | 18.105 | 38.4 | 26.228 | 38.1 | 11.255 |
| 10 | 38.5 | 19.543 | 38.5 | 27.149 | 38.4 | 11.188 |
| 11 | 38.2 | 18.697 | 38.0 | 26.243 | 38.3 | 10.319 |
| 12 | 38.5 | 18.217 | 38.4 | 27.517 | 38.0 | 10.723 |
| 13 | 38.3 | 18.419 | 38.3 | 26.865 | 38.1 | 10.109 |
| 14 | 38.2 | 19.626 | 38.2 | 27.299 | 38.3 | 10.821 |
| 15 | 38.5 | 18.629 | 38.4 | 27.651 | 38.3 | 11.488 |
| 16 | 38.4 | 18.442 | 38.5 | 28.116 | 38.3 | 11.398 |
| 17 | 38.5 | 18.966 | 38.5 | 27.794 | 38.3 | 11.330 |
| 18 | 38.1 | 17.835 | 38.1 | 28.146 | 38.5 | 11.877 |
| 19 | 38.5 | 18.359 | 38.3 | 27.704 | 38.4 | 11.555 |
| 20 | 38.4 | 18.554 | 38.2 | 28.034 | 38.5 | 11.877 |

Examples 38-40

Examples 38 through 40 further illustrate blow molded bottles formed from the polymers described herein. The bottles tested in Examples 38 and 40 were formed from inventive LLDPE resins. The bottles tested in Example 39 were formed from a comparative traditional LLDPE. The bottles were formed and drop impact tested in accordance with the procedures set forth in ASTM D-2463. Results of drop impact testing of the bottles are shown in Tables 9 through 11.

TABLE 9

100% Inventive LLDPE
Density = 0.927 g/cm3
Melt Index = 0.7 g/10 min

| Example # | Height (ft) | Height (in) | Weight (g) | Failure? |
|---|---|---|---|---|
| 38.1 | 22.00 | 264 | 38.3 | N |
| 38.2 | 22.00 | 264 | 38.3 | N |
| 38.3 | 22.00 | 264 | 38.3 | N |
| 38.4 | 22.00 | 264 | 38.4 | N |
| 38.5 | 22.00 | 264 | 38.4 | N |
| 38.6 | 22.00 | 264 | 38.5 | N |

TABLE 10

100% Traditional LLDPE
Density = 0.934 g/cm3
Melt Index = 1.0 g/10 min

| Example # | Height (ft) | Height (in) | Weight (g) | Failure? | Failure Location |
|---|---|---|---|---|---|
| 39.1 | 18.00 | 216 | 38.2 | N | |
| 39.2 | 18.50 | 222 | 38.2 | Y | 10° from parting line |
| 39.3 | 18.00 | 216 | 38.3 | Y | 10° from parting line |
| 39.4 | 17.50 | 210 | 38.1 | Y | 10° from parting line |
| 39.5 | 17.00 | 204 | 37.9 | Y | 10° from parting line |
| 39.6 | 16.50 | 198 | 38.0 | Y | 10° from parting line |
| 39.7 | 16.00 | 192 | 38.5 | N | |
| 39.8 | 16.50 | 198 | 38.4 | N | |
| 39.9 | 17.00 | 204 | 38.2 | Y | 25° from parting line |
| 39.10 | 16.50 | 198 | 38.3 | Y | parting line |
| 39.11 | 16.00 | 192 | 38.4 | Y | 25° from parting line |
| 39.12 | 15.50 | 186 | 38.0 | N | |
| 39.13 | 16.00 | 192 | 38.2 | N | |
| 39.14 | 16.50 | 198 | 38.4 | Y | 10° from parting line |
| 39.15 | 16.00 | 192 | 38.1 | N | |
| 39.16 | 16.50 | 198 | 38.4 | N | |
| 39.17 | 17.00 | 204 | 38.3 | Y | parting line |
| 39.18 | 16.50 | 198 | 38.4 | Y | 25° from parting line |
| 39.19 | 16.00 | 192 | 38.3 | Y | 25° from parting line |
| 39.20 | 15.50 | 186 | 38.5 | N | |
| 39.21 | 16.00 | 192 | 38.2 | N | |

TABLE 11

100% Inventive LLDPE
Density = 0.918 g/cm3
Melt Index = 1.0 g/10 min

| Example # | Height (ft) | Height (in) | Weight (g) | Failure? |
|---|---|---|---|---|
| 40.1 | 22.00 | 264 | 38.4 | N |
| 40.2 | 22.00 | 264 | 38.5 | N |
| 40.3 | 22.00 | 264 | 38.4 | N |
| 40.4 | 22.00 | 264 | 38.1 | N |
| 40.5 | 22.00 | 264 | 38.5 | N |
| 40.6 | 22.00 | 264 | 38.3 | N |

As shown in Tables 8 through 11, the inventive LLDPEs described herein exhibit roughly equivalent, although slightly lower, top load performance when compared to bottles formed from traditional LLDPE, but exhibit greatly improved drop impact performance. As a result, bottles formed from inventive LLDPEs will have similar crush strength to bottles made from prior art LLDPEs, but are generally tougher.

Examples 41-49

An inventive LLDPE resin and several control resins and blends were processed into cast film, intended for use as stretch film handwrap, on a cast line manufactured by Black Clawson Equipment having a 3½ inch (8.89 cm) extruder with a barrier screw, a 42 inch (106.68 cm) wide die, a nominal 20 mil die gap, and a 30 inch (76.2 cm) diameter primary chill roll. The line was operated at normal conditions of approximately 575 lbs (260.8 Kg) per hour, a melt curtain length of about 4 to about 5 inches (10.16 to about 12.7 cm), and an average 570° F. melt temperature. The chill roll temperature was approximately 80° F. Nominal 0.80 mil films were produced at a line speed of approximately 750 feet (228.6 m) per minute. Selected nominal 0.60 mil films were also produced at a line speed of approximately 1000 feet (304.8 m) per minute. Compositions of the films are given in Table 12. The properties of the films were evaluated and the results are shown in Table 13.

TABLE 12

| Example # | Composition | Density | Melt Index | Comonomer | Catalyst |
|---|---|---|---|---|---|
| 41 | 100% Traditional LLDPE | 0.918 | 0.97 | Hexene | Ziegler-Natta |
| 42 | 100% Traditional LLDPE | 0.918 | 0.97 | Hexene | Ziegler-Natta |
| 43 | 100% Traditional LLDPE | 0.920 | 1.92 | Butene | Ziegler-Natta |
| 44 | 100% Tradtional LLDPE | 0.920 | 1.92 | Butene | Ziegler-Natta |
| 45 | 30% Traditional LLDPE | 0.920 | 1.92 | Butene | Ziegler-Natta |
|  | 70% Traditional LLDPE | 0.918 | 0.97 | Hexene | Ziegler-Natta |
| 46 | 30% Traditional LLDPE | 0.920 | 1.92 | Butene | Ziegler-Natta |
|  | 70% Traditional LLDPE | 0.918 | 0.97 | Hexene | Ziegler-Natta |
| 47 | 30% Traditional LLDPE | 0.920 | 1.03 | Hexene | Metallocene |
|  | 70% Traditional LLDPE | 0.920 | 1.92 | Butene | Ziegler-Natta |
| 48 | 30% Traditional LLDPE | 0.920 | 1.03 | Hexene | Metallocene |
|  | 70% Traditional LLDPE | 0.920 | 1.92 | Butene | Ziegler-Natta |
| 49 | 30% Traditional LLDPE | 0.920 | 1.92 | Butene | Ziegler-Natta |
|  | 70% Inventive LLDPE | 0.920 | 0.95 | Hexene | Inventive |

TABLE 13

| | Example # | | | | | | | | |
|---|---|---|---|---|---|---|---|---|---|
| | 41 | 42 | 43 | 44 | 45 | 46 | 47 | 48 | 49 |
| Tensile @ Yield, MD psi (MPa) | 1,036 (7.143) | 1,093 (7.536) | 1,107 (7.632) | 1,152 (7.943) | 1,108 (7.639) | 1,183 (8.156) | 1,132 (7.805) | 1,117 (7.701) | 1,220 (8.411) |
| Tensile @ Yield, TD psi (MPa) | 938 (6.467) | 977 (6.736) | 1,034 (7.129) | 1,046 (7.212) | 971 (6.695) | 1,007 (6.943) | 1,079 (7.439) | 1,022 (7.046) | 1,120 (7.722) |
| 200% Tensile, MD psi (MPa) | 3,104 (21.401) | 6,584 (45.395) | 1,936 (13.348) | 2,762 (19.043) | 2,439 (16.816) | 5,637 (36.866) | 2,032 (14.010) | 3,132 (21.594) | 4,850 (33.440) |
| Ultimate Tensile, MD psi (MPa) | 8,548 (58.936) | 8,721 (60.129) | 8,428 (58.109) | 7,688 (53.007) | 9,950 (68.603) | 10,816 (74.574) | 9,020 (62.191) | 10,975 (75.670) | 9,725 (67.052) |
| Ultimate Tensile, TD psi (MPa) | 5,187 (35.763) | 4,706 (32.447) | 4,251 (29.310) | 3,685 (25.407) | 5,275 (36.370) | 4,254 (29.330) | 5,068 (34.943) | 4,828 (33.288) | 6,083 (41.941) |
| Elongation @ Break, MD (%) | 312 | 232 | 481 | 336 | 400 | 278 | 437 | 360 | 316 |
| Elongation @ Break, TD (%) | 805 | 826 | 867 | 859 | 860 | 822 | 810 | 822 | 801 |
| 1% Secant Modulus, MD psi (MPa) | 13,388 (92.307) | 14,635 (100.905) | 16,996 (117.183) | 15,249 (105.138) | 16,328 (112.578) | 14,745 (101.663) | 17,091 (117.838) | 15,794 (108.896) | 16,917 (116.639) |
| 1% Secant Modulus, TD psi (MPa) | 17,244 (118.893) | 21,713 (149.706) | 18,971 (130.800) | 18,977 (130.842) | 20,167 (139.047) | 20,351 (140.315) | 20,018 (138.019) | 18,558 (127.953) | 20,647 (142.356) |
| Elmendorf Tear, MD (g/mil) | 225 | 244 | 34 | 21 | 280 | 265 | 61 | 42 | 78 |
| Elmendorf Tear, TD (g/mil) | 793 | 920 | 431 | 639 | 702 | 1017 | 457 | 607 | 584 |
| Dart $F_{50}$ (g) | 92 | <48 | 55 | <48 | 80 | <48 | 88 | <48 | 87 |
| Dart $F_{50}$ per mil | 111 | | 68 | | 96 | | 107 | | 113 |
| Gauge (mil) | 0.83 | 0.66 | 0.80 | 0.59 | 0.83 | 0.57 | 0.82 | 0.59 | 0.77 |
| Haze (%) | 3.4 | 2.6 | 1.6 | 1.4 | 2.5 | 2.2 | 1.4 | 1.2 | 2.4 |
| Gloss, MD | 82 | 83 | 92 | 92 | 88 | 86 | 92 | 92 | 84 |
| Gloss, TD | 76 | 79 | 93 | 93 | 85 | 84 | 94 | 94 | 84 |
| Peak Puncture Force lbs (N) | 7.88 (35.052) | 7.24 (32.205) | 7.37 (32.783) | 6.66 (29.625) | 8.07 (35.897) | 7.31 (32.517) | 8.81 (39.189) | 7.29 (32.428) | 10.55 (46.929) |
| Peak Puncture Force per mil | 9.50 | 10.97 | 9.22 | 11.29 | 9.72 | 12.83 | 10.74 | 12.35 | 13.70 |
| Puncture Energy in-lb (J) | 22.92 (2.59) | 19.87 (2.25) | 21.14 (2.39) | 19.09 (2.16) | 25.72 (2.91) | 20.38 (2.31) | 29.45 (3.33) | 21.79 (2.47) | 28.11 (3.18) |
| Puncture Energy per mil | 27.61 | 30.11 | 26.42 | 32.36 | 30.99 | 35.76 | 35.92 | 36.94 | 36.50 |
| Shrink, MD (%) | 80 | 83 | 68 | 73 | 75 | 83 | 66 | 73 | 88 |
| Shrink, TD (%) | −37 | −44 | −23 | −37 | −31 | −41 | −22 | −29 | −48 |
| Highlight Ultimate Stretch, Avg. (%) | 178 | 130 | 272 | 212 | 223 | 164 | 275 | 218 | 131 |
| Highlight Ultimate Stretch Force, Avg. lb (N) | 84.5 (375.875) | 79 (351.410) | 75.5 (335.841) | 65.3 (290.469) | 85.3 (379.433) | 81.5 (362.530) | 84.2 (374.540) | 74.3 (330.503) | 126 (560.476) |
| Highlight puncture force, 100% stretch lb (N) | 2.3 (10.231) | 1.2 (5.338) | 2.3 (10.231) | 0.7 (3.114) | 3.8 (16.903) | 1.6 (7.117) | 4.8 (21.351) | 2.9 (12.890) | 4.7 (20.907) |
| Highlight puncture force, 150% stretch lb (N) | | | | | 3.0 (13.345) | | 4.8 (21.351) | | |
| Highlight puncture force, 200% stretch lb (N) | | | | | | | 5.0 (22.241) | | |

The films described in Table 13, are intended for use as stretch film handwrap, which requires a combination of toughness, especially puncture and dart drop performance, and stiffness. Inventive Example 49 is compared in Table 13 with frequently used commercial stretch handwrap formulations. The inventive film exhibits good machine direction tensile strength at 200% elongation, has the highest dart drop per mil of the films tested, and has puncture force performance at least 20% greater than the comparative films. Further, highlight stretch testing shows that the inventive film of Example 49 exhibits 50% greater stretch force than the comparative films. This combination of excellent dart drop, puncture and film stretch force provides excellent performance for cast handwrap and is superior to comparative samples. One skilled in the art will recognize that further optimization of film formulation and/or processing is easily accomplished to meet application needs such as, for example, increased toughness, film downgauging, increased stiffness, increased load retention, or other desirable attributes.

Examples 50-61

Blown films produced from inventive and comparative resins, designated as Examples 50 through 61, were produced on a Gloucester blown film line. Composition of the resins used in the films tested is set forth in Table 14. The properties of the films are set forth in Table 15.

TABLE 14

| Resin | Resin Type | Density | Melt Index |
|---|---|---|---|
| X | Traditional LLDPE (metallocene catalyst) | 0.918 | 1.0 |
| Y | Inventive LLDPE | 0.919 | 0.94 |
| Z | Inventive LLDPE | 0.927 | 0.59 |

TABLE 15

| | Example # | | | | | |
|---|---|---|---|---|---|---|
| | 50 | 51 | 52 | 53 | 54 | 55 |
| Resin ID | X | X | X | X | Y | Y |
| Die Gap (mil) | 45 | 45 | 90 | 90 | 45 | 45 |
| Average Gauge (mil) | 2.00 | 2.86 | 2.08 | 2.89 | 2.01 | 2.86 |
| Dart $F_{50}$ (g) | 924 | ≧1373 | 948 | ≧1282 | 613 | 804 |
| Dart F50 per mil | 462 | ≧480 | 456 | ≧444 | 305 | 281 |
| Elmendorf Tear, MD (g) | 625 | 1006 | 619 | 961 | 378 | 621 |
| Elmendorf Tear per mil, MD | 319 | 337 | 314 | 329 | 196 | 219 |
| Elmendorf Tear, TD (g) | 767 | 1148 | 796 | 1160 | 953 | 1324 |
| Elmendorf Tear per mil, TD | 394 | 389 | 399 | 405 | 501 | 469 |
| Elmendorf Tear, TD/MD | 1.2 | 1.1 | 1.3 | 1.2 | 2.5 | 2.1 |
| Tensile @ Yield, MD psi (MPa) | 1405 (9.687) | 1416 (9.763) | 1356 (9.349) | 1365 (9.411) | 1354 (9.336) | 1376 (9.487) |
| Tensile @ Yield, TD psi (MPa) | 1447 (9.977) | 1417 (9.770) | 1398 (9.639) | 1434 (9.887) | 1452 (10.011) | 1465 (10.101) |
| Elongation @ Yield, MD (%) | 5.9 | 5.7 | 5.7 | 5.6 | 5.7 | 5.7 |
| Elongation @ Yield, TD (%) | 5.6 | 5.4 | 5.5 | 5.5 | 5.3 | 5.5 |
| Ultimate Tensile, MD psi (MPa) | 9324 (64.287) | 8589 (59.219) | 8769 (60.460) | 8554 (58.978) | 8153 (56.213) | 7523 (51.869) |
| Ultimate Tensile, TD psi (MPa) | 8538 (58.867) | 7969 (54.944) | 8145 (56.157) | 7900 (54.469) | 7274 (50.152) | 6905 (47.608) |
| Elongation @ Break, MD (%) | 657 | 731 | 630 | 700 | 616 | 667 |
| Elongation @ Break, TD (%) | 719 | 744 | 717 | 733 | 728 | 735 |
| Tensile Peak Load, MD lbs (N) | 17.66 (78.556) | 23.62 (105.067) | 17.12 (76.154) | 24.53 (109.115) | 15.39 (68.458) | 21.28 (94.658) |
| Tensile Peak Load, TD (lbs) | 15.93 (70.860) | 21.82 (97.060) | 16.03 (71.305) | 22.19 (97.706) | 13.89 (61.786) | 19.74 (87.808) |
| Tensile Energy, MD in lbs (J) | 86.0 (9.72) | 140.6 (15.89) | 79.9 (9.03) | 133.7 (15.11) | 82.5 (9.33) | 123.6 (13.97) |
| Tensile Energy, TD in lbs (J) | 88.3 (9.98) | 131.1 (14.82) | 89.0 (10.06) | 130.6 (14.76) | 81.4 (9.20) | 120.5 (13.62) |
| 1% Secant Modulus, MD psi (MPa) | 29648 (204.416) | 30772 (212.166) | 29103 (200.658) | 29699 (204.767) | 29584 (203.975) | 30444 (209.904) |
| 1% Secant Modulus, TD psi (MPa) | 32652 (225.128) | 33141 (228.499) | 31682 (218.440) | 32161 (221.742) | 33682 (232.229) | 34434 (237.414) |
| Haze (%) | 18.9 | 26.7 | 19.5 | 23.2 | 9.4 | 10.7 |
| Gloss, MD | 42.2 | 35.9 | 46.3 | 46.0 | 61.9 | 62.3 |
| Gloss, TD | 42.5 | 37.9 | 46.6 | 44.9 | 64.0 | 64.4 |
| Peak Puncture Force lb (N) | 18.77 (83.493) | 24.30 (108.092) | 19.21 (85.450) | 24.67 (109.738) | 16.63 (73.974) | 22.66 (100.797) |
| Peak Puncture Force per mil | 9.38 | 8.50 | 9.24 | 8.54 | 8.27 | 7.92 |
| Puncture Break Energy in-lb (J) | 62.51 (7.07) | 71.79 (8.12) | 63.36 (7.16) | 74.39 (8.41) | 43.66 (4.94) | 62.26 (7.04) |
| Puncture Break Energy per mil | 31.26 | 25.10 | 30.46 | 25.74 | 21.72 | 21.77 |
| Total Energy ft lb (J) | 0.86 (1.17) | 1.00 (1.36) | 0.85 (1.16) | 1.00 (1.36) | 0.46 (0.63) | 0.64 (0.87) |
| COF (I/I) - Kinetic | >1 | >1 | >1 | >1 | 0.71 | 0.71 |
| COF (I/I) - Static | >1 | >1 | >1 | >1 | 0.79 | 0.82 |
| Shrink, MD (%) | 38 | 29 | 39 | 34 | 74 | 69 |
| Shrink, TD (%) | −3 | 6 | 3 | 2 | −1 | 1 |

| | Example # | | | | | |
|---|---|---|---|---|---|---|
| | 56 | 57 | 58 | 59 | 60 | 61 |
| Resin ID | Y | Y | Z | Z | Z | Z |
| Die Gap (mil) | 90 | 90 | 45 | 45 | 90 | 90 |
| Average Gauge (mil) | 2.04 | 3.05 | 2.00 | 2.87 | 2.09 | 3.03 |
| Dart $F_{50}$ (g) | 558 | 883 | 251 | 368 | 256 | 393 |
| Dart F50 per mil | 274 | 290 | 126 | 128 | 122 | 130 |
| Elmendorf Tear, MD (g) | 332 | 638 | 147 | 286 | 141 | 275 |
| Elmendorf Tear per mil, MD | 167 | 211 | 74 | 98 | 72 | 92 |
| Elmendorf Tear, TD (g) | 994 | 1487 | 1088 | 1469 | 1278 | 1539 |
| Elmendorf Tear per mil, TD | 497 | 480 | 558 | 499 | 616 | 514 |
| Elmendorf Tear, TD/MD | 3.0 | 2.3 | 7.4 | 5.1 | 9.1 | 5.6 |
| Tensile @ Yield, MD psi (MPa) | 1368 (9.432) | 1342 (9.253) | 1803 (12.431) | 1826 (12.590) | 1839 (12.679) | 1778 (12.259) |
| Tensile @ Yield, TD psi (MPa) | 1432 (9.873) | 1460 (10.066) | 2055 (14.169) | 1994 (13.748) | 2098 (14.465) | 2042 (14.079) |
| Elongation @ Yield, MD (%) | 5.8 | 5.7 | 5.2 | 5.7 | 5.5 | 5.3 |
| Elongation @ Yield, TD (%) | 5.5 | 5.5 | 5.1 | 5.1 | 5.3 | 5.4 |
| Ultimate Tensile, MD psi (MPa) | 8335 (57.468) | 7322 (50.483) | 7318 (50.456) | 6752 (46.553) | 7632 (52.621) | 7022 (48.415) |
| Ultimate Tensile, TD psi (MPa) | 6838 (47.146) | 6773 (46.698) | 6768 (46.663) | 6355 (43.816) | 6498 (44.802) | 6309 (43.499) |
| Elongation @ Break, MD (%) | 587 | 639 | 606 | 666 | 616 | 670 |
| Elongation @ Break, TD (%) | 690 | 728 | 748 | 755 | 744 | 760 |

TABLE 15-continued

| | | | | | | |
|---|---|---|---|---|---|---|
| Tensile Peak Load, MD lbs (N) | 16.23 (72.195) | 21.97 (97.727) | 14.02 (62.364) | 19.02 (84.605) | 15.60 (69.392) | 21.00 (93.413) |
| Tensile Peak Load, TD (lbs) | 13.69 (60.896) | 20.00 (88.964) | 13.05 (58.049) | 17.26 (76.776) | 13.00 (57.827) | 18.85 (83.849) |
| Tensile Energy, MD in lbs (J) | 84.5 (9.55) | 124.7 (14.10) | 84.5 (9.55) | 124.8 (14.10) | 95.9 (10.84) | 139.4 (15.75) |
| Tensile Energy, TD in lbs (J) | 77.2 (8.73) | 122.0 (13.79) | 89.1 (10.07) | 121.7 (13.75) | 89.4 (10.10) | 134.5 (15.20) |
| 1% Secant Modulus, MD psi (MPa) | 28367 (195.584) | 29445 (203.016) | 43953 (303.045) | 45104 (310.981) | 43944 (302.983) | 43879 (302.535) |
| 1% Secant Modulus, TD psi (MPa) | 33961 (234.153) | 33962 (234.160) | 51805 (357.183) | 51755 (356.838) | 53692 (370.193) | 51100 (352.322) |
| Haze (%) | 9.0 | 11.1 | 12.0 | 13.5 | 13.8 | 13.1 |
| Gloss, MD | 63.3 | 64.0 | 51.8 | 53.0 | 46.3 | 53.9 |
| Gloss, TD | 64.4 | 66.0 | 53.5 | 53.5 | 48.6 | 56.0 |
| Peak Puncture Force lb (N) | 17.90 (79.623) | 24.89 (110.716) | 16.37 (72.817) | 25.51 (113.47) | 18.55 (82.515) | 27.36 (121.703) |
| Peak Puncture Force per mil | 8.77 | 8.16 | 8.19 | 8.89 | 8.88 | 9.03 |
| Puncture Break Energy in-lb (J) | 50.63 (5.72) | 72.37 (8.18) | 34.88 (3.94) | 63.38 (7.16) | 41.04 (4.64) | 73.74 (8.34) |
| Puncture Break Energy per mil | 24.82 | 23.73 | 17.44 | 22.08 | 19.64 | 24.34 |
| Total Energy ft lb (J) | 0.45 (0.61) | 0.68 (0.93) | 0.21 (0.29) | 0.29 (0.40) | 0.22 (0.30) | 0.33 (0.45) |
| COF (I/I) - Kinetic | 0.672 | 0.71 | 0.46 | 0.43 | 0.45 | 0.44 |
| COF (I/I) - Static | 0.78 | 0.79 | 0.50 | 0.48 | 0.50 | 0.49 |
| Shrink, MD (%) | 77 | 72 | 75 | 72 | 78 | 73 |
| Shrink, TD (%) | −5 | 0 | 5 | 6 | 6 | 7 |

Examples 62-64

Inventive LLDPE resin and two control resins were processed into cast film on a film line manufactured by Black Clawson Equipment having a 3½-inch (8.89 cm) extruder with a barrier screw, a 42 inch (106.68 cm) wide die, a nominal 20 mil die gap, and a 30 inch (76.2 cm) diameter primary chill roll. The line was operated at normal conditions of approximately 540 lbs (244.940 kg) per hour, a melt curtain length of about 5 inches (12.7 cm), and an average 570° F. (298.89° C.) melt temperature. The chill roll temperature was approximately 80° F. (26.67° C.). Nominal 0.80 mil films were produced at a line speed of approximately 750 feet (228.6 m) per minute. Properties of the resulting films are presented in Tables 16 and 17. The films presented in Table 16 were laboratory aged, while the films in Table 17 were aged for 48 hours at 140° F. (60° C.).

TABLE 16

| | Example # | | |
|---|---|---|---|
| | 62 | 63 | 64 |
| Composition | Inventive LLDPE | Traditional LLDPE | Traditional LLDPE |
| Comonomer | Hexene | Hexene | Hexene |
| Density (nominal) | 0.920 | 0.918 | 0.918 |
| Melt Index | 1.9 | 3.5 | 3.2 |
| Melt Index Ratio | 34 | 16 | 28 |
| Tensile @ Yield, MD psi (MPa) | 1,139 (7.853) | 975 (6.722) | 886 (6.109) |
| Tensile @ Yield, TD psi (MPa) | 990 (6.826) | 901 (6.212) | 1,000 (6.895) |
| Ultimate Tensile, MD psi (MPa) | 10,728 (73.967) | 9,834 (67.803) | 9,012 (62.136) |
| Ultimate Tensile, TD psi (MPa) | 5,701 (39.307) | 7,314 (50.428) | 5,420 (37.370) |
| Elongation @ Yield, MD (%) | 7.7 | 8.0 | 6.2 |
| Elongation @ Yield, TD (%) | 6.5 | 9.0 | 6.1 |
| Break Elongation, MD (%) | 363 | 439 | 450 |
| Break Elongation, TD (%) | 717 | 734 | 822 |
| 1% Secant Modulus, MD kpsi (MPa) | 19 (131) | 16 (110) | 17 (117) |
| 1% Secant Modulus, TD kpsi (MPa) | 23 (159) | 18 (124) | 20 (138) |
| Elmendorf Tear, MD (g) | 65.9 | 130 | 106.6 |
| Elmendorf Tear, TD (g) | 472 | 489.6 | 700 |
| Elmendorf Tear per mil, MD | 81.84 | 159.03 | 132.77 |
| Elmendorf Tear per mil, TD | 565.57 | 596.79 | 859.01 |
| Dart $F_{50}$ (g) | 119.5 | 403 | 72.5 |
| Dart $F_{50}$ per mil | 147.53 | 491.46 | 88.41 |
| Average Gauge (mil) | 0.81 | 0.82 | 0.82 |
| Gloss | 88.7 | 88.1 | 92.5 |
| Puncture Peak Force lb (N) | 10.82 (48.130) | 10.95 (48.708) | 8.40 (35.586) |
| Puncture Peak Force per mil | 13.36 | 13.36 | 10.24 |
| Puncture Break Energy in-lb (J) | 28.82 (3.26) | 37.46 (4.24) | 29.46 (3.33) |
| Puncture Break Energy per mil | 35.58 | 45.68 | 35.92 |
| Shrink, MD (%) | 86 | 45 | 61 |
| Shrink, TD (%) | −41 | −4 | −15 |
| Highlight Ultimate Stretch (%) | 208.75 | 298.01 | 281.15 |
| Highlight Stretch Force lbs (N) | 131.58 (585.30) | 82.7 (367.87) | 83.39 (370.94) |

TABLE 16-continued

| | Example # | | |
|---|---|---|---|
| | 62 | 63 | 64 |
| Maximum Highlight Retention @ 200% lbs (N) | 2.98 (13.256) | 2.14 (9.519) | 1.93 (8.585) |
| Ending Highlight Retention @ 200% lbs (N) | 2.62 (11.654) | 1.9 (8.452) | 1.67 (7.429) |

TABLE 17

| | Example # | | |
|---|---|---|---|
| | 65 | 66 | 67 |
| Composition | Inventive LLDPE | Traditional LLDPE | Traditional LLDPE |
| Comonomer | Hexene | Hexene | Hexene |
| Density (nominal) | 0.920 | 0.918 | 0.918 |
| Melt Index | 1.9 | 3.5 | 3.2 |
| Melt Index Ratio | 34 | 16 | 28 |
| Tensile @ Yield, MD psi (MPa) | 1,393 (9.604) | 1,164 (8.025) | 1,318 (9.087) |
| Tensile @ Yield, TD psi (MPa) | 134 (0.924) | 1,104 (7.612) | 1,279 (8.818) |
| Ultimate Tensile, MD psi (MPa) | 11,532 (79.510) | 10,810 (74.532) | 9,956 (68.644) |
| Ultimate Tensile, TD psi (MPa) | 5,906 (40.720) | 7,485 (51.607) | 559 (3.854) |
| Elongation @ Yield, MD (%) | 6.8 | 7.5 | 7.3 |
| Elongation @ Yield, TD (%) | 6.2 | 6.3 | 6.1 |
| Break Elongation, MD (%) | 334 | 437.33 | 462 |
| Break Elongation, TD (%) | 756 | 732.83 | 868 |
| 1% Secant Modulus, MD kpsi (MPa) | 21 (145) | 17 (117) | 20 (138) |
| 1% Secant Modulus, TD kpsi (MPa) | 28 (193) | 20 (138) | 25 (172) |
| Elmendorf Tear, MD (g) | 53.5 | 108.8 | 55.2 |
| Elmendorf Tear, TD (g) | 678.4 | 565.6 | 836.8 |
| Elmendorf Tear per mil, MD | 63.38 | 130.95 | 67.87 |
| Elmendorf Tear per mil, TD | 786.01 | 675.53 | 1025.08 |
| Dart $F_{50}$ (g) | 86 | 122.5 | 49.75 |
| Dart $F_{50}$ per mil | 101.18 | 151.23 | 60.67 |
| Average Gauge (mil) | 0.85 | 0.81 | 0.82 |
| Haze (%) | 2.1 | 1.9 | 1.6 |
| Gloss | 89.3 | 90 | 83.3 |
| Puncture Peak Force lb (N) | 10.24 (45.548) | 11.29 (50.220) | 7.60 (33.806) |
| Puncture Peak Force per mil | 12.05 | 13.94 | 9.26 |
| Puncture Break Energy in-lb (J) | 24.16 (2.73) | 40.77 (4.61) | 22.95 (2.60) |
| Puncture Break Energy per mil | 28.42 | 50.33 | 27.99 |
| Shrink, MD (%) | 87 | 46 | 59 |
| Shrink, TD (%) | −49 | −5 | −16 |
| Highlight Ultimate Stretch (%) | 208.75 | 298.01 | 281.15 |
| Highlight Stretch Force lbs (N) | 131.58 (585.297) | 82.7 (367.868) | 83.39 (370.937) |
| Maximum Highlight Retention @ 200% lbs (N) | 2.98 (13.256) | 2.14 (9.519) | 1.93 (8.585) |
| Ending Highlight Retention @ 200% lbs (N) | 2.62 (11.654) | 1.9 (8.452) | 1.67 (7.429) |

The inventive LLDPE resin was compared with higher MI traditional LLDPE resins to provide a comparison of resins with similar processing. Cast films were tested for physical properties both after lab aging and utilizing the 48 hrs at 140° F. (60° C.) aging standard used for cast metallocene films. The results show that the inventive film of Examples 62 and 65 is more orientation sensitive than the traditional films of Examples 63, 64, 66, and 67, resulting in a very stiff, high stretch force film. It is believed that performance of the inventive films can be optimized by adjusting processing conditions and resin selection and by using the LLDPE resin as a modifier in a formulated film.

Examples 68-69

Inventive LLDPE resin and a control resin were processed into blown film on a Sano blown film line having a 3½-inch (8.89 cm) extruder with a barrier screw, a 10 inch (25.4 cm) diameter die, a nominal 60 mil die gap, and a dual lip air ring with chilled air at approximately 50° F. (10° C.). The line was operated at nominal 314 pounds (142.428 kg) per hour with a 30 inch (76.2 cm) frost line height and 2.5 blow up ratio (BUR). Nominal 0.80 mil films were produced. Properties of the resulting films are presented in Table 18.

TABLE 18

| | Example # | |
|---|---|---|
| | 68 | 69 |
| Composition | Inventive LLDPE | Traditional LLDPE |
| Comonomer | Hexene | Hexene |
| Melt Index | 1.06 | 1.12 |
| Density | 0.919 | 0.921 |
| Tensile @ Yield, MD psi (MPa) | 1,480 (10.204) | 1,300 (8.963) |
| Tensile @ Yield, TD psi (MPa) | 1,580 (10.894) | 1,260 (8.687) |
| Ultimate Tensile, MD psi (MPa) | 8,390 (57.847) | 9,490 (65.431) |
| Ultimate Tensile, TD psi (MPa) | 7,050 (48.608) | 8,060 (55.571) |

TABLE 18-continued

| | Example # | |
|---|---|---|
| | 68 | 69 |
| Elongation @ Yield, MD (%) | 5.7 | 6.4 |
| Elongation @ Yield, TD (%) | 5.5 | 5.9 |
| Ultimate Elongation, MD (%) | 460 | 510 |
| Ultimate Elongation, TD (%) | 660 | 620 |
| 1% Secant Modulus, MD psi (MPa) | 31,200 | 24,220 |
| | (215.116) | (166.991) |
| 1% Secant Modulus, TD psi (MPa) | 36,020 | 25,970 |
| | (248.349) | (179.057) |
| Puncture Force lbs/mil (N/mil) | 9.28 | 10.70 |
| | (41.280) | (47.596) |
| Puncture Energy (in-lb/mil) | 23.1 | 33.3 |
| | (2.61) | (3.77) |
| Elmendorf Tear, MD (g/mil) | 185 | 235 |
| Elmendorf Tear, TD (g/mil) | 590 | 375 |
| Dart $F_{50}$ (g) | 180 | 755 |
| Dart $F_{50}$ per mil | 214 | 910 |
| Average Gauge (mils) | 0.84 | 0.83 |
| Haze (%) | 16.8 | 29.7 |
| Gloss | 37.2 | 26.5 |
| Shrinkage, MD (%) | 77 | 39 |
| Shrinkage, TD (%) | −2 | 3 |
| Highlight Ultimate Stretch (%) | 392 | 314 |
| Highlight Stretch Force lbs (N) | 114 | 76 |
| | (507.097) | (338.065) |
| Maximum Highlight Retention @ 200% (lbs) | 2.57 | 1.86 |
| | (11.432) | (8.274) |
| Ending Highlight Retention @ 200% (lbs) | 2.20 | 1.66 |
| | (9.786) | (7.384) |
| Maximum Highlight Retention @ 300% (lbs) | 2.89 | n/a |
| | (12.855) | |
| Ending Highlight Retention @ 300% (lbs) | 2.50 | n/a |
| | (11.121) | |

The results given in Table 18 show that the inventive LLDPE resin is more orientation sensitive than the traditional LLDPE control sample resulting in a very stiff, high stretch force film. The highlight stretch performance of the inventive film, reported above, occurs at a stretch force that is 50% higher than the traditional film. This high stretch force shows that inventive films have greatly improved stretch film load retention, which provides superior load holding in end-use applications. The inventive films also had good dart impact strength and TD tear strength about 50% higher than the traditional film. This property balance shows that properly formulated inventive LLDPE film will provide outstanding performance in medium-and high-stretch machine stretch applications.

The blown resins were also evaluated for melt strength and drawdown. The broader molecular weight distribution inventive LLDPE resins have an MI ratio that is double that of the traditional resins. The inventive LLDPE resin has higher melt strength and easier control of melt temperature, which provides improved blown film bubble stability.

Examples 70-114 were prepared with the resins identified in Table 19:

TABLE 19

| Resin Grade | Catalyst | Comonomer | Commercially Available | Melt Index (I2) | Density (g/cc) |
|---|---|---|---|---|---|
| Resin A | Ziegler | Butene | Yes | 2 | 0.918 |
| Resin B | Ziegler | Hexene | Yes | 1 | 0.918 |
| Resin C | Ziegler | Hexene | Yes | 2 | 0.918 |
| Resin D | Ziegler | Hexene | Yes | 3.2 | 0.918 |
| Resin E | Free Radical | | Yes | 2 | 0.923 |
| Resin F | Ziegler | Butene | Yes | 1 | 0.918 |
| Resin G | Free Radical | | Yes | 0.3 | 0.923 |
| Resin H* | Metallocene | Hexene | Yes | 1 | 0.92 |
| Inventive LLDPE #1 | Metallocene | Hexene | No | 1 | 0.92 |
| Inventive LLDPE #2 | Metallocene | Hexene | No | 0.5 | 0.92 |
| VLDPE | Metallocene | Hexene | Yes | 1 | 0.912 |

*Resin contains no long chain branching; available as Exceed ® from ExxonMobil

Examples 70-86

Examples 70-86 illustrate and compare exemplary and conventional five layer stretch film handwrap. The films of examples 70-86 were 5 layer A/B/C/B/A films at layer weight percentages 15/20/30/20/15. The composition of examples 70-86 are given in Table 20:

TABLE 20

| | Film Layer | | |
|---|---|---|---|
| Sample ID | A = 30 wt. % | B = 40 wt. % | C = 30 wt. % |
| 70 | 100% Resin A | 100% Resin A | 100% Resin A |
| 71 | 100% Resin A | 100% Resin A | 100% Resin A |
| 72 | 100% Resin A | 100% Resin A | 100% Inventive LLDPE |
| 73 | 100% Resin A | 100% Inventive LLDPE | 100% Resin A |
| 74 | 100% Resin A | 30% Resin A | 70% Inventive LLDPE | 100% Inventive LLDPE |
| 75 | 100% Resin A | 30% Resin A | 70% Resin B | 100% Resin B |
| 76 | 100% Resin D | 30% Resin A | | 100% Resin A |
| 77 | 100% Resin D | 30% Resin A | 70% Resin B | 100% Resin B |
| 78 | 100% Resin D | 30% Resin A | | 100% Inventive LLDPE |
| 79 | 100% Resin D | 30% Resin A | 70% Inventive LLDPE | 100% Inventive LLDPE |
| 80 | 100% Resin D | 100% Resin C | | 100% Resin C |
| 81 | 100% Resin D | 90% Resin C | 10% Inventive LLDPE | 100% Resin C |

TABLE 20-continued

| | Film Layer | | | |
|---|---|---|---|---|
| Sample ID | A = 30 wt. % | B = 40 wt. % | | C = 30 wt. % |
| 82 | 100% Resin D | 80% Resin C | 20% Inventive LLDPE | 100% Resin C |
| 83 | 100% Resin D | 60% Resin C | 40% Inventive LLDPE | 100% Resin C |
| 84 | 100% Resin D | 90% Resin C | 10% Resin E | 100% Resin C |
| 85 | 100% Resin D | 80% Resin C | 20% Resin E | 100% Resin C |
| 86 | 100% Resin D | 60% Resin C | 40% Resin E | 100% Resin C |

Resin formulations were processed into cast film on a cast line manufactured by Black Clawson Equipment. A and B extruders were 3.5 inch (8.89 cm) extruders with barrier screws, while C Extruder had a 2.5 inch (6.35 cm) diameter with a barrier screw. The cast line had a 42 inch (106.68 cm) wide die, nominal 20 mil die gap, and 30 inch diameter primary chill roll. The line was set up for 5 layer operation as A/B/C/B/A. For each run, the line was operated at ~575 lbs (260.816 kg) per hour, at ~4 to 5 (10.16 to 12.7 cm) inch melt curtain length, 540° F. (282.22° C.) average melt temperature producing nominal 0.6 to 0.7 mil film at ~750 feet (228.6 m) per minute line speed. The chill roll temperature was 80° F. (26.67° C.).

Properties of the resulting films are presented in Tables 21A, 21B, and 21C.

TABLE 21A

| Sample Description | 70 Comp. | 71 Comp. | 72 Inventive | 73 Inventive | 74 Inventive | 75 Comp. |
|---|---|---|---|---|---|---|
| 1% Secant Modulus psi (MPa) | | | | | | |
| MD | 17,666 (121.803) | 17,613 (121.437) | 18,689 (128.856) | 17,620 (121.486) | 18,147 (125.119) | 17,279 (119.135) |
| TD | 22,414 (154.539) | 21,894 (150.954) | 23,145 (159.579) | 24,549 (121.486) | 26,513 (125.119) | 24,057 (119.135) |
| Tensile Yield Strength psi (MPa) | | | | | | |
| MD | 1,150 (7.929) | 1,192 (8.219) | 1,268 (8.743) | 1,139 (7.853) | 1,198 (8.260) | 1,194 (8.232) |
| TD | 1,035 (7.136) | 981 (6.764) | 994 (6.853) | 994 (6.853) | 1,024 (7.060) | 1,021 (7.040) |
| MD Tensile @ 50% | 1,887 (13.010) | 2,011 (13.865) | 2,801 (19.312) | 3,036 (20.932) | 3,730 (25.717) | 2,092 (14.424) |
| MD Tensile @ 100% | 1,977 (13.631) | 2,112 (14.562) | 3,038 (20.946) | 3,382 (23.318) | 4,110 (28.337) | 2,290 (15.789) |
| Elongation @ Yield (%) | | | | | | |
| MD | 7.5 | 8.0 | 8.5 | 8.1 | 8.9 | 7.9 |
| TD | 5.6 | 5.6 | 4.9 | 5.5 | 4.9 | 5.6 |
| Tensile Strength psi (MPa) | | | | | | |
| MD | 8,816 (60.784) | 9,322 (64.273) | 9,794 (67.527) | 10,184 (70.216) | 9,119 (62.873) | 9,951 (68.610) |
| TD | 3,747 (25.835) | 3,823 (26.359) | 4,111 (28.344) | 4,133 (28.496) | 4,209 (29.020) | 4,350 (29.992) |
| Elongation @ Break (%) | | | | | | |
| MD | 351 | 330 | 282 | 256 | 213 | 288 |
| TD | 846 | 863 | 762 | 780 | 753 | 838 |
| Elmendorf Tear | | | | | | |
| MD (gms) | 14 | 11 | 164 | 180 | 107 | 157 |
| TD (gms) | 407 | 415 | 489 | 476 | 430 | 525 |
| MD Tear (gms/mil) | 19 | 18 | 264 | 265 | 161 | 248 |
| TD Tear (gms/mil) | 566 | 655 | 786 | 726 | 670 | 834 |
| Dart Drop | | | | | | |
| Gms | <48** | <48** | <48** | <48** | <48** | <48** |
| Gms/mil | <67** | <75** | <76** | <72** | <72** | <76** |
| Puncture | | | | | | |
| Peak Load lbs (N) | 7.7 (34.251) | 6.8 (30.248) | 7.8 (34.696) | 8.7 (38.700) | 9.0 (40.034) | 7.8 (34.696) |
| Puncture Force lbs/mil (N/mil) | 10.8 (48.041) | 10.6 (47.151) | 12.4 (55.158) | 13.0 (57.827) | 13.5 (60.051) | 12.4 (55.158) |
| Break Energy in-lb (J) | 23.1 (2.61) | 17.9 (2.03) | 19.4 (2.20) | 21.0 (2.38) | 19.7 (2.23) | 22.1 (2.50) |

TABLE 21A-continued

| Sample Description | 70 Comp. | 71 Comp. | 72 Inventive | 73 Inventive | 74 Inventive | 75 Comp. |
|---|---|---|---|---|---|---|
| Break Energy/mil in-lb/mil (J/mil) | 32.0 (3.62) | 27.9 (3.16) | 30.8 (3.48) | 31.3 (3.54) | 29.4 (3.33) | 35.0 (3.96) |
| Haze (%) D1003-00 | 1.8 | 1.6 | 1.6 | 1.8 | 1.8 | 1.9 |
| Gloss 45 degree (GU) D2457-03 | | | | | | |
| MD | 91 | 92 | 91 | 89 | 88 | 90 |
| TD | 92 | 93 | 92 | 87 | 87 | 91 |
| Shrinkage (%) | | | | | | |
| MD | 75 | 76 | 86 | 87 | 86 | 80 |
| TD | −28 | −28 | −44 | −49 | −44 | −36 |
| Gauge Mic (mils) | | | | | | |
| Average | 0.72 | 0.64 | 0.63 | 0.67 | 0.67 | 0.63 |
| Low | 0.69 | 0.61 | 0.61 | 0.63 | 0.63 | 0.60 |
| High | 0.75 | 0.68 | 0.67 | 0.72 | 0.70 | 0.69 |
| Highlight Stretch - Ultimate | | | | | | |
| Stretch (%) - Avg of 3 | 176.73 | 175.00 | 165.85 | 122.35 | 102.76 | 178.01 |
| HL Stretch Force | 67.72 | 63.64 | 85.92 | 96.27 | 111.69 | 77.65 |
| Highlight Puncture Force | | | | | | |
| @ 90% Stretch | | | | | 5.40 | |
| @ 100% Stretch | 0.63 | 0.66 | 4.77 | 4.20 | | 4.47 |
| @ 150% Stretch | | | 2.43 | | | 4.69 |

Films 72-74 were compared with frequently used commercial stretch handwrap resin formulations with butene (Resin A) and hexene (Resin B). The Inventive Films had the highest MD Tensile at 50% and at 100% stretch, best combination of MD tear with puncture force performance at least 20% greater than all other films. Highlight Stretch testing show that Inventive film 74 Stretch Force is 50% greater than all control films. This combination of excellent MD tear, puncture and very high film stretch force is very unusual and provides improved performance and the ability to downgauge for cast handwrap.

TABLE 21B

| Sample Description | 76 Comparative | 77 Comparative | 78 Inventive | 79 Inventive | 80 Comparative |
|---|---|---|---|---|---|
| 1% Secant Modulus psi (MPa) | | | | | |
| MD | 16,125 (111.178) | 17,695 (122.003) | 18,533 (127.781) | 19,102 (131.704) | 17,322 (119.431) |
| TD | 20,913 (144.190) | 23,678 (163.254) | 23,484 (161.917) | 24,994 (172.328) | 21,915 (151.099) |
| Tensile Yield Strength psi (MPa) | | | | | |
| MD | 1,146 (7.901) | 1,165 (8.032) | 1,148 (7.915) | 1,227 (8.460) | 1,144 (7.888) |
| TD | 958 (6.605) | 1,046 (7.212) | 1,041 (7.915) | 1,097 (8.460) | 1,034 (7.888) |
| MD Tensile @ 50% | 1,901 (13.107) | 2,053 (14.155) | 2,535 (17.478) | 3,482 (24.008) | 1,834 (12.645) |
| MD Tensile @ 100% | 1,970 (13.582) | 2,274 (15.679) | 2,773 (15.672) | 3,802 (26.214) | 1,948 (13.431) |
| Elongation @ Yield (%) | | | | | |
| MD | 7.6 | 7.5 | 7.8 | 8.5 | 7.3 |
| TD | 5.4 | 5.2 | 5.4 | 5.3 | 5.9 |
| Tensile Strength psi (MPa) | | | | | |
| MD | 8,926 (57.199) | 10,190 (70.258) | 9,642 (66.479) | 10,252 (70.685) | 9,820 (67.707) |
| TD | 4,105 (28.303) | 5,941 (40.962) | 4,845 (33.405) | 5,447 (37.556) | 5,553 (38.287) |
| Elongation @ Break (%) | | | | | |
| MD | 351 (2.420) | 289 (1.993) | 310 (2.137) | 264 (1.820) | 365 (2.517) |
| TD | 832 (5.736) | 882 (6.081) | 801 (5.523) | 793 (5.468) | 868 (5.985) |
| Elmendorf Tear | | | | | |
| MD (gms) | 124 | 235 | 217 | 114 | 229 |
| TD (gms) | 434 | 618 | 502 | 556 | 627 |

TABLE 21B-continued

| Sample Description | 76 Comparative | 77 Comparative | 78 Inventive | 79 Inventive | 80 Comparative |
|---|---|---|---|---|---|
| MD Tear (gms/mil) | 198 | 375 | 342 | 181 | 374 |
| TD Tear (gms/mil) | 711 | 987 | 800 | 897 | 1,019 |
| Dart Drop | | | | | |
| Gms | <48 | 55 | 58 | <48 | 56 |
| gms/mil | <80 | 90 | 93 | <79 | 93 |
| Puncture | | | | | |
| Peak Load lbs (N) | 6.7 | 8.4 | 8.0 | 8.7 | 7.4 |
| | (29.803) | (37.365) | (35.586) | (36.700) | (32.917) |
| Puncture Force | 11.2 | 13.8 | 12.9 | 14.3 | 12.4 |
| lbs/mil (N/mil) | (49.820) | (61.385) | (57.382) | (63.610) | (55.158) |
| Break Energy in-lb (J) | 19.0 | 24.1 | 22.4 | 22.4 | 25.4 |
| | (2.15) | (2.73) | (2.53) | (2.53) | (2.87) |
| Break Energy/mil | 31.6 | 39.5 | 36.2 | 36.8 | 42.3 |
| in-lb/mil (J/mil) | (3.57) | (4.47) | (4.09) | (4.16) | (4.78) |
| Haze (%) D1003-00 | 1.6 | 2.1 | 1.5 | 1.5 | 1.7 |
| Gloss 45 degree (GU) D2457-03 | | | | | |
| MD | 91 | 89 | 90 | 89 | 91 |
| TD | 93 | 91 | 92 | 91 | 91 |
| Shrinkage (%) | | | | | |
| MD | 73 | 82 | 85 | 87 | 77 |
| TD | −29 | −38 | −43 | −51 | −29 |
| Gauge Mic (mils) | | | | | |
| Average | 0.60 | 0.61 | 0.62 | 0.61 | 0.60 |
| Low | 0.56 | 0.57 | 0.57 | 0.57 | 0.58 |
| High | 0.63 | 0.63 | 0.66 | 0.65 | 0.64 |
| Highlight Stretch - Ultimate | | | | | |
| Stretch (%) - Avg of 3 | 231.03 | 178.11 | 191.57 | 135.56 | 199.44 |
| HL Stretch Force | 73.88 | 80.98 | 83.95 | 105.19 | 62.19 |
| Highlight Puncture Force | | | | | |
| @ 100% Stretch | 1.15 | 4.69 | | | 2.31 |
| @ 150% Stretch | | 4.1 | | | |

Inventive films 78 & 79 are compared with frequently used commercial stretch handwrap resin formulations with butene (Resin A) and hexenes (Resin B & C, respectively). For these samples Resin D is used in A Extruder for film surface layers targeting constant 30% of total film for all samples.

The Inventive Films had excellent combination of MD tear and puncture force and have the highest MD Tensile at 50% and at 100% stretch. Inventive film 78, which includes 40% butene (Resin A), has overall toughness/stiffness performance far superior to 100% hexene comparative sample 80. This combination of excellent MD tear, puncture and very high film stretch force is very unusual and provides excellent performance for and ability to downgauge cast handwrap.

TABLE 21C

| | 81 Inventive | 82 Inventive | 83 Inventive | 84 Comp. | 85 Comp. | 86 Comp. |
|---|---|---|---|---|---|---|
| 1% Secant Modulus psi (MPa) | | | | | | |
| MD | 17,882 | 17,480 | 17,671 | 20,228 | 22,079 | 26,749 |
| | (123.292) | (120.520) | (121.837) | (139.467) | (152.229) | (184.428) |
| TD | 21,705 | 21,705 | 22,413 | 24,365 | 25,799 | 29,802 |
| | (149.651) | (149.651) | (154.532) | (167.991) | (177.878) | (205.478) |
| Tensile Yield Strength psi (MPa) | | | | | | |
| MD | 1,134 | 1,149 | 1,134 | 1,340 | 1,531 | 2,050 |
| | (7.819) | (7.922) | (7.819) | (9.239) | (10.556) | (14.134) |
| TD | 1,016 | 1,062 | 1,046 | 1,047 | 1,089 | 1,156 |
| | (7.005) | (7.322) | (7.212) | (7.219) | (7.509) | (7.970) |
| MD Tensile @ 50% | 1,916 | 2,022 | 2,201 | 2,391 | 2,816 | 3,767 |
| | (13.210) | (13.941) | (15.175) | (16.485) | (19.416) | (25.973) |
| MD Tensile @ 100% | 2,030 | 2,187 | 2,421 | 2,383 | 2,735 | 3,592 |
| | (13.996) | (15.078) | (16.692) | (16.430) | (18.857) | (24.766) |
| Elong @ Yield (%) | | | | | | |
| MD | 7.3 | 7.3 | 7.1 | 7.4 | 7.6 | 8.2 |
| TD | 5.5 | 5.8 | 5.6 | 5.1 | 5.1 | 5.2 |

TABLE 21C-continued

|  | 81 Inventive | 82 Inventive | 83 Inventive | 84 Comp. | 85 Comp. | 86 Comp. |
|---|---|---|---|---|---|---|
| Tensile Strength psi (MPa) | | | | | | |
| MD | 10,111 (69.713) | 10,765 (74.222) | 9,399 (64.804) | 9,476 (65.335) | 9,713 (66.969) | 9,019 (62.184) |
| TD | 5,597 (38.590) | 5,647 (38.935) | 5,672 (39.107) | 5,292 (36.487) | 5,329 (36.742) | 4,643 (32.012) |
| Elongation @ Break (%) | | | | | | |
| MD | 367 (2.530) | 369 (2.544) | 325 (2.241) | 360 (2.482) | 386 (2.661) | 371 (2.558) |
| TD | 863 (5.950) | 846 (5.833) | 843 (5.812) | 852 (5.874) | 868 (5.985) | 858 (5.916) |
| Elmendorf Tear | | | | | | |
| MD (gms) | 227 | 255 | 208 | 58 | 15 | 9 |
| TD (gms) | 634 | 650 | 639 | 651 | 669 | 688 |
| MD Tear (gms/mil) | 363 | 402 | 339 | 102 | 24 | 13 |
| TD Tear (gms/mil) | 999 | 1,036 | 1,059 | 1,136 | 1,090 | 1,012 |
| Dart Drop | | | | | | |
| Gms | <48 | 58 | 57 | <48 | <48 | <48 |
| Gms/mil | <79 | 94 | 93 | <81 | <79 | <72 |
| Puncture | | | | | | |
| Peak Load lbs (N) | 7.3 (32.472) | 7.5 (33.362) | 7.8 (34.696) | 7.1 (31.582) | 7.4 (32.917) | 8.2 (36.475) |
| Puncture Force lbs/mil (N/mil) | 11.9 (52.934) | 12.3 (54.713) | 12.8 (56.937) | 12.1 (53.823) | 12.1 (53.823) | 12.3 (54.713) |
| Break Energy in-lb (J) | 24.2 (2.74) | 24.7 (2.79) | 24.2 (2.74) | 22.5 (2.55) | 20.9 (2.37) | 20.0 (2.26) |
| Break Energy/mil in-lb/mil (J/mil) | 39.6 (4.48) | 40.6 (4.59) | 39.7 (4.49) | 38.1 (4.31) | 34.3 (3.88) | 29.9 (3.38) |
| Haze (%) D1003-00 | 1.6 | 1.6 | 1.6 | 1.5 | 1.5 | 1.4 |
| Gloss 45 degree (GU) D2457-03 | | | | | | |
| MD | 91 | 90 | 90 | 91 | 90 | 91 |
| TD | 91 | 91 | 91 | 91 | 91 | 91 |
| Shrinkage (%) | | | | | | |
| MD | 76 | 79 | 81 | 80 | 82 | 85 |
| TD | −27 | −30 | −33 | −32 | −40 | −53 |
| Gauge Mic (mils) | | | | | | |
| Average | 0.61 | 0.61 | 0.61 | 0.59 | 0.61 | 0.67 |
| Low | 0.57 | 0.58 | 0.56 | 0.57 | 0.59 | 0.61 |
| High | 0.65 | 0.64 | 0.63 | 0.62 | 0.63 | 0.70 |
| Highlight Stretch - Ultimate | | | | | | |
| Stretch (%) - Avg of 3 | 239.15 | 234.12 | 190.08 | 242.99 | 227.47 | 43.20 |
| HL Stretch Force | 77.49 | 77.16 | 73.33 | 76.17 | 84.90 | 113.59 |
| Highlight Puncture Force | | | | | | |
| @ 100% Stretch | 3.94 | 4.05 | 2.80 | 2.56 | 3.85 | |
| @ 150% Stretch | 2.19 | 1.38 | 1.67 | 1.68 | 1.43 | |

As shown in Table 21C, films 81-83 were compared with frequently used commercial stretch handwrap resin formulations with butene (Resin A) and hexene (Resin B) in similar films where Resin E is used in place of inventive LLDPE. For these samples Resin D was used in A Extruder for film surface layers targeting constant 30 wt. % of the total film for all samples. The inventive films had a good combination of MD tear and puncture force. The inventive films had the highest MD Tear with enhanced MD Tensile at 50% and at 100% stretch. The comparative LDPE formulations exhibited low MD tear which indicates undesirable susceptibility to splitting. The inventive films exhibited a combination of excellent MD tear, puncture, and high film stretch force that is unusual and provides improved performance for cast handwrap. As shown in Tables 21A, 21B, and 21C, low levels of LDPE can be used to increase handwrap film stiffness.

Examples 87-96

Examples 87-96 illustrate and compare exemplary seven layer stretch handwrap films. Examples 70-80 were prepared with the resins described in Table 19. The films of examples 87-96 were 7 layer A/B/C/B/C/B/D films at layer weight percentages 10/10/25/10/25/10/10. The composition of each film is provided in Table 22:

TABLE 22

| Sample ID | Layers | A | B | C | B | C | B | D |
|---|---|---|---|---|---|---|---|---|
| 87 | Layer Ratio | 10 | 10 | 25 | 10 | 25 | 10 | 10 |
| | Inventive LLDPE #2 | 0 | 0 | 0 | 0 | 0 | 0 | 0 |
| | Inventive | 0 | 75 | 0 | 75 | 0 | 75 | 0 |

TABLE 22-continued

| Sample ID | Layers | A | B | C | B | C | B | D |
|---|---|---|---|---|---|---|---|---|
|  | Inventive LLDPE #1 |  |  |  |  |  |  |  |
|  | Resin A | 100 | 25 | 100 | 25 | 100 | 25 | 80 |
|  | VLDPE | 0 | 0 | 0 | 0 | 0 | 0 | 20 |
| 88 | Layer Ratio | 10 | 10 | 25 | 10 | 25 | 10 | 10 |
|  | Inventive LLDPE #2 | 0 | 0 | 0 | 0 | 0 | 0 | 0 |
|  | Inventive LLDPE #1 | 0 | 100 | 0 | 100 | 0 | 100 | 0 |
|  | Resin A | 100 | 0 | 100 | 0 | 100 | 0 | 80 |
|  | VLDPE | 0 | 0 | 0 | 0 | 0 | 0 | 20 |
| 89 | Layer Ratio | 10 | 10 | 25 | 10 | 25 | 10 | 10 |
|  | Inventive LLDPE #2 | 0 | 0 | 0 | 0 | 0 | 0 | 0 |
|  | Inventive LLDPE #1 | 0 | 100 | 0 | 100 | 0 | 100 | 0 |
|  | Resin A | 100 | 0 | 100 | 0 | 100 | 0 | 80 |
|  | VLDPE | 0 | 0 | 0 | 0 | 0 | 0 | 20 |
| 90 | Layer Ratio | 10 | 10 | 25 | 10 | 25 | 10 | 10 |
|  | Inventive LLDPE #2 | 0 | 100 | 0 | 100 | 0 | 100 | 0 |
|  | Inventive LLDPE #1 | 0 | 0 | 0 | 0 | 0 | 0 | 0 |
|  | Resin A | 100 | 0 | 100 | 0 | 100 | 0 | 80 |
|  | VLDPE | 0 | 0 | 0 | 0 | 0 | 0 | 20 |
| 91 | Layer Ratio | 10 | 10 | 25 | 10 | 25 | 10 | 10 |
|  | Inventive LLDPE #2 | 0 | 100 | 0 | 100 | 0 | 100 | 0 |
|  | Inventive LLDPE #1 | 0 | 0 | 0 | 0 | 0 | 0 | 0 |
|  | Resin A | 100 | 0 | 100 | 0 | 100 | 0 | 80 |
|  | VLDPE | 0 | 0 | 0 | 0 | 0 | 0 | 20 |
| 92 | Layer Ratio | 10 | 10 | 25 | 10 | 25 | 10 | 10 |
|  | Inventive LLDPE #2 | 0 | 100 | 25 | 100 | 25 | 100 | 0 |
|  | Inventive LLDPE #1 | 0 | 0 | 0 | 0 | 0 | 0 | 0 |
|  | Resin A | 100 | 0 | 75 | 0 | 75 | 0 | 80 |
|  | VLDPE | 0 | 0 | 0 | 0 | 0 | 0 | 20 |
| 93 | Layer Ratio | 10 | 10 | 25 | 10 | 25 | 10 | 10 |
|  | Inventive LLDPE #2 | 0 | 100 | 50 | 100 | 50 | 100 | 0 |
|  | Inventive LLDPE #1 | 0 | 0 | 0 | 0 | 0 | 0 | 0 |
|  | Resin A | 100 | 0 | 50 | 0 | 50 | 0 | 80 |
|  | VLDPE | 0 | 0 | 0 | 0 | 0 | 0 | 20 |
| 94 | Layer Ratio | 10 | 10 | 25 | 10 | 25 | 10 | 10 |
|  | Inventive LLDPE #2 | 0 | 100 | 50 | 100 | 50 | 100 | 0 |
|  | Inventive LLDPE #1 | 0 | 0 | 0 | 0 | 0 | 0 | 0 |
|  | Resin A | 100 | 0 | 50 | 0 | 50 | 0 | 80 |
|  | VLDPE | 0 | 0 | 0 | 0 | 0 | 0 | 20 |
| 95 | Layer Ratio | 10 | 10 | 25 | 10 | 25 | 10 | 10 |
|  | Inventive LLDPE #2 | 0 | 100 | 0 | 100 | 0 | 100 | 0 |
|  | Inventive LLDPE #1 | 0 | 0 | 0 | 0 | 0 | 0 | 0 |
|  | Resin A | 100 | 0 | 100 | 0 | 100 | 0 | 80 |
|  | VLDPE | 0 | 0 | 0 | 0 | 0 | 0 | 20 |
| 96 | Layer Ratio | 10 | 10 | 25 | 10 | 25 | 10 | 10 |
|  | Inventive LLDPE #2 | 0 | 100 | 0 | 100 | 0 | 100 | 0 |
|  | Inventive LLDPE #1 | 0 | 0 | 0 | 0 | 0 | 0 | 0 |
|  | Resin A | 100 | 0 | 0 | 0 | 0 | 0 | 80 |
|  | Resin F | 0 | 0 | 100 | 0 | 100 | 0 | 0 |
|  | VLDPE | 0 | 0 | 0 | 0 | 0 | 0 | 20 |

Resin formulations were processed into cast film on a cast line manufactured by Black Clawson Equipment. The line was set up for 7 layer operation with structure A/B/C/B/C/B/D. Properties of the resulting films are presented in Tables 23, 24, & 25.

TABLE 23

| Sample ID | 87 | 88 | 89 | 90 | 91 |
|---|---|---|---|---|---|
| Target % inventive LLDPE in Film | 21.5 | 30 | 30 | 30 | 30 |
| Tensile Yield Strength psi (MPa) |  |  |  |  |  |
| MD Yield | 1,230 (8.481) | 1,260 (8.687) | 1,190 (8.205) | 1,238 (8.536) | 1,304 (8.991) |
| TD Yield | 1,127 (7.770) | 1,169 (8.060) | 1,170 (8.067) | 1,183 (8.156) | 1,227 (8.460) |
| 50% MD Tensile | 1,850 (12.755) | 1,970 (13.583) | 1,904 (13.128) | 2,003 (13.810) | 2,322 (16.010) |
| 100% MD Tensile | 2,009 (13.851) | 2,193 (15.120) | 2,128 (14.672) | 2,248 (15.499) | 2,619 (18.057) |
| MD Tensile Difference 100% − 50% | 159 (1.096) | 223 (1.538) | 224 (1.544) | 245 (1.689) | 297 (2.048) |
| MD Tensile Difference @ 100 − @ 50/50 (psi/%) | 3.2 | 4.5 | 4.5 | 4.9 | 5.9 |

TABLE 23-continued

| | | | | | |
|---|---|---|---|---|---|
| MD Tensile Difference @ 100 − @ 50/50 (Mpa/%) | 0.022 | 0.031 | 0.031 | 0.034 | 0.041 |
| Elongation @ Yield (%) | | | | | |
| MD Elongation | 6.8 | 6.5 | 6.5 | 6.7 | 7.0 |
| TD Elongation | 5.8 | 5.6 | 5.7 | 5.6 | 5.5 |
| Tensile Strength psi (MPa) | | | | | |
| MD Tensile | 7,252 | 7,319 | 7,204 | 7,083 | 7,337 |
| | (50.001) | (50.463) | (49.670) | (48.836) | (50.587) |
| TD Tensile | 3,689 | 3,936 | 4,048 | 4,139 | 4,034 |
| | (25.435) | (27.138) | (27.910) | (28.537) | (27.813) |
| Elongation @ Break (%) | | | | | |
| MD Elongation | 416 | 413 | 403 | 378 | 330 |
| | (2.868) | (2.848) | (2.779) | (2.606) | (2.275) |
| TD Elongation | 659 | 651 | 674 | 669 | 640 |
| | (4.544) | (4.488) | (4.647) | (4.613) | (4.413) |
| 1% Secant psi (MPa) | | | | | |
| MD Secant psi (MPa) | 20,889 | 21,569 | 20,985 | 21,035 | 20,863 |
| | (144.025) | (148.713) | (144.687) | (145.031) | (143.845) |
| TD Secant psi (MPa) | 21,886 | 22,770 | 23,052 | 23,799 | 23,177 |
| | (150.890) | (156.994) | (158.938) | (164.088) | (159.800) |
| Elmendorf Tear | | | | | |
| MD Tear (gms) | 89 | 101 | 124 | 97 | 191 |
| TD Tear (gms) | 315 | 310 | 319 | 276 | 292 |
| MD Tear (g/mil) | 153 | 173 | 231 | 211 | 407 |
| TD Tear (g/mil) | 552 | 544 | 601 | 588 | 648 |
| Dart Drop - Method B | | | | | |
| Dart (gms) | 77 | 87 | 80 | 73 | 84 |
| Dart (g/mil) | 133 | 147 | 143 | 155 | 179 |
| Gauge (mil) | | | | | |
| Low | 0.48 | 0.52 | 0.52 | 0.43 | 0.40 |
| High | 0.63 | 0.63 | 0.60 | 0.50 | 0.52 |
| Average | 0.58 | 0.59 | 0.56 | 0.47 | 0.47 |
| Gloss 45 degree D2457-03 | | | | | |
| MD | 92 | 92 | 92 | 92 | 91 |
| TD | 93 | 92 | 93 | 92 | 91 |
| Haze (%) D1003-00 | 1.5 | 1.5 | 1.4 | 1.3 | 1.5 |
| Puncture Method B | | | | | |
| Peak Load (lbs) | 6.53 | 6.48 | 5.96 | 5.80 | 6.03 |
| | (29.047) | (28.824) | (26.511) | (25.800) | (26.823) |
| Peak/mil (lbs/mil) | 11.26 | 10.98 | 10.65 | 12.33 | 12.83 |
| | (50.087) | (48.841) | (47.374) | (54.847) | (57.071) |
| Break Energy in-lbs (J) | 20.11 | 18.50 | 15.81 | 17.41 | 18.59 |
| | (2.28) | (2.09) | (1.79) | (1.97) | (2.10) |
| Break Energy/mil in-lbs/mil (J/mil) | 34.68 | 31.35 | 28.23 | 37.04 | 39.54 |
| | (3.92) | (3.55) | (3.19) | (4.19) | (4.47) |
| Shrink (%) | | | | | |
| MD | 69 | 73 | 73 | 75 | 81 |
| TD | −23 | −22 | −25 | −26 | −28 |

| Sample ID | 92 | 93 | 95 | 96 | 94 |
|---|---|---|---|---|---|
| Target % inventive LLDPE in Film | 42.5 | 55 | 30 | 30 | 55 |
| Tensile Yield Strength psi (MPa) | | | | | |
| MD Yield | 1,286 | 1,304 | 1,275 | 1,305 | 1,478 |
| | (8.867) | (8.991) | (8.791) | (8.998) | (10.190) |
| TD Yield | 1,301 | 1,294 | 1,183 | 1,243 | 1,382 |
| | (8.972) | (8.922) | (8.156) | (8.570) | (9.529) |
| 50% MD Tensile | 2,555 | 2,652 | 2,133 | 2,389 | 4,303 |
| | (17.616) | (18.285) | (14.707) | (16.472) | (29.668) |
| 100% MD Tensile | 2,978 | 3,247 | 2,417 | 2,720 | 4,846 |
| | (20.533) | (22.387) | (16.665) | (18.754) | (33.412) |
| MD Tensile Difference 100% − 50% | 423 | 595 | 284 | 331 | 543 |
| | (2.916) | (4.102) | (1.958) | (2.282) | (3.744) |
| MD Tensile Difference @100 − @50/50 (psi/%) | 8.5 | 11.9 | 5.7 | 6.6 | 10.9 |
| MD Tensile Difference @ 100 − @ 50/50 (Mpa/%) | 0.058 | 0.082 | 0.039 | 0.046 | 0.075 |

TABLE 23-continued

| Elongation @ Yield (%) | | | | | |
|---|---|---|---|---|---|
| MD Elongation | 7.0 | 7.0 | 6.7 | 7.0 | 7.3 |
| TD Elongation | 5.2 | 5.3 | 5.6 | 5.6 | 5.1 |
| Tensile Strength psi (MPa) | | | | | |
| MD Tensile | 7,653 | 7,641 | 7,180 | 7,686 | 8,980 |
| | (52.766) | (52.683) | (49.504) | (52.993) | (61.915) |
| TD Tensile | 4,187 | 4,303 | 4,418 | 4,486 | 3,673 |
| | (28.868) | (29.668) | (30.461) | (30.930) | (25.324) |
| Elongation @ Break (%) | | | | | |
| MD Elongation | 298 | 292 | 358 | 322 | 197 |
| | (2.055) | (2.013) | (2.468) | (2.220) | (1.358) |
| TD Elongation | 646 | 634 | 679 | 654 | 633 |
| | (4.454) | (4.371) | (4.682) | (4.509) | (4.364) |
| 1% Secant psi (MPa) | | | | | |
| MD Secant psi (MPa) | 21,347 | 21,795 | 21,289 | 19,881 | 26,040 |
| | (147.182) | (151.512) | (146.783) | (137.075) | (179.540) |
| TD Secant psi (MPa) | 25,421 | 27,551 | 24,121 | 24,710 | 32,358 |
| | (175.272) | (189.958) | (166.308) | (170.369) | (223.101) |
| Elmendorf Tear | | | | | |
| MD Tear (gms) | 94 | 85 | 193 | 171 | 62 |
| TD Tear (gms) | 273 | 307 | 276 | 296 | 334.1 |
| MD Tear (g/mil) | 242 | 206 | 371 | 335 | 195 |
| TD Tear (g/mil) | 739 | 749 | 530 | 559 | 1114 |
| Dart Drop - Method B | | | | | |
| Dart (gms) | 76 | 89 | 91 | 97 | <48[1] |
| Dart (g/mil) | 200 | 202 | 178 | 176 | <160[1] |
| Gauge (mil) | | | | | |
| Low | 0.33 | 0.39 | 0.48 | 0.53 | 0.28 |
| High | 0.41 | 0.48 | 0.55 | 0.58 | 0.32 |
| Average | 0.38 | 0.44 | 0.51 | 0.55 | 0.30 |
| Gloss 45 degree D2457-03 | | | | | |
| MD | 90 | 90 | 91 | 91 | 90 |
| TD | 90 | 90 | 91 | 91 | 89 |
| Haze (%) D1003-00 | 1.5 | 1.5 | 1.5 | 1.5 | 1.8 |
| Puncture Method B | | | | | |
| Peak Load (lbs) | 5.44 | 6.27 | 6.37 | 6.48 | 5.71 |
| | (24.198) | (27.890) | (28.335) | (28.824) | (25.399) |
| Peak/mil (lbs/mil) | 14.31 | 14.25 | 12.49 | 11.78 | 19.03 |
| | (63.654) | (63.387) | (55.558) | (52.400) | (84.650) |
| Break Energy in-lbs (J) | 14.97 | 17.29 | 18.07 | 18.19 | 14.52 |
| | (1.70) | (1.96) | (2.05) | (2.06) | (1.64) |
| Break Energy/mil in-lbs/mil (J/mil) | 39.39 | 39.29 | 35.43 | 33.07 | 48.40 |
| | (4.45) | (4.44) | (4.01) | (3.74) | (5.47) |
| Shrink (%) | | | | | |
| MD | 82 | 85 | 78 | 81 | 87 |
| TD | −31 | −34 | −28 | −31 | −34 |

TABLE 24

| Sample ID | Highlight Ultimate | | Highlight Puncture | |
|---|---|---|---|---|
| | HL Stretch % | HL Ult. Force | 50% | 100% |
| 87 | 262 | 64.2 | 3.7 | 1.7 |
| 88 | 224 | 61.8 | 3.8 | 0.4 |
| 89 | 237 | 60.5 | 3.6 | 0.4 |
| 90 | 285 | 55.9 | 3.2 | 0.2 |
| 91 | 266 | 61.7 | 3.3 | 0.3 |
| 92 | 220 | 56.7 | 2.3 | 0.3 |
| 93 | 211 | 65.3 | 3.3 | |
| 95 | 284 | 58.3 | 3.6 | 0.4 |
| 96 | 271 | 74.8 | 3.7 | 0.3 |
| 94 | 90 | 57.4 | 1.6 | |

TABLE 25

| Sample ID | Test Method | 87 | 88 | 89 | 90 | 91 | 92 | 93 | 95 | 96 | 94 |
|---|---|---|---|---|---|---|---|---|---|---|---|
| Rheology | D1238-01 | | | | | | | | | | |
| MI (I2) | | 1.96 | 1.98 | 1.90 | 1.83 | 1.57 | 1.36 | 1.15 | 1.52 | 1.39 | 1.10 |
| HLMI (I21) | | 48.45 | 49.11 | 48.68 | 48.01 | 40.46 | 37.08 | 31.76 | 40.26 | 36.44 | 31.93 |
| MI Swell | | 1.24 | 1.27 | 1.27 | 1.28 | 1.30 | 1.34 | 1.32 | 1.30 | 1.29 | 1.35 |
| Ratio (I21/I2) | | 24.68 | 24.82 | 25.65 | 26.18 | 25.80 | 27.22 | 27.71 | 26.49 | 26.31 | 29.11 |
| Density (g/cm3) | D1505-03 | | | | | | | | | | |
| Film | | 0.9163 | 0.9162 | 0.9157 | 0.9162 | 0.9157 | 0.9150 | 0.9163 | 0.9158 | 0.9157 | 0.9166 |
| Molded | | 0.9201 | 0.9204 | 0.9203 | 0.9203 | 0.9200 | 0.9198 | 0.9199 | 0.9196 | 0.9199 | 0.9202 |

Example 96-108

Example 96-108 illustrate and compare exemplary and reference coextruded three layer greenhouse films. The coextruded films were produced using resins as shown in Table 26:

TABLE 26

| Structure # | Layer A (Outer) | Layer B (Middle) | Layer C (Inner) | Layer distr. | Total thickness (μm) |
|---|---|---|---|---|---|
| 97 | 75% Inventive LLDPE #1 (1MI/.920D) 24% Resin G 1% Ultraviolet master batch | 99% Resin F 1% Ultraviolet master batch | 75% Inventive LLDPE #1 (1MI/.920D) 24% Resin G 1% Ultraviolet master batch | 1/1/1 | 80 |
| 98 | 25 Inventive LLDPE #1 (1MI/.920D) 74% Resin G 1% Ultraviolet master batch | 75% Resin F 24% Inventive LLDPE #1 1% Ultraviolet master batch | 25% Inventive LLDPE #1 (1MI/.920D) 74% Resin G 1% Ultraviolet master batch | 1/1/1 | 80 |
| 99 | 99% Inventive LLDPE #1 (1MI/.920D) 1% Ultraviolet master batch | 75% Resin F 24% Resin G 1% Ultraviolet master batch | 99% Inventive LLDPE #1 (1MI/.920D) 1% Ultraviolet master batch | 1/1/1 | 80 |
| 100 | 25% Inventive LLDPE #1 (1MI/.920D) 74% Resin G 1% Ultraviolet master batch | 99% Inventive LLDPE #1 1% Ultraviolet master batch | 25% Inventive LLDPE #1 (1MI/.920D) 74% Resin G 1% Ultraviolet master batch | 1/1/1 | 80 |
| 101 Ref. | 75% Resin F 24% Resin G 1% Ultraviolet master batch | 99% Resin F 1% Ultraviolet master batch | 75% Resin F 24% Resin G 1% Ultraviolet master batch | 1/1/1 | 80 |
| 102 Ref. | 75% Resin F 24% Resin G 1% Ultraviolet master batch | 99% Resin F 1% Ultraviolet master batch | 75% Resin F 24% Resin G 1% Ultraviolet master batch | 1/1/1 | 100 |
| 103 | 75% Inventive LLDPE #2 (0.5MI/.920D) 24% Resin G 1% Ultraviolet master batch | 99% Resin F 1% Ultraviolet master batch | 75% Inventive LLDPE #2 (0.5MI/.920D) 24% Resin G 1% Ultraviolet master batch | 1/1/1 | 80 |
| 104 | 25% Inventive LLDPE #2 (0.5MI/.920D) 74% Resin G 1% Ultraviolet master batch | 75% Resin F 24% Inventive LLDPE #2 1% Ultraviolet master batch | 25% Inventive LLDPE #2 (0.5MI/.920D) 74% Resin G 1% Ultraviolet master batch | 1/1/1 | 80 |
| 105 | 99% Inventive LLDPE #2 (0.5MI/.920D) 1% Ultraviolet master batch | 75% Resin F 24% Resin G 1% UVR 96 | 99% Inventive LLDPE #2 (0.5MI/.920D) 1% Ultraviolet master batch | 1/1/1 | 80 |
| 106 | 99% Inventive LLDPE #2 (0.5MI/.920D) 1% Ultraviolet master batch | 75% Resin F 24% Resin G 1% Ultraviolet master batch | 99% Inventive LLDPE #2 (0.5MI/.920D) 1% Ultraviolet master batch | 1/2/1 | 80 |

TABLE 26-continued

| Structure # | Layer A (Outer) | Layer B (Middle) | Layer C (Inner) | Layer distr. | Total thickness (μm) |
|---|---|---|---|---|---|
| 107 | 25% Inventive LLDPE #2 (0.5MI/.920D) 74% Resin G 1% Ultraviolet master batch | 99% Inventive LLDPE #2 1% Ultraviolet master batch | 25% Inventive LLDPE #2 (0.5MI/.920D) 74% Resin G 1% Ultraviolet master batch | 1/1/1 | 80 |
| 108 | 75% Resin H 25% Resin G | 100% Inventive LLDPE #1 | 75% Resin H 25% Resin G | 1/2/1 | 80 |

Films 97-108 were prepared in a single bubble blown film process using coextrusion blown film equipment consisting of three extruders that were 60 mm, 90 mm, and 60 mm in size with a 30:1 L/D. The die was 250 mm in diameter and equipped with a die gap of 1.4 mm. Extruder temperatures are set at 180 C with die temperatures set to 190 C. The films were produced at a blow-up ratio (BUR) of 4:1 and the frost line was maintained at 850 mm. Each extruder had an output of 70 kg/hr to yield a total output of 210 kg/hr.

Properties of the resulting films are presented in Tables 27, 28, & 29.

TABLE 27

| | | Example | | | | | | | | |
|---|---|---|---|---|---|---|---|---|---|---|
| | | 97 | 99 | 100 | Ref. | 101 Ref. | 102 103 | 105 | 106 | 108 |
| Thickness | | 80 | 80 | 80 | 80 | 100 | 80 | 80 | 80 | 80 |
| 10% Offset yield MD, μm | ASTM D882 | 11.5 | 11.7 | 12.3 | 11.1 | 10.9 | 11.5 | 11.7 | 11.6 | 12 |
| 10% Offset yield TD, MPa | ASTM D882 | 11.3 | 11.5 | 11.8 | 10.8 | 10.8 | 11.6 | 11.3 | 11.2 | 11.4 |
| Tensile at 2nd Yield MD, MPa | ASTM D882 | 12 | 12.1 | 14.5 | 11.6 | 11.3 | 12.4 | 12.4 | 12.2 | 13.4 |
| Tensile at Break MD, MPa | ASTM D882 | 39.7 | 43.5 | 30.8 | 35.4 | 33.3 | 42 | 47 | 42.9 | 47.5 |
| Tensile at Break TD, MPa | ASTM D882 | 39.3 | 44.6 | 35.7 | 35.2 | 34.7 | 42.5 | 47.4 | 43.4 | 48.1 |
| Elongation at Break MD, % | ASTM D882 | 687 | 694 | 536 | 765 | 760 | 675 | 675 | 675 | 660 |
| Elongation at Break TD, % | ASTM D882 | 716 | 723 | 611 | 790 | 816 | 708 | 698 | 694 | 683 |
| Energy to Break MD, mJ/mm$^3$ | ASTM D882 | 135 | 139 | 102 | 141 | 132 | 137 | 142 | 135 | 144 |
| Energy to Break TD, mJ/mm$^3$ | ASTM D882 | 133 | 141 | 111 | 139 | 144 | 138 | 139 | 133 | 141 |
| Tensile Modulus (1% sec) MD, MPa | ASTM D882 | 245 | 257 | 244 | 229 | 231 | 245 | 254 | 249 | 256 |
| Tensile Modulus (1% sec) TD, MPa | ASTM D882 | 252 | 261 | 265 | 232 | 230 | 257 | 255 | 248 | 253 |
| Elmendorf Tear Strength MD, g/μ | ASTM D1922 | 11.9 | 14.3 | 4.4 | 6.9 | 7.0 | 10.8 | 13.6 | 12.8 | 10.9 |
| Elmendorf Tear Strength TD, g/μ | ASTM D1922 | 18.2 | 16.4 | 9.0 | 10.0 | 9.4 | 18.7 | 20.1 | 17.7 | 16.9 |
| Dart Drop Impact(MethodA/Face), g/μ | ASTM D1709 | 5.4 | 5.4 | 6.1 | 4.2 | 4.0 | 7.9 | 10.4 | 9.4 | 9.3 |
| Puncture Resistance Damaging Force, N/μ | — | | 2.4 | 2.6 | 2.2 | 2.1 | 1.9 | 2.5 | 2.9 | 2.7 | 2.9 |
| Puncture Resistance Damaging Travel, mm | — | | 146 | 155 | 111 | 146 | 137 | 145 | 157 | 154 | 152 |
| Puncture Resistance Damaging Energy, mJ/μ | — | | 198 | 220 | 141 | 175 | 154 | 203 | 233 | 224 | 234 |
| Haze, % | ASTM D1003 | 17.2 | 8.5 | 22.3 | 16.2 | 18.1 | 15.6 | 8.1 | 8.5 | 11.9 |
| Clarity, % | ASTM D1746 | 46.8 | 78.5 | 14 | 42.5 | 42.5 | 55.3 | 78.5 | 78 | 56.5 |
| Gloss (45° angle) | ASTM D2457 | 38.7 | 68.6 | 31.4 | 44 | 44.2 | 41.8 | 65.6 | 65.7 | 50.9 |

In Table 27, puncture properties were measured according to the test method described above, except that the probe was a 0.75 in. (1.875 cm) diameter spherical probe, traveling at 20 inches/minutes (35 cm./min.). Probe traveling distance was measured and reported as "puncture resistant damaging travel."

As shown in Table 27, Films 99 and 105 have the highest level of the inventive LLDPE and have superior impact, puncture, and tear properties. Film 105 contains a higher molecular weight, fractional MI LLDPE and shows improvements over film 2.

TABLE 28

| Example | Thickness (mic) | Therm Area * | Thermicity (%) | Total light transmission (%) |
|---|---|---|---|---|
| 97 | 80 | 48918 | 68.7% | 90.0 |
| 99 | 80 | 48044 | 67.4% | 90.2 |
| 100 | 80 | 47984 | 67.4% | 90.2 |
| 101 ref. | 80 | 48207 | 67.7% | 89.7 |
| 102 ref. | 100 | 45930 | 64.5% | 89.0 |
| 103 | 80 | 49054 | 68.9% | 89.9 |
| 105 | 80 | 48911 | 68.7% | 90.0 |
| 106 | 80 | 49294 | 69.2% | 89.8 |
| 108 | 80 | 49005 | 68.8% | 90.2 |

As shown in Table 29 and FIG. 1, optical properties of the inventive film structures are also superior to those of the reference films.

TABLE 29

| Product | Average of Haze | Average of Clarity | Average of Gloss |
|---|---|---|---|
| 97 | 17.2 | 46.8 | 38.7 |
| 108 | 11.9 | 56.5 | 50.9 |
| 99 | 8.5 | 78.5 | 68.6 |
| 100 | 22.3 | 14.0 | 31.4 |
| Ref. 101 | 16.2 | 42.5 | 44.0 |
| Ref. 102 | 18.1 | 42.5 | 44.2 |
| 103 | 15.6 | 55.3 | 41.8 |
| 105 | 8.1 | 78.5 | 65.6 |
| 106 | 8.5 | 78.0 | 65.7 |

Example 109-114

Example 109-114 illustrate and compare exemplary and reference monolayer blended greenhouse films. Examples 109-114 are of the less demanding heat retention type.

Monolayer films were produced using resins as shown in Table 30:

TABLE 30

| | | | Example | | | | | |
|---|---|---|---|---|---|---|---|---|
| | | | 109 | 110 | 111 | 112 | 113 | 114 Ref. |
| | | | Film thickness (mic) | | | | | |
| | MI (gr/10 min) | Density (g/cm3) | 80 | 80 | 80 | 100 | 100 | 100 |
| Inventive LLDPE | 1.0 | 0.920 | 99% | 100 | 75% | 75% | 25% | |
| Resin G | 0.33 | 0.923 | | | 24% | 24% | 74% | 74% |
| Resin F | 1.0 | 0.918 | | | | | | 25% |
| Ultraviolet Master Batch | — | — | 1% | | 1% | 1% | 1% | 1% |

To protect inventive films 109-113 from premature photo-degradation, a conventional UV protection masterbatch was utilized. Example 110 was prepared without the UV masterbatch to test effect of the UV masterbatch on initial film performance.

Example 109-114 were produced in a single bubble blown film process using a 75 mm, 25:1 L/D extruder with a die diameter of 200 mm. The die gap used was 1 mm and the blow-up ratio was 3:1 with a frost line height of 500 mm. Temperature setting on the extruder and die was 180-190° C. Film production rate was 120 kg/hr producing films of 80 to 100 microns in thickness.

Figure 2:
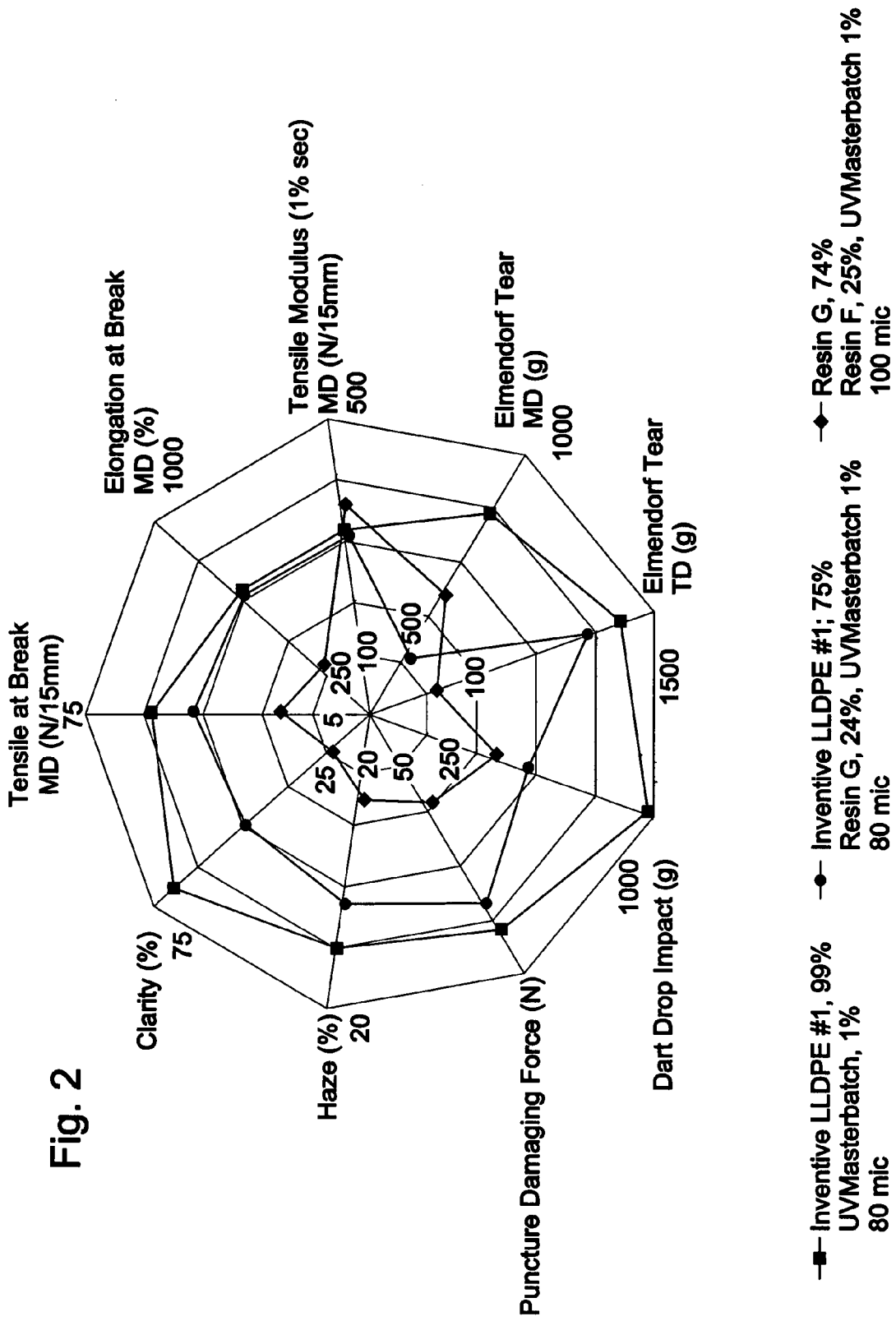
FIG. 2 is a graph of physical properties of exemplary polymer compositions and a conventional composition.

Properties of the resulting films are presented in Tables 31, 32, & 33 and in FIGS. 1, 2, & 3.

TABLE 31

| | | | Example | | | | | |
|---|---|---|---|---|---|---|---|---|
| | Unit | IS | 109 | 110 | 111 | 112 | 113 | 114 Ref. |
| 10% Offset yield MD | MPa | ASTM D882 | 11.2 | 11.3 | 12 | 12 | 13.1 | 13.8 |
| 10% Offset yield TD | MPa | ASTM D882 | 11.1 | 11.2 | 11 | 11.2 | 11.9 | 11.6 |
| Tensile at 2nd Yield MD | MPa | ASTM D882 | 11.8 | 12 | 14.3 | 13.6 | 17.3 | 20.2 |
| Tensile at Break MD | MPa | ASTM D882 | 50.3 | 52.3 | 43.1 | 40.2 | 28 | 22.4 |
| Tensile at Break TD | MPa | ASTM D882 | 52.4 | 50.5 | 42.7 | 41.9 | 29.2 | 28.1 |
| Elongation at Break MD | % | ASTM D882 | 637 | 647 | 631 | 642 | 475 | 285 |

TABLE 31-continued

|  | Unit | IS | Example 109 | 110 | 111 | 112 | 113 | 114 Ref. |
|---|---|---|---|---|---|---|---|---|
| Elongation at Break TD | % | ASTM D882 | 682 | 671 | 654 | 675 | 542 | 591 |
| Energy to Break MD | mJ/mm³ | ASTM D882 | 136 | 142 | 141 | 134 | 95 | 56 |
| Energy to Break TD | mJ/mm³ | ASTM D882 | 143 | 137 | 128 | 132 | 91 | 98 |
| Tensile Modulus (1% sec) MD | MPa | ASTM D882 | 256 | 257 | 247 | 251 | 238 | 233 |
| Tensile Modulus (1% sec) TD | MPa | ASTM D882 | 255 | 259 | 243 | 245 | 250 | 250 |
| Elmendorf Tear Strength MD | g/μ | ASTM D1922 | 10.6 | 9.7 | 6.3 | 7.6 | 8.9 | 6.5 |
| Elmendorf Tear Strength TD | g/μ | ASTM D1922 | 15.8 | 15.5 | 13.3 | 11.9 | 1.8 | 1.2 |
| Dart Drop Impact(MethodA/Face) | g/μ | ASTM D1709 | 12.2 | 15.6 | 7.1 | 7.3 | 3.8 | 4.6 |
| Puncture Resistance Damaging Force | N/μ | — | 3.1 | 2.9 | 2.7 | 2.5 | 1.4 | 1.0 |
| Puncture Resistance Damaging Travel | Mm | — | 158 | 153 | 138 | 140 | 57 | 30 |
| Puncture Resistance Damaging Energy | mJ/μ | — | 243 | 232 | 205 | 195 | 52 | 15 |
| Haze | % | ASTM D1003 | 8.8 | 10.6 | 11.6 | 12.7 | 17.1 | 18.1 |
| Clarity | % | ASTM D1746 | 66.8 | 77.3 | 39.0 | 35.3 | 12.0 | 5.5 |
| Gloss (45° angle) |  | ASTM D2457 | 66.6 | 61.5 | 74.4 | 48.2 | 36.9 | 35.3 |

In Table 31, puncture properties were measured according to the test method described above, except that the probe was a 0.75 in. (1.875 cm) diameter spherical probe, traveling at 20 inches/minutes (35 cm./min.). Probe traveling distance was measured and reported as "puncture resistant damaging travel."

Examples 109-114 were tested in greenhouse applications and characteristic were tested after 20 and 40 days.

TABLE 32

|  | Days in Suntester | Thickness μm | 10% Offset yield MD MPa ASTM D882 | Tensile at 2nd Yield MD MPa ASTM D882 | Tensile at Break MD MPa ASTM D882 | Elong. at Break MD % ASTM D882 | Energy to Break MD mJ/mm³ ASTM D882 | Tensile Modulus (1% sec) MD MPa ASTM D882 | Total light trans. % | Retained elong. after aging (%) |
|---|---|---|---|---|---|---|---|---|---|---|
| 109 | 0 | 80 | 11.2 | 11.8 | 50.3 | 637 | 136 | 256 | 90.3 |  |
| 109 | 20 | 80 | 11.6 | 12 | 40.7 | 624 | 116 | 260 | 89.4 |  |
| 109 | 40 | 80 | 12.1 | 12.3 | 21.2 | 486 | 67 | 270 | 89.6 | 76 |
| 110 | 0 | 80 | 11.3 | 12 | 52.3 | 647 | 142 | 257 | 89.9 |  |
| 110 | 20 | 80 | 14 | 11.4 | 7.5 | 99 | 11 | 303 | 89.0 |  |
| 110 | 40 | 80 |  |  | Break |  |  |  | 88.3 | 0 |
| 112 | 0 | 100 | 12 | 13.6 | 40.2 | 642 | 134 | 251 | 89.9 |  |
| 112 | 20 | 100 | 12.4 | 13.6 | 37.2 | 628 | 126 | 259 | 89.0 |  |
| 112 | 40 | 100 | 12.5 | 13.5 | 25.2 | 528 | 85 | 252 | 89.1 | 82 |
| 114 Ref | 0 | 100 | 13.8 | 20.2 | 22.4 | 285 | 56 | 233 | 90.1 |  |
| 114 Ref | 20 | 100 | 14.2 | 20.3 | 22.9 | 318 | 64 | 234 | 89.1 |  |
| 114 Ref | 40 | 100 | 14.1 | 19.1 | 19.3 | 225 | 42 | 233 | 88.7 | 79 |

As shown in Table 32, Examples 109-113 exhibit greater toughness compared to the reference films. The inventive films also exhibited improved impact, puncture, and tear performance compared to the reference film. Greater toughness gives film producers the flexibility to take advantage of different attributes or to reduce cost by downgauging the structure.

The films were tested using conventional Suntester criteria. The lamp was run for run time 517 hours at a test temperature of 60° C., using Filter B, and Irradiance 700 W/m2 lamp power level (Test time 1344 h is 56 days is 1 year 140 KLy; 1 year 120 KLy is 47.9 days).

As shown in Table 33 below, the inventive films have improved optics characteristics, i.e., haze, clarity, and gloss performance, compared to the reference film.

TABLE 33

| Structure | Thickness μm | Therm Area | Thermicity (%) | Total light transmission % | Total light transmission after 20 days (%) | Total light transmission after 40 days (%) |
|---|---|---|---|---|---|---|
| 109 | 80 | 48753 | 68.4% | 90.3 | 89.4 | 89.6 |
| 110 | 80 | 49421 | 69.4% | 89.9 | 89.0 | 88.3 |
| 111 | 80 | 47115 | 66.1% | 90.4 | | |
| 112 | 100 | 46121 | 64.7% | 89.9 | 89.0 | 89.1 |
| 113 | 100 | 46987 | 66.0% | 89.8 | | |
| ref. 114 | 100 | 41236 | 57.9% | 90.1 | 89.1 | 88.7 |

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated herein by reference for all jurisdictions in which such incorporation is permitted.

What is claimed is:

1. A stretch handwrap polymer film wherein the polymer consists of polyethylene, having at least one layer comprising from about 0.1 to about 99.9wt % of a polymer comprising a polyethylene copolymer derived from ethylene and one or more $C_3$ to $C_{20}$ α-olefin comonomers, said copolymer having;
   a. a composition distribution breadth index of greater than 75%,
   b. a melt index (MI), $I_{2.16}$, of from about 0.3 to about 2.0 g/10 min,
   c. a molecular weight distribution of from about 2.5 to about 5.5,
   d. a density of from about 0.918 to about 0.922,
   e. a melt index ratio (MIR), $I_{21.6}/I_{2.16}$, of about 30 to about 40, and
   f. a MD tensile natural draw ratio less than 250%.

2. The stretch handwrap polymer film of claim 1, further comprising at least one additional polyethylene polymer.

3. The stretch handwrap polymer film of claim 2, wherein the at least one additional polyethylene polymer is selected from the group consisting of high density polyethylene, linear low density polyethylene, low density polyethylene, medium density polyethylene, differentiated polyethylene, and combinations thereof.

4. The stretch handwrap polymer film of claim 2, wherein the at least one additional polyethylene polymer is selected from the group consisting of very low density polyethylene, an ethylene copolymer derived from one or more dienes, and/or combinations thereof.

5. The stretch handwrap polymer film of claim 1, wherein and the copolymer has a melt index, $I_{2.16}$ of about 0.5 g/10 min.

6. The stretch handwrap polymer film of claim 1, wherein said film is an extruded monolayer film.

7. The stretch handwrap polymer film of claim 1, wherein said film is an extruded multilayer film.

8. The stretch handwrap polymer film of claim 1, wherein the Highlight ultimate stretch of the film is less than about 200%.

9. The stretch handwrap polymer film of claim 8, wherein the Highlight ultimate stretch of the film is less than about 100%.

10. The stretch handwrap polymer film of claim 1, wherein said stretch handwrap film has a puncture peak force of greater than or equal to about 9 lb per mil.

11. The stretch handwrap polymer film of claim 10, wherein the Highlight ultimate stretch force of the film is greater than or equal to about 85 lb per mil.

12. The stretch handwrap polymer film of claim 11, wherein the film is a downgauged stretch handwrap film.

* * * * *